US009616922B2

(12) United States Patent
Suzuki

(10) Patent No.: US 9,616,922 B2
(45) Date of Patent: Apr. 11, 2017

(54) VEHICLE

(71) Applicant: SEARCHWARE KABUSHIKI KAISHA, Shizuoka (JP)

(72) Inventor: Masanobu Suzuki, Shizuoka (JP)

(73) Assignee: SEARCHWARE KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/899,072

(22) PCT Filed: Feb. 23, 2015

(86) PCT No.: PCT/JP2015/054911
§ 371 (c)(1),
(2) Date: Dec. 16, 2015

(87) PCT Pub. No.: WO2015/141390
PCT Pub. Date: Sep. 24, 2015

(65) Prior Publication Data
US 2016/0129937 A1 May 12, 2016

(30) Foreign Application Priority Data
Mar. 18, 2014 (JP) .................... 2014-054818
Jun. 26, 2014 (JP) .................... 2014-131937
(Continued)

(51) Int. Cl.
B60K 1/00 (2006.01)
B62D 9/02 (2006.01)
(Continued)

(52) U.S. Cl.
CPC .............. B62D 9/02 (2013.01); B60G 3/145 (2013.01); B60G 3/26 (2013.01); B60L 7/12 (2013.01);
(Continued)

(58) Field of Classification Search
CPC .......... B60G 3/20; B60G 11/08; B60G 7/006; B60G 3/14; B60G 13/08; B60G 3/145; B60D 9/02; B60K 1/00
See application file for complete search history.

(56) References Cited

U.S. PATENT DOCUMENTS 5,116,069 A * 5/1992 Miller ...................... B60G 3/14
180/210
6,435,522 B1 * 8/2002 Van Den Brink ....... B62D 9/02
180/210
(Continued)

FOREIGN PATENT DOCUMENTS

EP 1745974 A1 1/2007
FR 2714011 A1 6/1995
(Continued)

OTHER PUBLICATIONS

International Search Report dated May 26, 2015 from corresponding International Patent Application No. PCT/JP2015/054911; 2 pgs.
(Continued)

Primary Examiner — Hau Phan
(74) Attorney, Agent, or Firm — Maier & Maier, PLLC

(57) ABSTRACT

Provided is a vehicle which, when a pair of left and right wheels are displaced with respect to the vehicle body due to the difference in drive force between the wheels, the two wheels are reliably displaced vertically in opposite directions such that neither wheel is disproportionately displaced and such that both wheels are steered during said displacement of both wheels vertically in opposite directions. An electric motor applies drive torque to the front wheels individually. A vehicle body frame supports the front wheel support member to allow rotation about a forwardly inclined steering axis (Lf). By allowing rotation of the front wheel support member about the steering axis (Lf), the front
(Continued)

wheels are displaced relatively to one another vertically in opposite directions with respect to the vehicle body frame and the front wheels are steered.

19 Claims, 60 Drawing Sheets

(30) Foreign Application Priority Data

| | | |
|---|---|---|
| Jul. 2, 2014 | (JP) | 2014-137106 |
| Jul. 14, 2014 | (JP) | 2014-143981 |

(51) Int. Cl.

| | |
|---|---|
| *B62K 21/00* | (2006.01) |
| *B62D 11/20* | (2006.01) |
| *B62K 5/01* | (2013.01) |
| *B60G 3/14* | (2006.01) |
| *B60G 3/26* | (2006.01) |
| *B60L 7/12* | (2006.01) |
| *B60L 11/18* | (2006.01) |
| *B60L 15/20* | (2006.01) |
| *B62D 9/00* | (2006.01) |
| *B62D 9/04* | (2006.01) |

(52) U.S. Cl.
CPC ....... *B60L 11/1864* (2013.01); *B60L 11/1877* (2013.01); *B60L 11/1879* (2013.01); *B60L 15/2009* (2013.01); *B60L 15/2036* (2013.01); *B62D 9/002* (2013.01); *B62D 9/04* (2013.01); *B62D 11/20* (2013.01); *B62K 5/01* (2013.01); *B62K 21/00* (2013.01); *B60G 2200/46* (2013.01); *B60G 2300/13* (2013.01); *B60G 2300/45* (2013.01); *B60L 2210/10* (2013.01); *B60L 2220/44* (2013.01); *B60L 2220/46* (2013.01); *B60L 2240/12* (2013.01); *B60L 2240/421* (2013.01); *B60L 2240/423* (2013.01); *B60L 2250/24* (2013.01); *B60L 2270/145* (2013.01); *Y02T 10/645* (2013.01); *Y02T 10/7005* (2013.01); *Y02T 10/7061* (2013.01); *Y02T 10/7216* (2013.01); *Y02T 10/7275* (2013.01)

(56) References Cited

U.S. PATENT DOCUMENTS

| | | | | |
|---|---|---|---|---|
| 7,591,337 | B2* | 9/2009 | Suhre | B60G 3/20 180/210 |
| 7,931,286 | B2* | 4/2011 | Melcher | B60G 7/006 280/124.103 |
| 8,020,878 | B2* | 9/2011 | Hara | B60G 13/08 280/124.103 |
| 8,070,172 | B1* | 12/2011 | Smith | B60G 11/08 280/124.103 |
| 8,123,240 | B2* | 2/2012 | Mercier | B62D 9/02 280/124.103 |
| 8,251,375 | B2* | 8/2012 | Hara | B62D 9/02 280/124.103 |
| 2005/0012291 | A1* | 1/2005 | Bagnoli | B62K 5/05 280/124.103 |
| 2006/0097471 | A1* | 5/2006 | Van Den Brink | B62J 25/00 280/124.103 |
| 2008/0029987 | A1 | 2/2008 | Sugiyama | |
| 2010/0025944 | A1 | 2/2010 | Hara et al. | |
| 2010/0032914 | A1* | 2/2010 | Hara | B60G 13/08 280/5.509 |
| 2012/0310478 | A1 | 12/2012 | Carabelli et al. | |
| 2015/0203162 | A1 | 7/2015 | Suzuki | |

FOREIGN PATENT DOCUMENTS

| | | |
|---|---|---|
| JP | 60-151181 A | 8/1985 |
| JP | 05-042808 A | 2/1993 |
| JP | 07-081639 A | 3/1995 |
| JP | 2003-026068 A | 1/2003 |
| JP | 2007-153299 A | 6/2007 |
| JP | 01-087585 A | 4/2008 |
| JP | 2008-087585 A | 4/2008 |
| JP | 2010-052728 A | 3/2010 |
| JP | 2012-255286 A | 12/2012 |
| JP | 2013-023017 A | 2/2013 |
| JP | 2013-193693 A | 9/2013 |
| JP | 2013-199214 A | 10/2013 |
| JP | 2013-233895 A | 11/2013 |
| JP | 2013-248929 A | 12/2013 |
| JP | 2014-000923 A | 1/2014 |
| JP | 5441044 B1 | 3/2014 |
| JP | 2014-113970 A | 6/2014 |
| WO | 2011061769 A1 | 5/2011 |

OTHER PUBLICATIONS

Japanese Office Action dated Oct. 24, 2014 from Japanese Application No. 2014-137106; 12 pgs.
Japanese Office Action dated Jan. 19, 2015 from Japanese Application No. 2014-137106; 12 pgs.
Extended European Search Report dated Jun. 9, 2016, in connection with corresponding EP Application No. 15765077.1 (7 pgs.).

* cited by examiner

Fig. 22

(6) CALCULATE TARGET TURNING RESISTANCE AMOUNT → S51 INPUT ROTATION SPEED OF EACH WHEEL → S52 CALCULATE RUNNING SPEED → S53 INPUT STEERING EFFORT → S54 INPUT STEERING ANGLE → S55 INPUT TURNING ANGLE → S56 CALCULATE TURNING ANGULAR VELOCITY → S57 CALCULATE TARGET TURNING RESISTANCE AMOUNT → RETURN

(5) CALCULATE TARGET VEHICLE WIDTHWISE TILT ANGLE OF VEHICLE BODY → S41 INPUT VEHICLE REQUIREMENT TORQUE → S42 INPUT TARGET TURNING RADIUS → S43 INPUT TARGET FRONT-TO-REAR TILT ANGLE OF STEERING AXIS → S44 CALCULATE TARGET VEHICLE WIDTHWISE TILT ANGLE OF STEERING AXIS → S45 CALCULATE TARGET REAR WHEEL MOVEMENT ANGLE → RETURN

(4) CALCULATE TARGET FRONT-TO-REAR TILT ANGLE OF STEERING AXIS → S31 INPUT ACCELERATION CONTROL INPUT → S32 INPUT BRAKING CONTROL INPUT → S33 INPUT ROTATION SPEED OF EACH WHEEL → S34 CALCULATE RUNNING SPEED → S35 CALCULATE TARGET FRONT-TO-REAR TILT ANGLE OF STEERING AXIS → RETURN

Fig. 23
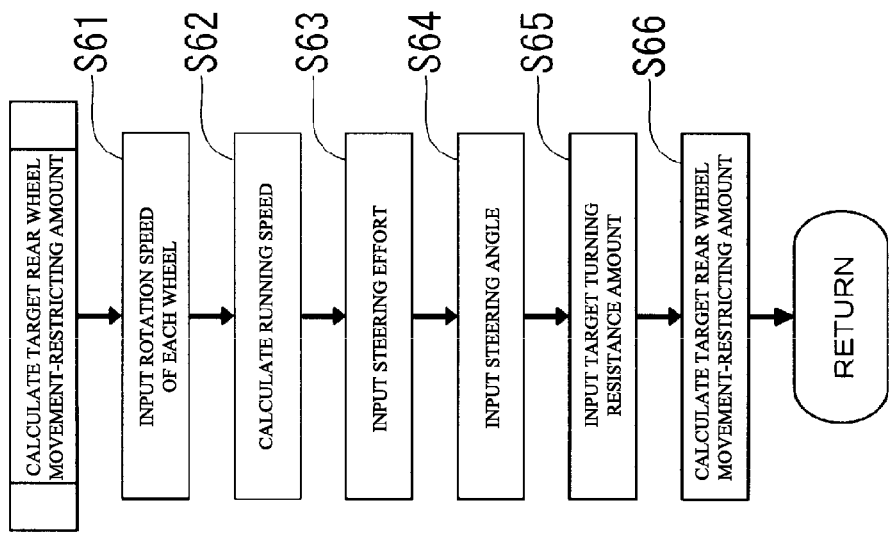
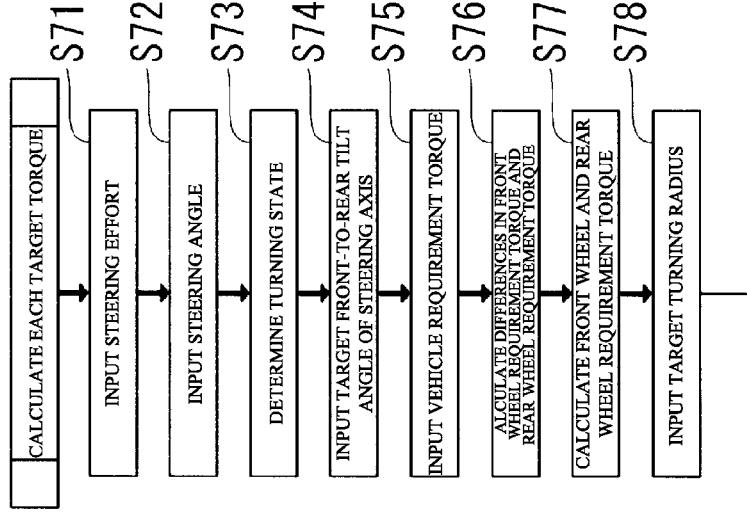

Fig. 24
(1)
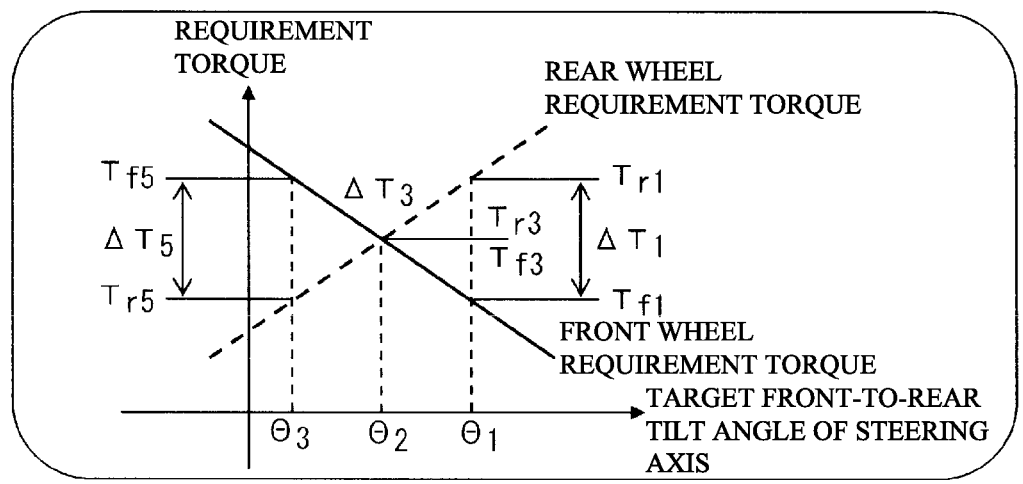
(2)
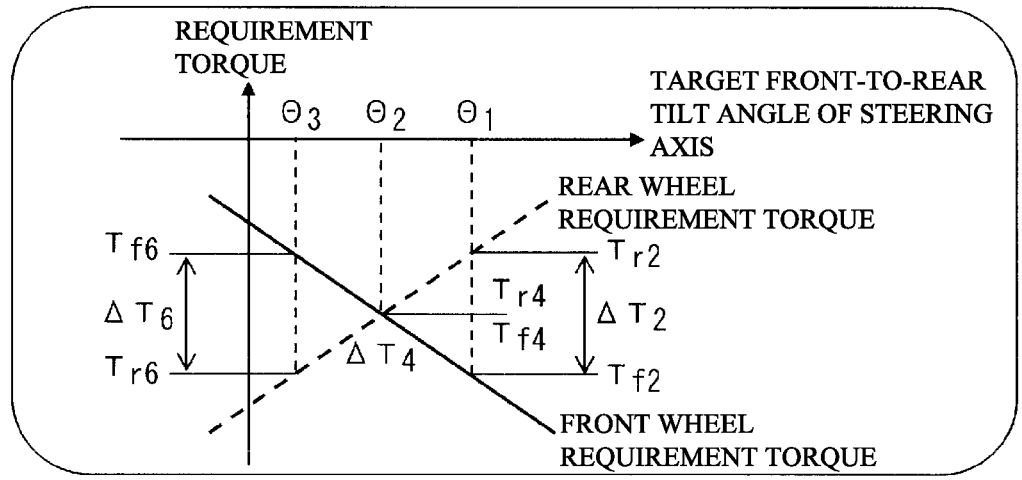

Fig. 25
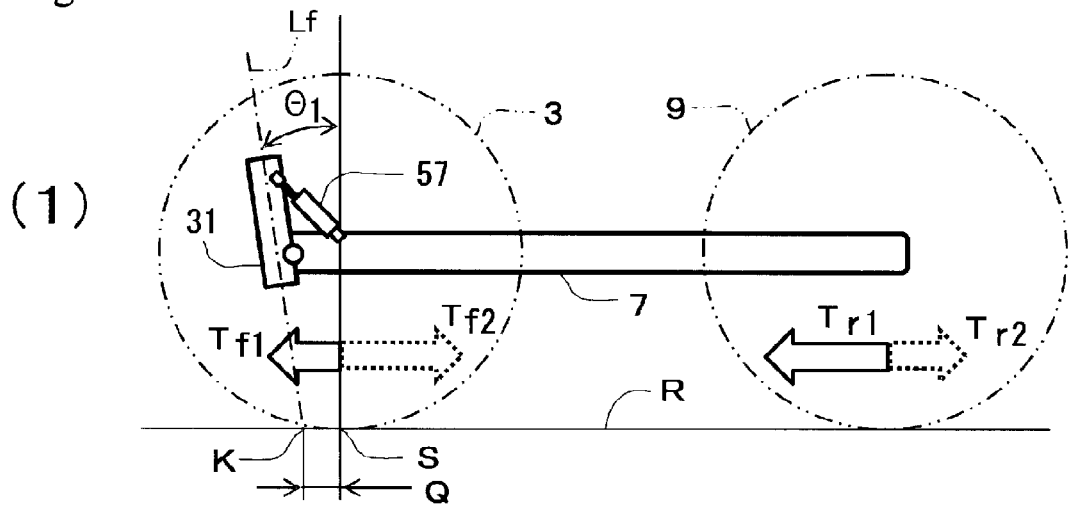
(1)
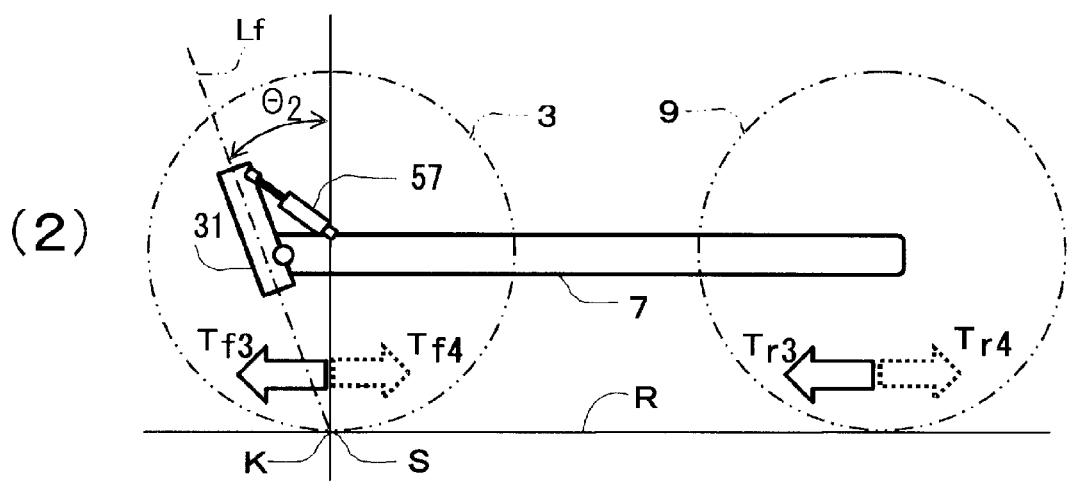
(2)
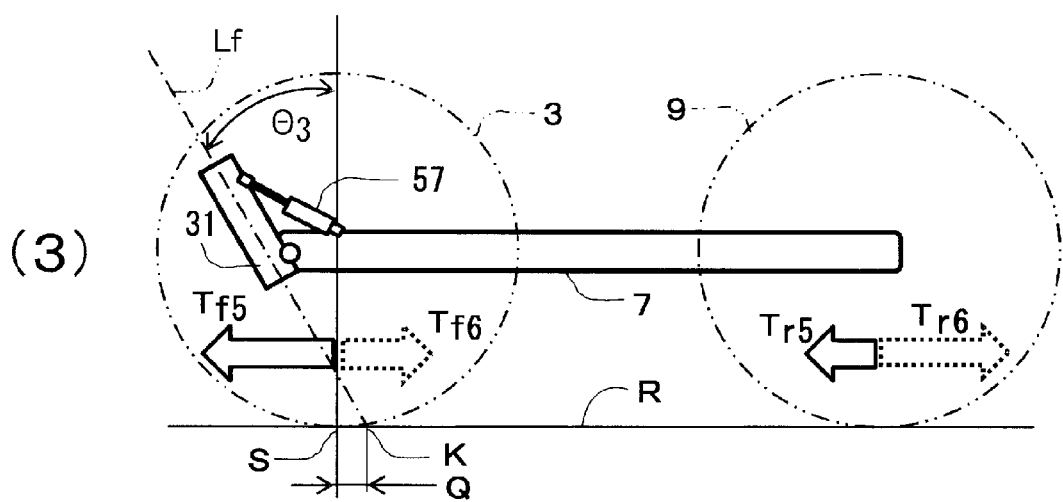
(3)

Fig. 31
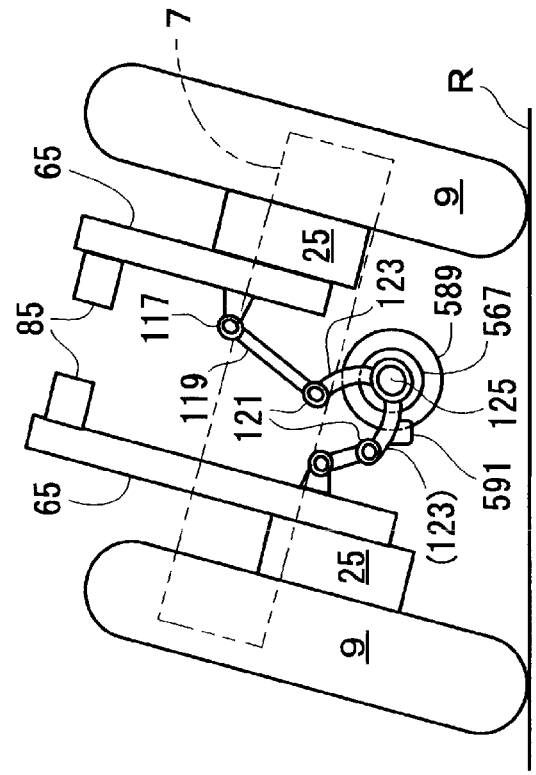
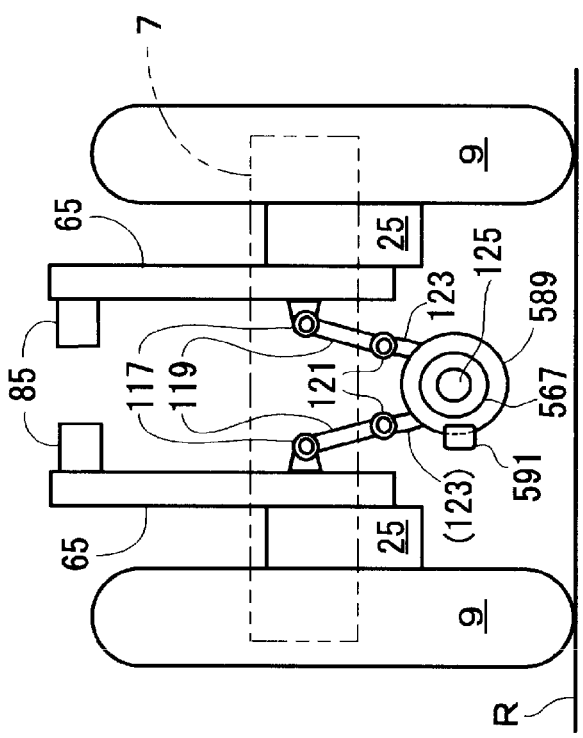

(1) WHEN STOPPED (2) DURING ACCELERATION (3) DURING DECELERATION

VEHICLE

TECHNICAL FIELD

The present invention relates to a vehicle in which a vehicle body can be made to be tilted and wheels can be steered during turning, and to a vehicle having a pair of left and right wheels and capable of having a simplified coupling structure between the wheels and a vehicle body.

BACKGROUND ART

A conventional vehicle shown in Patent Literature 1 has a pair of left and right rear arms suspended via a shock absorber on a vehicle body, with one end portion of each rear arm being used to support a rear wheel and the other end portion of each rear arm being coupled to the vehicle body. The one end portion of each rear arm can be individually moved in a vertical direction. When the vehicle turns, the outside rear wheel with respect to the turning direction is given larger driving force than the inside rear wheel. This causes a difference in the driving force between the left and the right rear wheels. This difference makes the rear arm on the outer side with respect to the turning direction move more in a vertical direction than the rear arm on the inner side with respect to the turning direction. Accordingly, the vehicle body is tilted inwardly with respect to the turning direction. This makes the vehicle's turning ability better.

In addition, in a conventional vehicle shown in Patent Literature 2, a single swing arm 44 extends forwardly of a vehicle body frame 41. A rear end portion of this swing arm 44 is rotatably mounted about a vehicle widthwise shaft to a front end portion of the vehicle body frame 41. A king pin 73 is attached to a front portion of this swing arm 44. A cross beam 64 extending in a vehicle-widthwise direction is rotatably mounted about the axis of the king pin 73. A pair of left and right front wheels (13 and 13) are rotatably mounted to both ends of the cross beam 64. Such a configuration allows each front wheel 13 to be suspended using the common swing arm 44. Accordingly, this structure is simpler than the structure in which each front wheel 13 is suspended using a different swing arm. Also, such a configuration can be achieved using a smaller number of components.

CITATION LIST

Patent Literatures

Patent Literature 1: JP2013-233895A
Patent Literature 2: JP4755367B

SUMMARY OF INVENTION

Technical Problem

However, the conventional vehicle has the configuration in which one end portion of each rear arm can individually move in a vertical direction. Accordingly, properties of left and right shock absorbers may vary between the left and the right ones, thereby producing a variance. In this case, when the vehicle turns at a high speed, one of the pair of rear arms may be much more disproportionately moved, depending on the degree of the variance, than the other rear arm. The significantly displaced rear arm cannot be further moved in the same direction. Unfortunately, the rear wheel on the side of this rear arm, per se, cannot absorb vibrations due to road surface roughness by being displaced in the vertical direction. In addition, even if the one end portion of each rear arm can move in the vertical direction, the rear wheels cannot be steered in this configuration.

Also, in the conventional vehicle, the cross beam 64 having a pair of left and right front wheels (13 and 13) can rotate about the axis of the king pin 73 attached to the swing arm 44. However, the cross beam 64 cannot rotate about an axis in a vehicle longitudinal direction. Consequently, when any one of the pair of left and right front wheels (13 and 13) goes on a projection on a traveling road surface during vehicle running, an end portion side of the cross beam 64, which side has been attached to the one front wheel 13, moves upward and the cross beam 64 is thus inclined. Then, the force that twists the swing arm 44 about the axis in the vehicle longitudinal direction is imposed in the inclination direction. This force spreads to the vehicle body frame 41 as it is, so that the vehicle body frame 41 is also inclined in the same direction. This causes a problem that vehicle ride comfort is impaired.

The present invention has been made to resolve such problems. The purpose of the present invention is to provide a vehicle in which when wheels are displaced relatively to one another, with respect to a vehicle body, due to at least one of the difference in torque between a pair of left and right wheels and the difference in vertical load therebetween, both the wheels are reliably displaced vertically in opposite directions so that only one of the wheels is not disproportionately displaced as well as both the wheels are steered when the wheels are displaced vertically in opposite directions. Another purpose of the present invention is to provide a vehicle which has a pair of left and right wheels, has a simplified coupling structure between the wheels and a vehicle body because the structure can be constructed using a small number of components, and does not have impaired vehicle ride comfort by allowing the vehicle body to be inclined as less as possible when any one of the pair of left and right wheels goes on a projection on a traveling road surface.

Solution to Problem

In order to achieve this goal, a first aspect of the present invention provides a vehicle including: a pair of left and right wheels; torque-applying means for individually applying torque to each of the pair of left and right wheels; a wheel support member that rotatably supports each wheel; a base member that rotatably supports the wheel support member; a vehicle body that supports the base member; and a linkage mechanism that mechanically interlocks the wheels by means of the wheel support member, so that the wheels can be displaced relatively to one another vertically in opposite directions with respect to the vehicle body, wherein the wheel support member is rotatably supported by the base member about a steering axis that is inclined such that an upper portion thereof is positioned forwardly of a lower portion thereof; the wheel support member is mechanically interlocked with the base member and is rotated about the steering axis by using a difference in torque between the wheels, the difference being caused when each wheel is given torque individually by the torque-applying means during turning of the vehicle; by mechanically interlocking the wheel support member with the base member and by allowing the wheel support member to rotate about the steering axis, each wheel is steered and the vehicle is turned, and, at the same time, the wheels are interlocked and displaced relatively to one another vertically in opposite directions with respect to the vehicle body, so that the vehicle body is made to be tilted inwardly in a turning direction.

A second aspect of the present invention provides the vehicle according to the first aspect, wherein the base member is supported via elastic means by the vehicle body.

A third aspect of the present invention provides the vehicle according to the first or second aspect, further including resistance means for giving rotation resistance when the wheel support member rotates.

A fourth aspect of the present invention provides the vehicle according to any one of the first to third aspects, further including: an electric motor for applying torque to each of the pair of left and right wheels; and a battery for supplying electricity to the electric motor, wherein the battery is supported by the vehicle body such that the gravity center of the battery is positioned lower than a tilting center when the vehicle body is tilted in a vehicle widthwise direction by allowing rotation of the wheel support member with respect to the base member and by relatively displacing the wheels vertically in opposite directions with respect to the vehicle body.

A fifth aspect of the present invention provides the vehicle according to any one of the first to fourth aspects, further including an operable steering yoke, wherein the steering yoke and the wheel support member are interlocked and coupled by means of motive actuating-force transmission means.

A sixth aspect of the present invention provides the vehicle according to any one of the first to fifth aspects, wherein the pair of left and right wheels are a pair of left and right front wheels.

A seventh aspect of the present invention provides the vehicle according to the sixth aspect, wherein the pair of left and right front wheels are rotatably supported by a pair of left and right front-wheel-side wheel support members; and the pair of left and right front-wheel-side wheel support members are each rotatably supported by a front-wheel-side base member about each of a pair of left and right front-wheel-side steering axes.

An eighth aspect of the present invention provides the vehicle according to the seventh aspect, wherein when a vehicle widthwise direction of the vehicle body is defined as an X direction and a vehicle longitudinal direction of the vehicle body is defined as a Y direction, the pair of left and right front-wheel-side steering axes are arranged to be symmetrical to each other with respect to a plane that is parallel to the Y direction and vertical to the X direction and intersects a vehicle widthwise center of the vehicle body; and the pair of left and right front-wheel-side steering axes are arranged such that the pair of left and right front-wheel-side steering axes are each inclined with respect to a plain that is parallel to the X direction and the Y direction and each intersect the Y axis when viewed from the above of the vehicle body.

A ninth aspect of the present invention provides the vehicle according to any one of the sixth to eighth aspects, further including camber angle adjusting means for allowing the pair of left and right front wheels to be tilted, depending on an amount of rotation of the wheel support member about the steering axis, inwardly in the turning direction.

A tenth aspect of the present invention provides the vehicle according to any one of the sixth to ninth aspects, wherein the steering axis is tilted such that when the vehicle accelerates in a traveling direction, an intersection point between a traveling road surface and the steering axis is positioned in the vehicle traveling direction rearwardly of a virtual straight line connecting ground contact points of the wheels.

An eleventh aspect of the present invention provides the vehicle according to any one of the sixth to tenth aspects, further including caster angle adjusting means for changing, depending on a vehicle running speed, an angle of inclination of the steering axis.

A twelfth aspect of the present invention provides the vehicle according to any one of the first to fourth aspects, wherein the pair of left and right wheels are a pair of left and right rear wheels; the pair of left and right rear wheels are rotatably supported by a pair of left and right rear-wheel-side wheel support members; and the pair of left and right rear-wheel-side wheel support members are each rotatably supported by a rear-wheel-side base member about each of a pair of left and right rear-wheel-side steering axes.

A thirteenth aspect of the present invention provides the vehicle according to the twelfth aspect, wherein when a vehicle widthwise direction of the vehicle body is defined as an X direction and a vehicle longitudinal direction of the vehicle body is defined as a Y direction, the pair of left and right rear-wheel-side steering axes are arranged to be symmetrical to each other with respect to a plane that is parallel to the Y direction and vertical to the X direction and intersects a vehicle widthwise center of the vehicle body; and the pair of left and right rear-wheel-side steering axes are arranged such that the pair of left and right rear-wheel-side steering axes are each inclined with respect to a plain that is parallel to the X direction and the Y direction and each intersect the Y axis when viewed from the above of the vehicle body.

An fourteenth aspect of the present invention provides the vehicle according to the twelfth or thirteenth aspect, wherein the rear-wheel-side wheel support members can rotate about the rear-wheel-side steering axes by degrees within substantially the same vertical angle relative to a neutral position defined as a state of being inclined by about 45 degrees with respect to a traveling road surface while the rear-wheel-side wheel support members are positioned lower as the members each extend in a longitudinal direction far from the rear-wheel-side steering axis.

A fifteenth aspect of the present invention provides the vehicle according to any one of the first to fifth aspects, wherein the pair of left and right wheels are a pair of left and right front wheels, the vehicle further comprising: a pair of left and right rear wheels that are disposed rearwardly of the pair of left and right front wheels; a rear-wheel-side wheel support member that rotatably supports each of the pair of left and right rear wheels; a rear-wheel-side base member that rotatably supports the rear-wheel-side wheel support member and is supported by the vehicle body; and a rear-wheel-side linkage mechanism that can mechanically interlock the pair of left and right rear wheels by means of the rear-wheel-side wheel support member and can relatively displace the pair of left and right rear wheels vertically in opposite directions with respect to the vehicle body, wherein by allowing rotation of the rear-wheel-side wheel support member with respect to the rear-wheel-side base member, the rear wheels are displaced relatively to one another vertically in opposite directions with respect to the vehicle body; and a difference in torque between the front wheels, the torque being individually given to the pair of left and right front wheels by the torque-applying means, causes the vehicle body to be tilted inwardly in the turning direction and generates a difference in vertical load between the pair of left and right rear wheels, so that the difference in vertical load causes the rear-wheel-side wheel support member to rotate with respect to the rear-wheel-side base member.

A sixteenth aspect of the present invention provides the vehicle according to the fifteenth aspect, wherein the pair of left and right rear wheels are rotatably supported by a pair of left and right rear-wheel-side wheel support members; the pair of left and right rear-wheel-side wheel support members are rotatably supported about a pair of left and right rear-wheel-side steering axes by the rear-wheel-side base member; when a vehicle widthwise direction of the vehicle body is defined as an X direction and a vehicle longitudinal direction of the vehicle body is defined as a Y direction, the pair of left and right rear-wheel-side steering axes are arranged to be symmetrical to each other with respect to a plane that is parallel to the Y direction and vertical to the X direction and intersects a vehicle widthwise center of the vehicle body; and the pair of left and right rear-wheel-side steering axes are arranged such that the pair of left and right rear-wheel-side steering axes are each inclined with respect to a plain that is parallel to the X direction and the Y direction and each intersect the Y axis when viewed from the above of the vehicle body.

An seventeenth aspect of the present invention provides the vehicle according to the fifteenth or sixteenth aspect, wherein the rear-wheel-side wheel support members can rotate about the rear-wheel-side steering axes by degrees within substantially the same vertical angle relative to a neutral position defined as a state of being inclined by about 45 degrees with respect to a traveling road surface while the rear-wheel-side wheel support members are positioned lower as the members each extend in a longitudinal direction far from the rear-wheel-side steering axis.

An eighteenth aspect of the present invention provides the vehicle according to any one of the first to fourth aspects, wherein the pair of left and right wheels are a pair of left and right rear wheels, the vehicle further including: a pair of left and right front wheels that are disposed forwardly of the pair of left and right rear wheels; a front-wheel-side wheel support member that rotatably supports each of the pair of left and right front wheels; a front-wheel-side base member that rotatably supports the front-wheel-side wheel support member and is supported by the vehicle body; and a front-wheel-side linkage mechanism that can mechanically interlock the pair of left and right front wheels by means of the front-wheel-side wheel support member and can relatively displace the pair of left and right front wheels vertically in opposite directions with respect to the vehicle body, wherein by allowing rotation of the front-wheel-side wheel support member with respect to the front-wheel-side base member, the front wheels are displaced relatively to one another vertically in opposite directions with respect to the vehicle body; and a difference in torque between the rear wheels, the torque being individually given to the pair of left and right rear wheels by the torque-applying means, causes the vehicle body to be tilted inwardly in the turning direction and generates a difference in vertical load between the pair of left and right front wheels, so that the difference in vertical load causes the front-wheel-side wheel support member to rotate with respect to the front-wheel-side base member.

A nineteenth aspect of the present invention provides the vehicle according to any one of the first to eighteenth aspects, further including a cabin that is rotatably supported by the vehicle body about a support shaft extending in substantially a vertical direction.

A twentieth aspect of the present invention provides a vehicle including: a pair of left and right wheels and wheel support means for rotatably supporting each wheel, wherein the wheel support means is coupled to a vehicle body by means of coupling means; the coupling means is arranged on a vehicle body center line extending in a vehicle longitudinal direction of the vehicle body and intersecting a vehicle widthwise center of the vehicle body; one end portion of the coupling means is rotatably coupled to the wheel support means about a first axis and the other end portion of the coupling means is rotatably coupled to the vehicle body about a second axis; and any one of the two axes is set to a roll axis extending in the vehicle longitudinal direction of the vehicle body and intersecting a vehicle widthwise center of the vehicle body and the other axis is set to a pitch axis extending in the vehicle widthwise direction of the vehicle body.

A twenty-first aspect of the present invention provides the vehicle according to the twentieth aspect, wherein the one end portion of the coupling means is positioned higher than the other end portion of the coupling means.

A twenty-second aspect of the present invention provides the vehicle according to the twentieth and the twenty-first aspect, further including: electric motors for applying torque to the pair of left and right wheels; and batteries for supplying electricity to the electric motor, wherein the batteries are supported by the vehicle body such that the gravity center of each battery is positioned lower than the roll axis.

A twenty-third aspect of the present invention provides the vehicle according to the twenty-second aspect, wherein the batteries are disposed apart from one another on both left and right direction sides of the vehicle body while the vehicle body center line is sandwiched therebetween when viewed from the above of the vehicle body.

A twenty-fourth aspect of the present invention provides the vehicle according to any one of the twentieth to twenty-third aspects, wherein a coupling between the coupling means and the vehicle body and/or a coupling between the coupling means and the wheel support means are mediated by an elastic member.

A twenty-fifth aspect of the present invention provides the vehicle according to the twenty-fourth aspect, wherein regarding the coupling between the coupling means and the vehicle body and/or the coupling between the coupling means and the wheel support means, component members at a site of the coupling are fit for each other with a space and the space is filled with the elastic member for the coupling.

A twenty-sixth aspect of the present invention provides the vehicle according to any one of the twentieth to twenty-fifth aspects, wherein the coupling means has a bent portion between the one end portion and the other end portion.

A twenty-seventh aspect of the present invention provides the vehicle according to any one of the twentieth to twenty-sixth aspects, wherein the wheel support means comprises a linkage mechanism that can mechanically interlock the wheels and can relatively displace the wheels vertically in opposite directions with respect to the vehicle body.

A twenty-eighth aspect of the present invention provides the vehicle according to any one of the twentieth and twenty-seventh aspects, wherein the wheel support means is supported via elastic means by the vehicle body.

A twenty-ninth aspect of the present invention provides the vehicle according to the twenty-eighth aspect, wherein the single elastic means is used to resist rotation of the wheel support means with respect to the coupling means about the roll axis.

A thirtieth aspect of the present invention provides a vehicle including: a pair of left and right front wheels;

front-wheel-side wheel support means for rotatably supporting each front wheel; a pair of left and right rear wheels; rear-wheel-side wheel support means for rotatably supporting each rear wheel, wherein the front-wheel-side wheel support means is coupled to a vehicle body by means of front-wheel-side coupling means; the rear-wheel-side wheel support means is coupled to the vehicle body by means of rear-wheel-side coupling means; the front-wheel-side coupling means and the rear-wheel-side coupling means are each disposed on a vehicle body center line extending in a vehicle longitudinal direction of the vehicle body and intersecting a vehicle widthwise center of the vehicle body when viewed from the above of the vehicle body; one end portion of the front-wheel-side coupling means and the front-wheel-side wheel support means are rotatably coupled to one another about a first axis and the other end portion of the front-wheel-side coupling means and the vehicle body are rotatably coupled to one another about a second axis; any one of the two axes is set to a front-wheel-side roll axis extending in the vehicle longitudinal direction and intersecting a vehicle widthwise center of the vehicle body; the other axis is set to a front-wheel-side pitch axis extending in the vehicle widthwise direction of the vehicle body; one end portion of the rear-wheel-side coupling means and the rear-wheel-side wheel support means are rotatably coupled to one another about a third axis and the other end portion of the rear-wheel-side coupling means and the vehicle body are rotatably coupled to one another about a fourth axis; any one of the third and fourth axes is set to a rear-wheel-side roll axis extending in the vehicle longitudinal direction and intersecting a vehicle widthwise center of the vehicle body; the other axis is set to a rear-wheel-side pitch axis extending in the vehicle widthwise direction of the vehicle body; a longitudinal intermediate portion of elastic means continuously extending in the vehicle longitudinal direction of the vehicle body is supported by the vehicle body; the front-wheel-side wheel support means is supported by a front end portion of the elastic means; and the rear-wheel-side wheel support means is supported by a rear end portion of the elastic means.

A thirty-first aspect of the present invention provides the vehicle according to the thirtieth aspect, wherein the elastic means is fixed to the vehicle body at two positions disposed on an intermediate portion thereof in the vehicle longitudinal direction and the two sites are apart from each other with a certain distance.

Advantageous Effects of Invention

According to the first aspect, the difference in torque between the wheels causes the wheel support member to rotate with respect to the base member. Accordingly, each wheel is steered and the vehicle is turned, and, at the same time, the wheels are interlocked and displaced relatively to one another vertically in opposite directions with respect to the vehicle body. Also, the vehicle body is tilted inwardly in the turning direction. Thus, two motions including the relative displacement and the steering can be simultaneously and easily performed on each wheel. In addition, the vehicle includes the linkage mechanism that can mechanically interlock the wheels by means of the wheel support member and can relatively displace the wheels vertically in opposite directions with respect to the vehicle body. Also, by mechanically interlocking the wheel support member with the base member and by allowing rotation of the wheel support member about the steering axis, the wheels are displaced relatively to one another vertically in opposite directions with respect to the vehicle body. Hence, both the wheels can be reliably displaced to one another vertically in opposite directions and only one wheel cannot be disproportionately displaced.

Further, because the wheels are interlocked and displaced relatively to one another vertically in opposite directions with respect to the vehicle body, the vehicle body is tilted inwardly in the turning direction. Hence, the vehicle's turning ability becomes better.

Furthermore, the wheel support member is rotatably supported by the base member about the steering axis that is inclined such that an upper portion thereof is positioned forwardly of a lower portion thereof. Accordingly, the difference in torque given to each wheel causes the wheel support member to rotate with respect to the base member, so that the wheels can be easily displaced vertically in opposite directions. Moreover, the steering axis, which is the rotation pivot of the wheel support member, is inclined forwardly. Accordingly, when the wheel support member rotates in the vehicle turning direction, the wheels are steered, so that not only the wheels are directed in the vehicle turning direction, but also the vehicle body is tilted inwardly in the turning direction. Hence, the vehicle's turning ability becomes better.

According to the second aspect, the base member that supports the wheel support member is supported via the elastic member by the vehicle body. Thus, road surface roughness-derived vibrations that spread from the wheels via the wheel support member to the base member can be prevented from further spreading to the vehicle body.

According to the third aspect, the vehicle includes the resistance means for resisting the rotation of the wheel support member when the wheel support member rotates. Thus, it is possible to prevent the wheel support member from rotating abruptly.

According to the fourth aspect, the battery is supported by the vehicle body such that the center of gravity of the battery is positioned lower than the tilting center when the vehicle body is tilted in a vehicle widthwise direction. This can prevent the vehicle body from being tilted outwardly in the turning direction due to centrifugal force imposed on the battery when the vehicle turns.

According to the fifth aspect, the steering yoke is communicated and interlocked with the wheel support member by means of the motive actuating-force transmission means. Accordingly, when the steering yoke is operated to rotate the wheel support member, the wheels can be steered.

According to the sixth aspect, the pair of left and right wheels are a pair of left and right front wheels. Thus, the same effects according to the first to fifth aspects can be exerted on the front wheel side of the vehicle.

According to the seventh aspect, the pair of left and right front wheels are rotatably supported by a pair of left and right front-wheel-side wheel support members; and the pair of left and right front-wheel-side wheel support members are each rotatably supported by a front-wheel-side base member about each of a pair of left and right front-wheel-side steering axes. Thus, the same effects according to the first to fifth aspects can be exerted on the front wheel side of the vehicle.

According to the eighth aspect, the pair of left and right front-wheel-side steering axes are each arranged and inclined in a particular direction. Thus, when the front-wheel-side wheel support member rotates, the front wheels are steered accordingly.

According to the ninth aspect, the vehicle includes the camber angle adjusting means for allowing the wheels to be tilted, depending on the amount of rotation of the wheel support member about the steering axis, inwardly in the turning direction. Thus, when the camber angle adjusting means is appropriately actuated, the vehicle's turning ability can be improved.

According to the tenth aspect, the steering axis is tilted such that when the vehicle accelerates in a traveling direction, an intersection point between a traveling road surface and the steering axis is positioned in the vehicle traveling direction rearwardly of a virtual straight line connecting ground contact points of the wheels. Thus, the vehicle can have improved straight-traveling stability during acceleration.

According to the eleventh aspect, the vehicle further includes a caster angle adjusting means for changing, depending on a vehicle running speed, an angle of inclination of the steering axis. Thus, the angle of inclination of the steering axis can be set to an angle that is fit for the vehicle running speed.

According to the twelfth aspect, the pair of left and right wheels are a pair of left and right rear wheels; the pair of left and right rear wheels are rotatably supported by a pair of left and right rear-wheel-side wheel support members; and the pair of left and right rear-wheel-side wheel support members are each rotatably supported by a rear-wheel-side base member about each of a pair of left and right rear-wheel-side steering axes. Thus, the same effects according to the first to fourth aspects can be exerted on the rear wheel side of the vehicle.

According to the thirteenth aspect, the pair of left and right rear-wheel-side steering axes are each arranged and inclined in a particular direction. Thus, when the rear-wheel-side wheel support member rotates, the rear wheels are steered accordingly.

According to the fourteenth aspect of the present invention, the rear-wheel-side wheel support members can rotate about the rear-wheel-side steering axes by degrees within substantially the same vertical angle relative to a neutral position defined as a state of being inclined by about 45 degrees with respect to a traveling road surface while the rear-wheel-side wheel support members are positioned lower as the members each extend in a longitudinal direction far from the rear-wheel-side steering axis. Thus, in order to absorb road surface roughness-derived vibrations that spread from each rear wheel to the rear-wheel-side wheel support members, the movement range of the rear-wheel-side wheel support members can be set to a preferable range.

According to the fifteenth aspect, a difference in torque applied individually between the pair of front wheels causes the vehicle body to be tilted inwardly in the turning direction and generates a difference in vertical load between the pair of left and right rear wheels, so that the difference in vertical load causes the rear-wheel-side wheel support member to rotate with respect to the rear-wheel-side base member. Hence, the pair of left and right rear wheels can be reliably displaced to one another vertically in opposite directions and only one rear wheel cannot be disproportionately displaced.

According to the sixteenth aspect, the pair of left and right rear-wheel-side wheel support members are each rotatably supported about a pair of left and right rear-wheel-side steering axes by the rear-wheel-side base member; and each steering axis is arranged and inclined in a particular direction. Thus, when the rear-wheel-side wheel support member rotates, the rear wheels are steered accordingly.

According to the seventeenth aspect of the present invention, the rear-wheel-side wheel support members can rotate about the rear-wheel-side steering axes by degrees within substantially the same vertical angle relative to a neutral position defined as a state of being inclined by about 45 degrees with respect to a traveling road surface while the rear-wheel-side wheel support members are positioned lower as the members each extend in a longitudinal direction far from the rear-wheel-side steering axis. Thus, in order to absorb road surface roughness-derived vibrations that spread from each rear wheel to the rear-wheel-side wheel support members, the movement range of the rear-wheel-side wheel support members can be set to a preferable range.

According to the eighteenth aspect, a difference in torque applied individually between the pair of rear wheels causes the vehicle body to be tilted inwardly in the turning direction and generates a difference in vertical load between the pair of left and right front wheels, so that the difference in vertical load causes the front-wheel-side wheel support member to rotate with respect to the front-wheel-side base member. Hence, the pair of left and right front wheels can be reliably displaced to one another vertically in opposite directions and only one front wheel cannot be disproportionately displaced.

According to the nineteenth aspect, the vehicle further includes a cabin that is rotatably supported by the vehicle body about a support shaft extending in substantially a vertical direction. Because the cabin can rotate about the axis of the support shaft, an enough space for an occupant to get on and off the cabin is kept on the lateral side of the vehicle. This makes it easier to get on and off the cabin.

According to the twentieth aspect, the coupling means for coupling the vehicle body with the wheel support means for supporting the pair of left and right wheels is arranged on the vehicle body center line extending in the vehicle longitudinal direction of the vehicle body and intersecting a vehicle widthwise center of the vehicle body. Consequently, the structure that couples the wheels and the vehicle body can be constructed using a small number of components and thus simplified.

In addition, one end portion of the coupling means is rotatably coupled to the wheel support means about a first axis and the other end portion of the coupling means is rotatably coupled to the vehicle body about a second axis. Also, any one of the two axes is set to a roll axis extending in the vehicle longitudinal direction of the vehicle body and intersecting a vehicle widthwise center of the vehicle body and the other axis is set to a pitch axis extending in the vehicle widthwise direction of the vehicle body. Because of this, the vehicle does not have impaired vehicle ride comfort by allowing the vehicle body to be inclined as less as possible when any one of the pair of left and right wheels goes on a projection on a traveling road surface.

According to the twenty-first aspect, one end portion of the coupling means is positioned upwardly of the other end portion of the coupling means. Thus, when an upward impact load is imposed on the one end portion of the coupling means, the other end portion of the coupling means can smoothly rotate about the vehicle widthwise pitch axis. As a result, even if the wheel goes on a projection on a traveling road surface and the wheel support means is pushed up such that the pushing-up force spreads to the coupling means, the coupling means can smoothly rotate about the vehicle widthwise pitch axis. This can suitably prevent the impact from spreading to the vehicle body.

According to the twenty-second aspect, the battery is supported by the vehicle body such that the center of gravity of the battery is positioned lower than the roll axis in the vehicle longitudinal direction when the wheel support means rotates. Thus, the center of gravity of the vehicle is kept low.

This enables the vehicle to stay under stable stop conditions even if the position of the center of gravity of the vehicle having an occupant is shifted when the occupant gets on and off the vehicle. Further, this can also prevent the vehicle body from being tilted outwardly in the turning direction due to centrifugal force imposed on the battery when the vehicle turns.

According to the twenty-third aspect, the batteries are disposed apart from one another on both left and right direction sides of the vehicle body while the vehicle body center line is sandwiched therebetween. Thus, a cabin space and each battery are compatible when compared with when the batteries are centralized and disposed in a space near the vehicle body center line, which space provides the cabin space for an occupant. This makes it possible for the cabin space to be positioned at a lower position. Further, the batteries are disposed apart from one another in a vehicle widthwise direction relative to the vehicle body center line. This configuration can increase the moment of inertia about the roll axis in the vehicle longitudinal direction, thereby preventing the vehicle body from rolling about the roll axis in the vehicle longitudinal direction.

According to the twenty-fourth aspect, a coupling between the coupling means and the vehicle body and/or a coupling between the coupling means and the wheel support means are mediated by an elastic member. This can effectively prevent the traveling road surface roughness-derived vibrations from spreading from the wheel, via the wheel support means and the coupling means, to the vehicle body. On top of that, the vibration-proof structure can be constructed using a small number of components and thus simplified.

According to the twenty-fifth aspect, regarding the coupling between the coupling means and the vehicle body and/or the coupling between the coupling means and the wheel support means, component members at a site of the coupling are fit for each other with a space and the space is filled with the elastic member for the coupling. Accordingly, when the traveling road surface roughness-derived vibrations spread from the wheel to the wheel support means, the vibrations are converted to, for example, shear force and/or compressive force, and are given to the elastic member. As a result, the elastic member is subject to appropriate elastic deformation, thereby capable of effectively reducing the shock.

According to the twenty-sixth aspect, the coupling means has a bent portion between one end portion and the other end portion thereof. Thus, when an excessive compression load is imposed on the coupling means, the bent portion is bent and is likely to be subject to plastic deformation. Because of this, when a collision between the wheel and an obstacle results in the excessive compression load on the coupling means from the wheel support means, the bent portion of the coupling means is bent and is subject to plastic deformation. Consequently, the above can decrease damage to the vehicle body.

According to the twenty-seventh aspect, the wheel support means includes the linkage mechanism that can mechanically interlock the wheels and can relatively displace the wheels vertically in opposite directions with respect to the vehicle body. Thus, when the linkage mechanism is actuated, the wheels can be displaced relatively to one another vertically in opposite directions and the vehicle body can be tilted without allowing rotation of the wheel support means with respect to the coupling means about the roll axis in the vehicle longitudinal direction. Because of this, even if the wheel support means rotates, in response to the traveling road surface roughness, about the roll axis in the vehicle longitudinal direction, the movement of the linkage mechanism allows the vehicle body to be reliably tilted regardless of the rotation.

According to the twenty-eighth aspect, the wheel support means is further supported by the vehicle body by means of the elastic means. This configuration can further effectively resist the traveling road surface roughness-derived external force that is given from the wheel to the wheel support means.

According to the twenty-ninth aspect, the single elastic means is used to resist rotation of the wheel support means with respect to the coupling means about the roll axis. Consequently, the anti-rotation structure can be constructed using a small number of components and thus simplified.

According to the thirtieth aspect, the front-wheel-side coupling means for coupling the vehicle body to the front-wheel-side wheel support means that supports the pair of left and right front wheels and the rear-wheel-side coupling means for coupling the vehicle body to the rear-wheel-side wheel support means that supports the pair of left and right rear wheels are each disposed on the vehicle body center line extending in the vehicle longitudinal direction of the vehicle body and intersecting a vehicle widthwise center of the vehicle body. Consequently, the structure that couples the wheels and the vehicle body can be constructed using a small number of components and thus simplified.

In addition, regarding both the front wheel side and the rear wheel side, one end portion of the coupling means and the wheel support means are rotatably coupled about a pivot shaft and the other end portion of the coupling means and the vehicle body are rotatably coupled about another pivot shaft. Also, any one of the pivot shafts at both end portions of the coupling means is set to a roll axis extending in the vehicle longitudinal direction of the vehicle body and intersecting a vehicle widthwise center of the vehicle body and the other pivot shaft is set to a pitch axis extending in the vehicle widthwise direction of the vehicle body. Because of this, the vehicle does not have impaired vehicle ride comfort by allowing the vehicle body to be inclined as less as possible when any one of the pair of left and right wheels, which are the front-wheel-side wheels and/or the rear-wheel-side wheels, goes on a projection on a traveling road surface.

Further, a longitudinal intermediate portion of elastic means continuously extending in the vehicle longitudinal direction of the vehicle body is supported by the vehicle body. The front-wheel-side wheel support means is supported by a front end portion of the elastic means. The rear-wheel-side wheel support means is supported by a rear end portion of the elastic means. Accordingly, the front-wheel-side and rear-wheel-side wheel support means are supported by the common elastic means. As a result, the structure that supports the vehicle body by means of each wheel support means can be constructed using a small number of components and thus simplified.

According to the thirty-first aspect, the elastic means is fixed to the vehicle body at two positions disposed on an intermediate portion in the vehicle longitudinal direction and the two sites are apart from each other with a certain distance. Thus, when the front end portion side of the elastic means is displaced either upwardly or downwardly, the rear end portion side is also displaced toward the same direction in response to the former displacement. Meanwhile, when the traveling road surface roughness-derived vibrations spread from the front wheel to the front-wheel-side wheel support means, this wheel support means may be relatively displaced either upwardly or downwardly with respect to the vehicle body. In this case, the above configuration allows the front end portion side of the elastic means to be bent toward the same direction and the rear end portion side to be bent toward the same direction. Because the rear-wheel-side wheel support means is relatively displaced in the same direction with respect to the vehicle body, the vehicle body is shifted in parallel toward the same direction without shaking in the vehicle longitudinal direction. This configuration avoids a loss of the ride comfort.

BRIEF DESCRIPTION OF DRAWINGS

FIG. 22 is part of flow charts illustrating the specifics of the control executed by the control unit.

FIG. 23 is part of flow charts illustrating the specifics of the control executed by the control unit.

FIG. 24 is maps used to calculate the difference in requirement torque between the front wheels and the rear wheels.

FIG. 25 is schematic diagrams illustrating how the requirement torque is applied to each of the front and rear wheels.

FIG. 31 is schematic diagrams illustrating the rear-wheel-side of a vehicle according to the second Modification Embodiment of the present invention.

DESCRIPTION OF EMBODIMENTS

Figure 1:
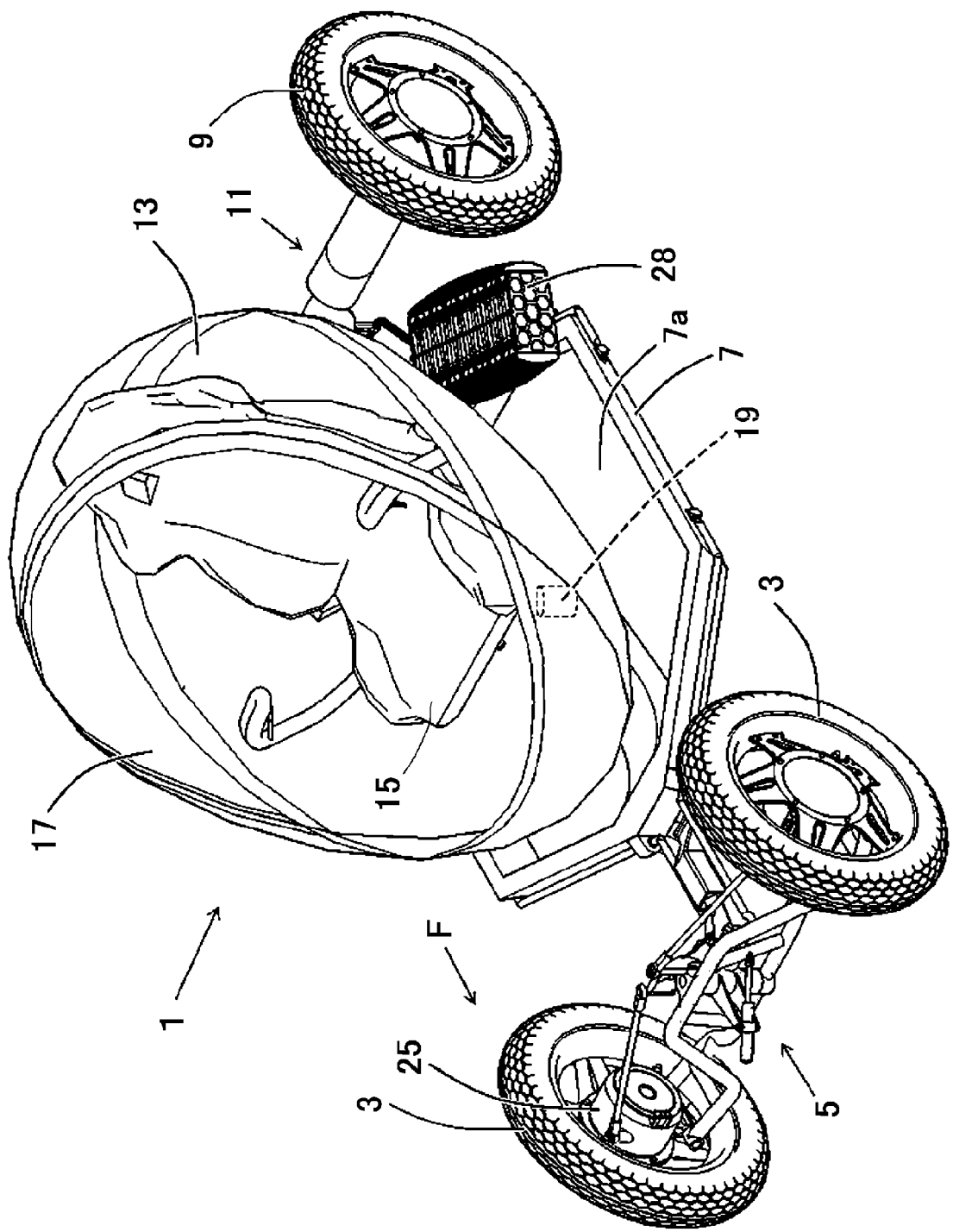
FIG. 1 is a general view of a vehicle according to an Embodiment of the present invention when the vehicle is seen from the upper front.
Figure 2:
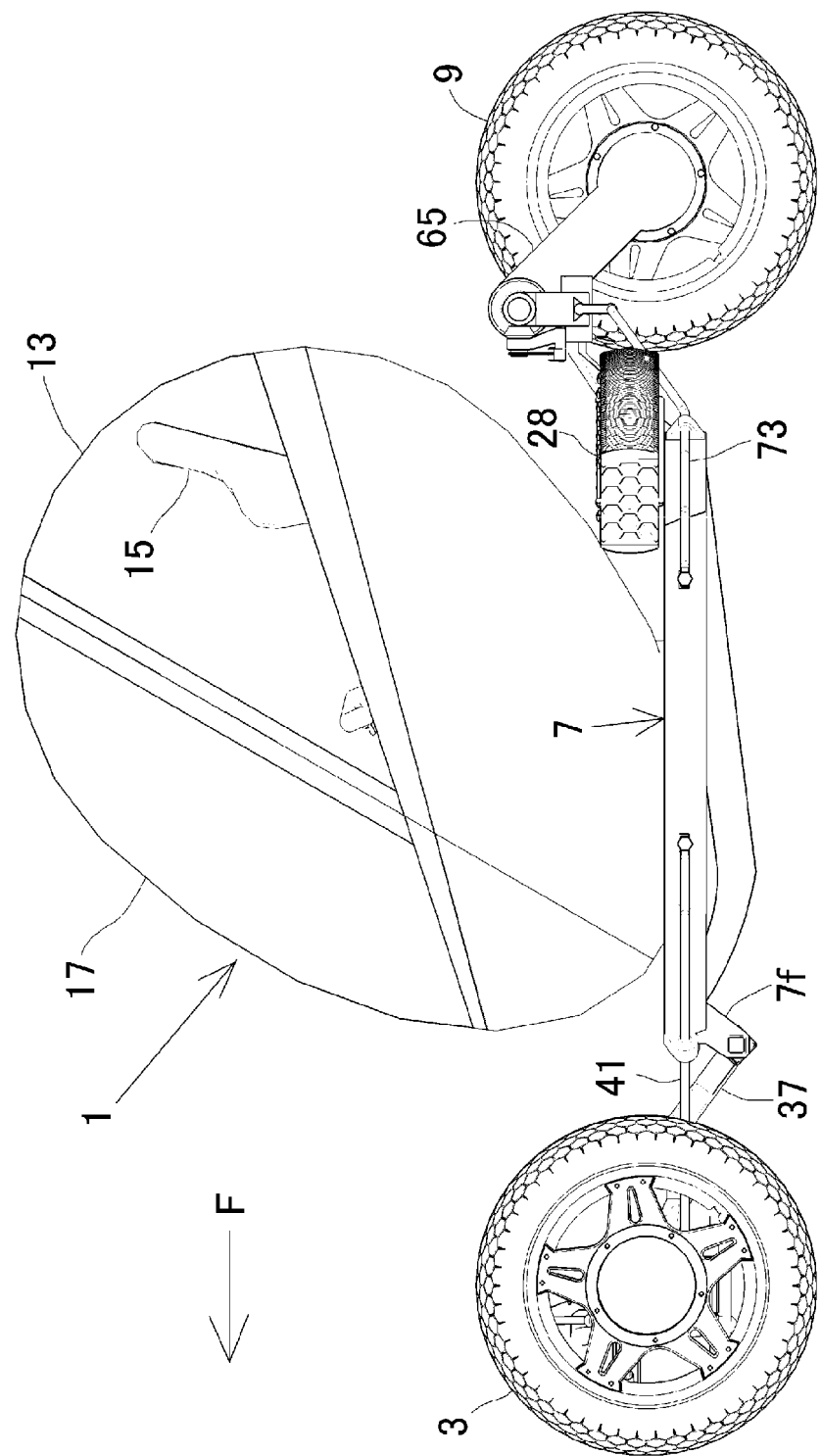
FIG. 2 is an outline view of the vehicle when viewed from a left side.

Hereinafter, embodiments of the present invention will be explained in detail by referring to FIGS. 1 to 25. In FIG. 1, reference sign 1 denotes a vehicle according to an Embodiment of the present invention. The arrows F in FIGS. 1, 2, 4 to 6, 13, 17, and 18 denote a front direction of the vehicle 1. As used herein, the wording "front-rear, left-right, above-bottom, and inwardly-outwardly" regarding component members of the vehicle 1 refers to the directions and the positions of the vehicle 1 under a state in which the component members are assembled when viewed by an occupant riding on the vehicle 1. In a front portion of the vehicle 1, a pair of left and right front wheels (3 and 3) are suspended using a front-side suspension apparatus 5 and are made movable with respect to a vehicle body frame 7. In a rear portion of the vehicle 1, a pair of left and right rear wheels (9 and 9) are suspended using a rear-side suspension apparatus 11 and are made movable with respect to the vehicle body frame 7. Each front wheel 3 and each rear wheel 9 correspond to "wheels" according to the present invention.

The vehicle body frame 7 is formed like a substantially hexagonal frame when viewed from the above. A bottom plate 7a that has a shape substantially similar to the vehicle body frame 7 and is hexagonal is fixed, by welding or fastening using a screw, to the bottom surface of the vehicle body frame 7. The vehicle body frame 7 and the bottom plate 7a correspond to a "vehicle body" according to the present invention. The skeleton of the vehicle body frame 7 is formed using hollow tubes with a square cross section. A substantially spherical cabin 13 that provides a riding space for an occupant is mounted on the center of the bottom plate 7a. The inside of this cabin 13 has a seat 15 for seating the occupant. A transparent body 17 is attached to a front portion of the cabin 13.

A lower surface portion of the cabin 13 is supported by a support shaft 19 (see FIG. 1) that is disposed at or near the center of the bottom plate 7a and extends vertically. The cabin 13 can rotate about the axis of the support shaft 19. A lower surface portion of the seat 15 is fixed to a bottom surface portion of the cabin 13. A substantially U-shaped steering yoke 20 is rotatably supported, on the bottom surface portion of the cabin 13, about the axis of a steering yoke shaft 20a (see FIG. 6) that is disposed at a longitudinal center portion of the steering yoke and extends in a substantially vertical direction. The steering yoke 20 originates from a portion below the seat 15, passes through both left and right lateral sides of the seat 15, and extends to a position above the sitting surface of the seat 15. Then, the steering yoke 20 turns inwardly and extends. Both end portions of the extension are each bent like a fold. In addition, a left lateral end portion of the steering yoke 20 is provided with a brake operator 21. Also, a right lateral end portion of the steering yoke 20 is provided with an acceleration operator 22 (see FIG. 5).

Figure 17:
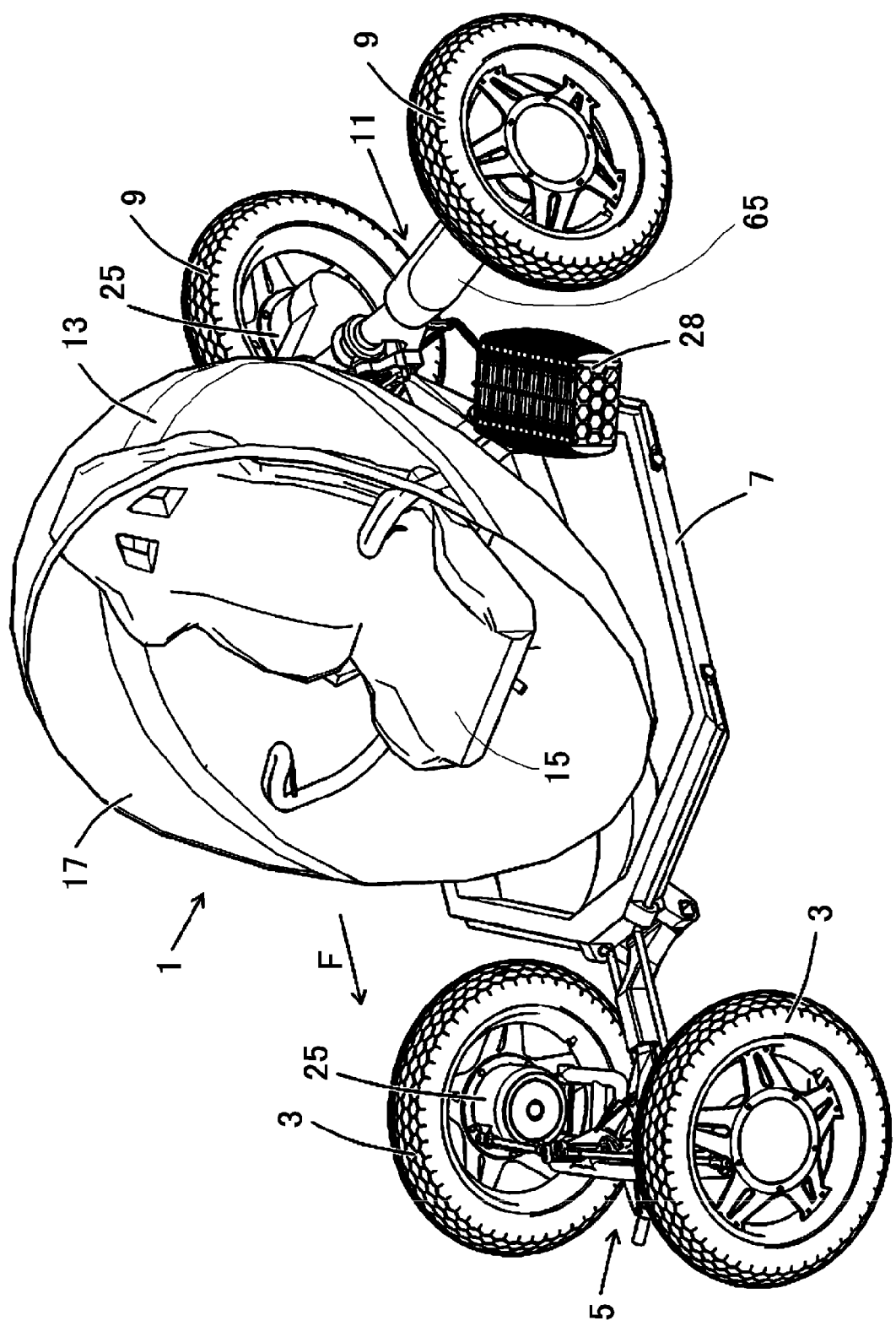
FIG. 17 is an outline view of the vehicle of FIG. 1 in which the seat and the steering yoke as well as the cabin are turned counterclockwise and the front wheels are directed toward the right side. This outline view is seen from the upper front.

The occupant who has been seated on the seat 15 in the cabin 13 can rotate the steering yoke 20 about the axis of the support shaft 19 by grasping, using the left and right hands, both end portions of the steering yoke 20, and can operate the brake operator 21 or the acceleration operator 22 by using the left or right hand. As shown in FIG. 17, the seat 15 and the steering yoke 20 as well as the cabin 13 may be rotated counterclockwise about the axis of the support shaft 19. In this case, an enough space for the occupant to get on and off the cabin 13 is kept on the left lateral side of the vehicle 1. This makes it easier to get on and off the cabin. In addition, if the front wheels (3 and 3) are turned to the right side, the space further increases. This makes it further easier to get on and off the cabin.

A hub 23 corresponding to each of the front wheels 3 and the rear wheels 9 is fixed to one end portion of a rotation shaft of an electric motor 25, which rotation shaft is used to individually rotate and drive each of the front wheels 3 and the rear wheels 9. The other end portion of the rotation shaft of the electric motor 25 is fixed to a brake disk 26 (see FIG. 11). Each front wheel 3 and each rear wheel 9 include what is called a wheel-in motor structure. The brake disk 26 is subject to braking by means of an electric brake motor 27 that is fixed to the main body of the electric motor 25. The electric motor 25 and the electric brake motor 27 corresponds to "torque-applying means" according to the present invention. Each rear wheel 9 side is also provided with the brake disk 26 and the electric brake motor 27, which are included in a main body 65a of a wheel holding member 65 described below. The "torque" as used herein includes: drive torque that is given to each front wheel 3 and each rear wheel 9 by the electric motor 25; and brake torque that is given to each front wheel 3 and each rear wheel 9 by the electric brake motor 27. When electricity is supplied to the electric brake motor 27, the motor 27 rotates about its rotation shaft. Then, a cam member attached to the rotation shaft applies pressure to the brake pad, so that the brake pad is made to contact the brake disk 26 under pressure. Each electric motor 25 receives electric power from a pair of left and right rectangular parallelepiped batteries (28 and 28) disposed on rear portions of the vehicle body frame 7 behind the cabin 13. The batteries 28 are connected using electric cables to an electric power converter 30 (see FIG. 20). Meanwhile, when electrical energy is given, each electric motor 25 works as a driving motor.

Figure 8:
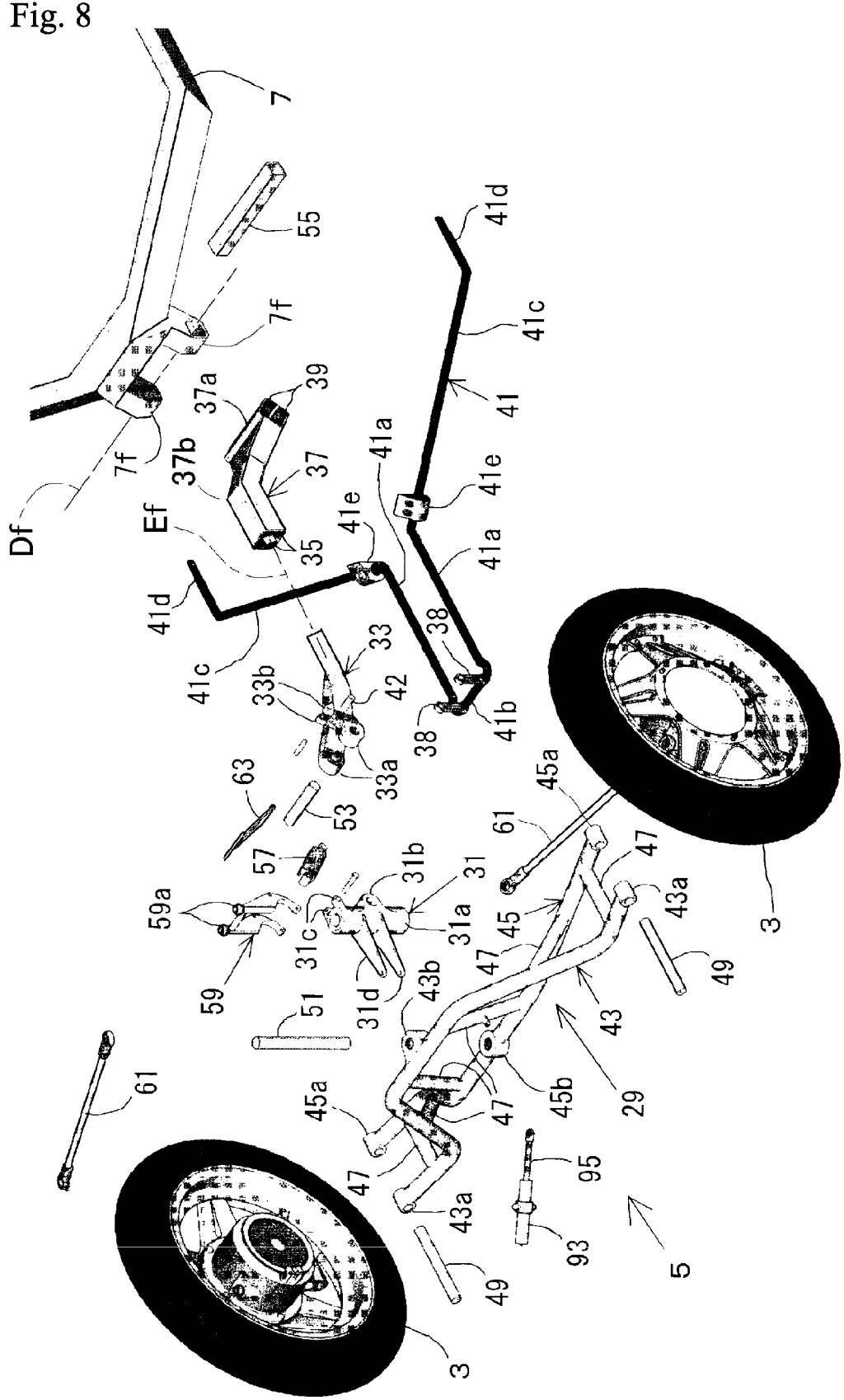
FIG. 8 is an exploded view illustrating a state in which a front-side portion of the vehicle is disintegrated. This exploded view is seen from the upper front.
Figure 9:
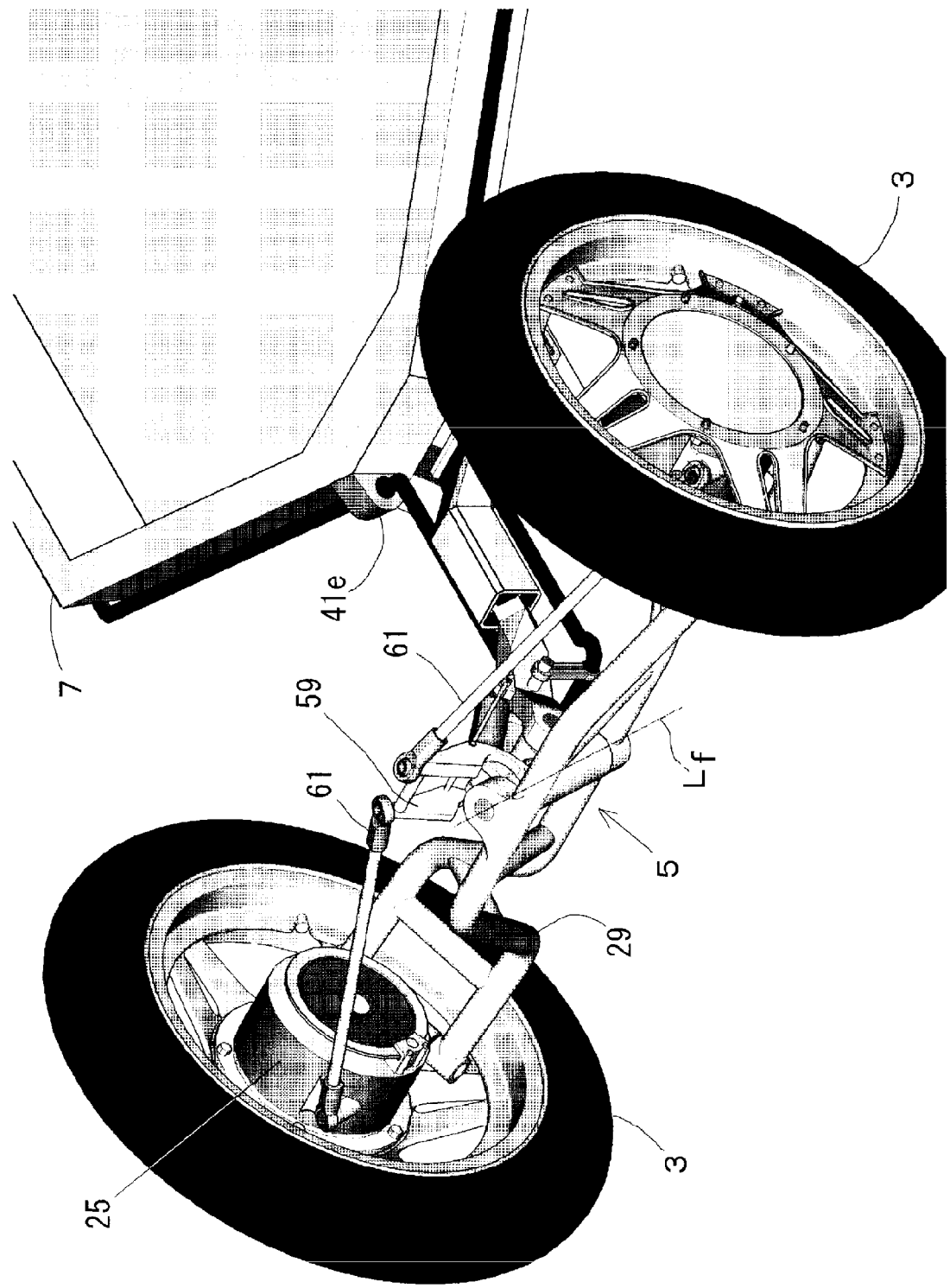
FIG. 9 is an enlarged outline view illustrating a state in which some parts have been removed from the front-side portion of the vehicle. This enlarged outline view is seen from the upper front.
Figure 10:
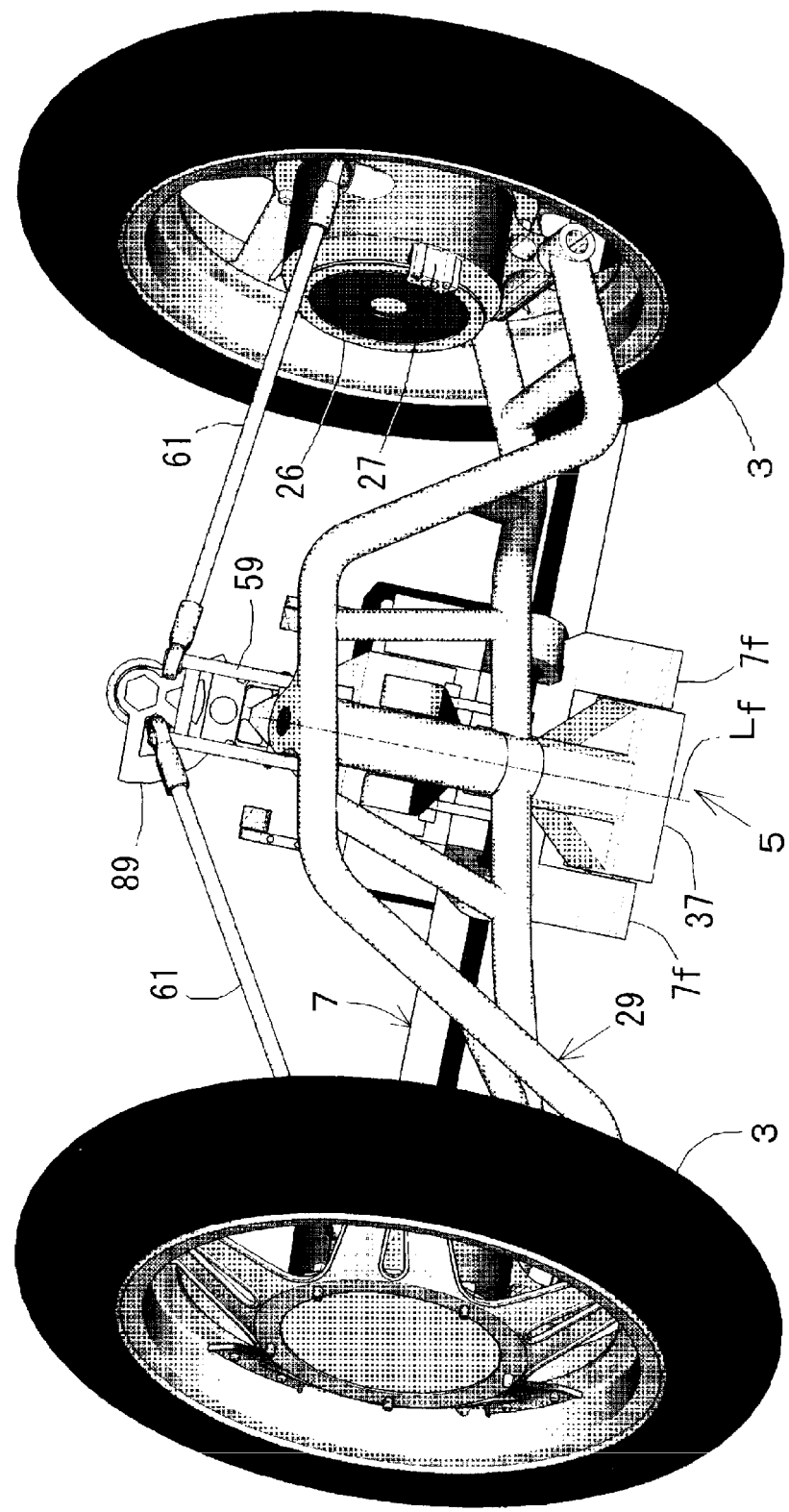
FIG. 10 is an enlarged outline view illustrating a state in which the front wheels of the front-side portion of the vehicle are displaced with respect to the vehicle body. This enlarged outline view is seen from the front.
Figure 11:
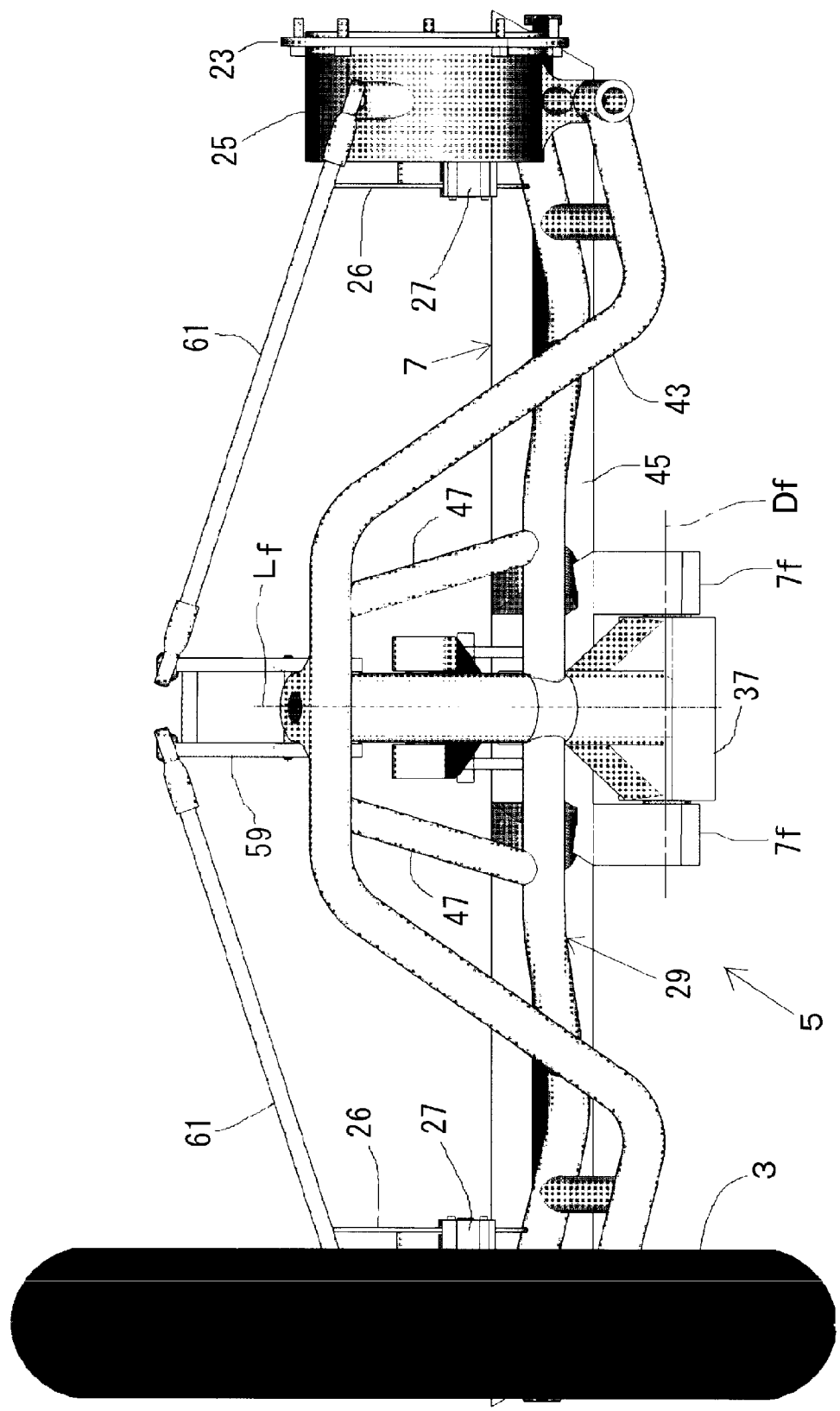
FIG. 11 is an enlarged outline view illustrating a state in which the left-side front wheel has been removed from the front-side portion of the vehicle. This enlarged outline view is seen from the front.
Figure 12:
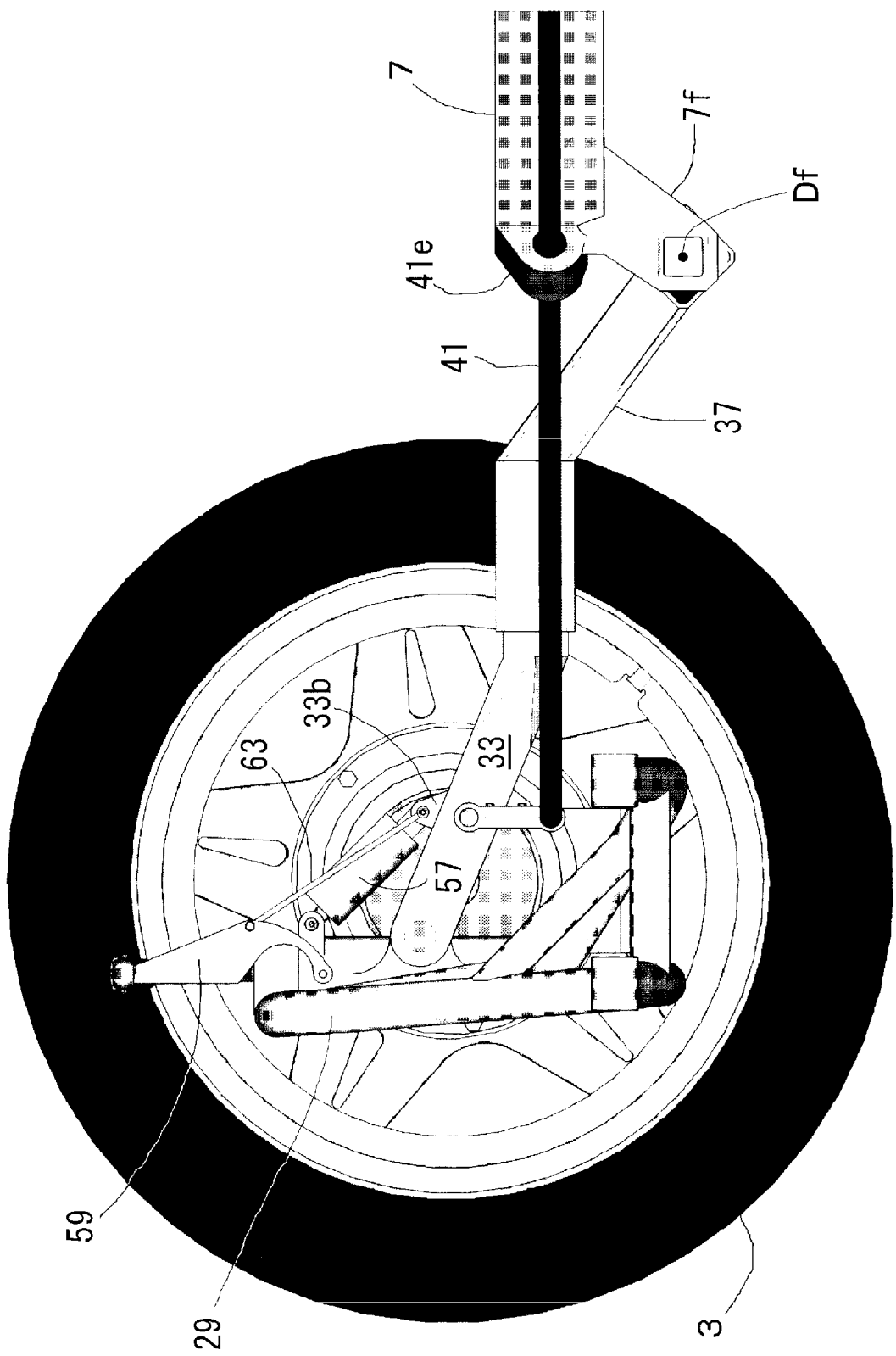
FIG. 12 is an enlarged outline view illustrating a state in which the left-side front wheel has been removed from the front-side portion of the vehicle. This enlarged outline view is seen from a left side.

As shown in FIG. 8, the front-side suspension apparatus 5 includes: a front wheel support member 29 coupled at both ends thereof to front wheels 3, the member allowing movement of each front wheel in a direction toward which the camber angle of each front wheel 3 is changed; a first center support member 31 that rotatably supports a longitudinal center portion of this front wheel support member 29; a substantially Y-shaped second center support member 33 that rotatably supports, using a front end portion thereof, a longitudinal center portion of this first center support member 31; a third center support member 37 that supports, via an elastic member 35, a rear end portion of this second center support member 33; and a front-side torsion spring member 41 that supports, using a pair of shackles (38 and 38), a longitudinal center portion of the second center support member 33. The first center support member 31 and the second center support member 33 correspond to a "base member" according to the present invention. The third center support member 37 corresponds to the "base member" and "coupling means" according to the present invention. The respective first center support member 31, second center support member 33, and third center support member 37 are arranged on a virtual straight line Lc (see FIG. 7) extending in the vehicle longitudinal direction of the vehicle body frame 7 and intersecting a vehicle widthwise center of the vehicle body frame 7 when viewed from the above. The virtual straight line Lc corresponds to a "vehicle body center line" according to the present invention.

A rear end portion of the third center support member 37 is supported, using an elastic member 39 made of rubber or resin material, etc., by a pair of front-side support parts (7f and 7f) that are attached to a front end portion of the vehicle body frame 7 and protrude in a lower front direction. The elastic member 39 and the front-side torsion spring member 41 correspond to "elastic means" according to the present invention. The front-side torsion spring member 41 is produced by subjecting a single rodlike member to bending to have symmetry in the vehicle widthwise direction, and includes: a pair of parallel parts (41a and 41a) extending, in parallel, in the vehicle longitudinal direction and having therebetween a widthwise space larger than the vehicle widthwise width of the second center support member 33; a connecting part 41b that connects both front ends of the parallel parts 41a; obliquely extending parts 41c that extend from the rear end of each parallel part 41a and are arranged along a front portion of the vehicle body frame 7, but extend obliquely rearward with a certain distance from the vehicle body frame 7; and rear extending parts 41d, each further extending rearwardly from the rear end of each obliquely extending part 41c.

Regarding the front-side torsion spring member 41, an end portion of each connecting part 41b is rotatably connected to a lower end portion of each of the pair of shackles (38 and 38). A front end portion of each obliquely extending part 41c and a rear end portion of each rear extending part 41d are supported, using support parts 41e, by front portions of the vehicle body frame 7. Upper end portions of the pair of shackles (38 and 38) are rotatably coupled to a pair of left and right pins (42 and 42) that are vehicle widthwise projections disposed at a longitudinal center portion of the second center support member 33. This imparts an initial load to the front-side suspension apparatus 5. Also, when the front wheels 3 are displaced vertically in the same direction or opposite directions with respect to the vehicle body frame 7, the second center support member 33 moves vertically by means of the front wheel support member 29 and the first center support member 31. In addition, during the rotation about a vehicle longitudinal virtual straight line Ef, the front-side torsion spring member 41 exerts spring force due to bending and/or torsion thereof so as to resist the rotation motion. Here, the front-side torsion spring member 41 in addition to the elastic members 35 and 39 are used to elastically support the second center support member 33. This configuration can further effectively resist the traveling road surface roughness-derived external force that is given from the wheel 3 via the front wheel support member 29, etc., to the second center support member 33. The single front-side torsion spring member 41 is used to resist the rotation of the second center support member 33 with respect to the third center support member 37 about the below-described virtual straight line Ef. Consequently, the anti-rotation structure can be constructed using a small number of components and thus simplified.

The front wheel support member 29 includes: a first pipe member 43, a center portion thereof being bent and convex upward when viewed from the front of the vehicle 1, both end portions thereof extending in the vehicle widthwise direction; a second pipe member 45, a center portion thereof being bent and convex forward, both end portions thereof extending in the vehicle widthwise direction; and six connecting pipe members 47 for connecting both the pipe members 43 and 45 by welding to make them one piece. The first pipe member 43 is positioned forwardly of the second pipe member 45. A lower portion of the electric motor 25 is fit between a first boss portion 43a attached to each of both ends of the first pipe member 43 and a first boss portion 45a attached to each of both ends of the second pipe member 45. A camber shaft 49 is inserted into shaft holes created in each of the lower portion of the electric motor 25 and both the first boss portions 43a and 45a. This configuration allows the front wheels 3 to be coupled with both the ends of front wheel support member 29 and to rotate about the axis of the camber shaft 49 in a direction toward which the camber angle is changed.

Both the pipe members 43 and 45 of the front wheel support member 29 have second boss portions 43b and 45b, respectively, disposed in a longitudinal middle portion thereof. The first center support member 31 is fit between these second boss portions 43b and 45b such that both longitudinal end surfaces of the first center support member 31 face the second boss portions. A steering shaft member 51 is inserted into shaft holes created in both the second boss portions 43b and 45b. An upper end portion and a lower end portion of the steering shaft member 51 is fixed to both the second boss portions 43b and 45b, respectively. This configuration allows the front wheel support member 29 to be rotatably supported about the axis of the steering shaft member 51. The front wheel support member 29 and the camber shaft 49 correspond to a "wheel support member" according to the present invention. The front wheel support member 29, the first center support member 31, the second center support member 33, and the camber shaft 49 correspond to "wheel support means" according to the present invention. The front wheel support member 29, the first center support member 31, the camber shaft 49, and the steering shaft member 51 correspond to a "linkage mechanism" according to the present invention.

The first center support member 31 is provided with a substantially cylindrical main body 31a thereof. The main body 31a has a boss portion 31b at a longitudinal center rear portion. Meanwhile, a front end portion of the second center support member 33 has a pair of boss portions 33a. A boss portion 31b of the first center support member 31 is fit between the boss portions 33a. A pivot shaft 53 is inserted into shaft holes created in the boss portions 31b and 33a. This configuration allows the first center support member 31 to be rotatably supported by the second center support member 33 about the axis of the pivot shaft 53.

A rear end portion of the second center support member 33 has a substantially square cross-section. A front end portion of the third center support member 37 is formed like a tube and has a substantially square cross-section larger than that of the second center support member 33. The rear end portion of the second center support member 33 is inserted into the front end portion of the third center support member 37. The difference between the rotation angles of the cross-section shapes (substantially square shapes) with respect to the axis in the insertion direction (the vehicle longitudinal direction) is 45 degrees. A gap between the members 33 and 37 is filled with an elastic member 35 made of rubber material or resin material. The elastic member 35 is attached by press fitting, glazing, or bonding using an adhesive.

Specifically, both the support members 33 and 37 are fit with a gap, and the gap is filled with the elastic member 35. In this way, both the support members 33 and 37 are coupled. This is what is called a "Neidhart rubber structure", and is adopted. This structure absorbs vibrations of the front-side suspension apparatus 5 in the roll direction of the vehicle 1. In addition, the front end portion of the second center support member 33 can be relatively displaced (rotated) while resisting to the elastic force due to bending of the elastic member 35 not only in each of the vehicle widthwise and vertical directions relative to the third center support member 37, but also in the torsion direction about the axis along a virtual straight line Ef (see FIG. 8) extending in the insertion direction (the vehicle longitudinal direction). The virtual straight line Ef corresponds to a "second axis" and a "roll axis" according to the present invention.

Accordingly, when the traveling road surface roughness-derived vibrations spread from the front wheel 3 via the front wheel support member 29 and the first center support member 31 to the second center support member 33, shear force and/or compressive force, etc., are given to the elastic member 35. As a result, the elastic member 35 is subject to appropriate elastic deformation, thereby capable of effectively reducing the shock.

A tubular member 37a (see FIG. 8) that extends in the vehicle widthwise direction and has a substantially square cross-section is attached by welding to a rear end portion of the third center support member 37. Both left and right end surfaces of this tubular member 37a are fit between the front-side support parts 7f of the vehicle body frame 7. A support shaft 55 with a substantially square cross-section is inserted into the tubular member 37a and through-holes created in the respective front-side support parts 7f. The support shaft 55 is composed of a tubular member, is inserted into the through-holes of the respective front-side support parts 7f, and is fixed to each front-side support part 7f by fastening with a screw member (not shown). The cross-section of the tubular member 37a of the third center support member 37 is larger than that of the support shaft 55. The difference between the rotation angles of the cross-section shapes (substantially square shapes) with respect to the axis in the insertion direction (the vehicle widthwise direction) of the support shaft 55 is 90 degrees. A gap between the both is filled with an elastic member 39 made of rubber material or resin material. The elastic member 39 is attached by press fitting, glazing, or bonding using an adhesive.

Specifically, both the third center support member 37 and the support shaft 55 fixed to each front-side support part 7f of the vehicle body frame 7 are fit with a gap, and the gap is filled with the elastic member 39. In this way, the third center support member 37 is coupled to the vehicle body frame 7. This is what is called a "Neidhart rubber structure", and is adopted. This structure absorbs vibrations of the front-side suspension apparatus 5 in the pitch direction of the vehicle 1. In addition, the front end portion of the third center support member 37 can move vertically with respect to the vehicle body frame 7 while resisting to elastic force due to bending of the elastic member 39.

Accordingly, when the traveling road surface roughness-derived vibrations spread from the front wheel 3 via the front wheel support member 29, the first center support member 31, and the second center support member 33 to the third center support member 37, shear force and/or compressive force, etc., are given to the elastic member 39. As a result, the elastic member 39 is subject to appropriate elastic deformation, thereby capable of effectively reducing the shock. Specifically, the third center support member 37 can rotate about the axis of a virtual straight line Df (see FIGS. 8, 11, and 12) extending in the vehicle widthwise direction. The virtual straight line Df corresponds to a "first axis" and a "pitch axis" according to the present invention. In addition, the front wheel support member 29 supporting the pair of left and right front wheels (3 and 3), the first center support member 31, and the second center support member 33 are rotatably coupled to the front end portion of the third center support member 37 about the vehicle longitudinal virtual straight line Ef. Also, the rear end portion of the third center support member 37 is rotatably coupled to the vehicle body frame 7 about the vehicle widthwise virtual straight line Df. Consequently, the structure that couples the front wheels 3 and the vehicle body frame 7 can be constructed using a small number of components and thus simplified. Further, the vehicle 1 does not have impaired vehicle ride comfort by allowing the vehicle body frame 7 to be inclined as less as possible when any one of the pair of left and right front wheels (3 and 3) goes on a projection on a traveling road surface. Furthermore, the rear end portion of the third center support member 37 is rotatably coupled about the virtual straight line Df arranged along the front end portion, which extends in the vehicle widthwise direction, of the vehicle body frame 7. Accordingly, the distance between the front-side support parts (7f and 7f), which provide part of the coupling structure, can be made larger. In accordance with this, the length of the tubular member 37a of the third center support member 37 can be made longer. This enables the coupling structure to be tough and compact in the vehicle longitudinal direction.

Note that, in this Embodiment, the front end portion of the third center support member 37 is rotatably coupled to, for example, the front wheel support member 29 about the vehicle longitudinal virtual straight line Ef; and the rear end portion of the third center support member 37 is rotatably coupled to the vehicle body frame 7 about the virtual straight line Df in the vehicle widthwise direction. However, the front end portion of the third center support member 37 may be rotatably coupled to, for example, the front wheel support member 29 about the pitch axis in the vehicle widthwise direction; and the rear end portion of the third center support member 37 may be rotatably coupled to the vehicle body frame 7 about the roll axis in the vehicle longitudinal direction. According to this configuration, the structure that couples the front wheels 3 and the vehicle body frame 7 can also be constructed using a small number of components and thus simplified. Further, the vehicle 1 does not have impaired vehicle ride comfort by allowing the vehicle body frame 7 to be inclined as less as possible when any one of the pair of left and right front wheels 3 goes on a projection on a traveling road surface.

Meanwhile, the front wheels 3 may be displaced vertically by different amounts of displacement when each front wheel goes on a rough traveling road surface. In this case, the relatively small amount of displacement as obtained by averaging the vertical displacements is an amount of displacement at the vehicle widthwise center of the front wheel support member 29. By the way, the front wheel support member 29 is supported via the first center support member 31 and the second center support member 33 by the third center support member 37. These center support members (31, 33, and 37) are arranged on a virtual straight line Lc intersecting a vehicle widthwise center when viewed from the above. Accordingly, the front wheels 3 may be displaced vertically by different amounts of displacement. This causes a small amount of change corresponding to the average displacement at a vehicle widthwise center of the front wheel support member 29. Then, the second center support member 33 is displaced vertically by the small amount of change. For example, when the front wheels 3 are displaced to one another vertically in opposite directions by substantially the same amount of displacement, the average displacement in the vehicle widthwise center of the front wheel support member 29 approaches 0. As a result, the third center support member 37 rotates about the vehicle widthwise virtual straight line Df by a small rotation angle. Consequently, the amount of deformation of the elastic member 39 can be made smaller, so that the load imposed on the elastic member 39 can be small.

In addition, when the traveling road surface roughness-derived vibrations spread from the front wheel 3 via the front wheel support member 29, the first center support member 31, and the second center support member 33 to the third center support member 37, each elastic member (35 or 39) and the front-side torsion spring member 41 are subject to elastic deformation to disperse and absorb the vibrations. Hence, the load of each elastic member (35 or 39) and the load of the front-side torsion spring member 41 can be made smaller. Consequently, the maximum load imposed on each elastic member (35 or 39) and the front-side torsion spring member 41 can be set to a small value. In view of the above, these members can be made small and lightweight.

In addition, the traveling road surface roughness-derived vibrations spread from the front wheel 3 via the front wheel support member 29, the first center support member 31, and the second center support member 33 to the third center support member 37. Consequently, the vibration travel path is long. This results in a decreased specific frequency of the structure. Hence, it is possible to reduce noise caused by the vibrations of the front wheel support member 29, etc., thereby improving the ride comfort of the vehicle 1.

Note that the coupling between the second center support member 33 and the third center support member 37 and the coupling between the third center support member 37 and each front-side support part 7f of the vehicle body frame 7 are mediated by the elastic members 35 and 39, respectively. Any one of the couplings may be mediated by a rotatable bearing and the other coupling may be mediated by an elastic member. This configuration allows at least one coupling to be mediated by the elastic member. Accordingly, elastic deformation of the elastic member can effectively prevent the traveling road surface roughness-derived vibrations from spreading from the front wheel 3 via the front wheel support member 29, etc., to the vehicle body frame 7. On top of that, the vibration-proof structure can be constructed using a small number of components and thus simplified.

In addition, the front end portion of the third center support member 37 is positioned upwardly of the rear end portion thereof. Because of this, when a compression shock load is applied, from the forward and horizontal side, on the front end portion of the third center support member 37, the action point of the load is positioned upwardly of the vehicle widthwise virtual straight line Df about which the rear end portion of the third center support member 37 rotates. Thus, the third center support member 37 can smoothly rotate about the virtual straight line Df. For example, the front wheel 3 may go on a projection on a traveling road surface, the front wheel support member 29 may be pushed up, and the upward force may spread to the third center support member 37. Even in this case, the third center support member 37 can smoothly rotate about the virtual straight line Df. This can suitably prevent the shock from spreading to the vehicle body frame 7.

In addition, the third center support member 37 has the bent portion 37b (see FIG. 8) between the front end portion and the rear end portion thereof. Thus, when an excessive compression load is imposed on the third center support member 37 in the vehicle longitudinal direction, the bent portion 37b is bent and is likely to be subject to plastic deformation. Because of this, when a collision between the front wheel 3 and an obstacle results in the excessive compression load on the third center support member 37, which load is mediated through the front wheel support member 29, the first center support member 31, and the second center support member 33, the bent portion 37b of the third center support member 37 is bent and is subject to plastic deformation. This can decrease damage to the vehicle body frame 7.

An upper rear end portion of a main body 31a of the first center support member 31 has a pair of left and right boss portions (31c and 31c). An upper portion of a vehicle longitudinal intermediate section of the second center support member 33 has a pair of left and right boss portions (33b and 33b). A pin is press-fit into each of pin holes created in the boss portions (31c or 33b). Both end portions of an electric actuator 57, which can stretch and shrink, are connected to these pins. The electric actuator 57 includes a stepping motor. By appropriately adjusting a supply current, the distance between both the end portions of the electric actuator 57 can be controlled. This results in a change in the distance between the boss portions 31c and 33b. Accordingly, this makes it possible to alter the front-to-rear tilt angle of the main body 31a of the first center support member 31 as well as the front-to-rear tilt angle (i.e., caster angle) of the virtual straight line Lf (see FIGS. 9 to 11) corresponding to the axis of the steering shaft member 51. This caster angle may be altered in response to the running speed of the vehicle 1. For example, as the running speed increases, the caster angle is tilted more forwardly. This can enhance the straight-traveling stability. By contrast, as the running speed decreases, the caster angle is directed more vertical. This makes it easier for each front wheel 3 to be steered. The first center support member 31, the second center support member 33, the pivot shaft 53, and the electric actuator 57 correspond to "caster angle adjusting means". The virtual straight line Lf corresponds to a "steering axis" according to the present invention. Note that in this Embodiment, the electric actuator 57 includes a stepping motor. However, instead of using the stepping motor, a hydraulic cylinder, which can be stretched and shrunk by appropriately changing oil pressure, may be used.

A lower portion of the first link member 59 is rotatably connected to and sandwiches left and right sites that are positioned on left and right lateral sides of an upper end portion of the main body 31a of the first center support member 31 and are positioned forwardly of the boss portion 31c. First and second ends of each rodlike camber link member (61, 61) are rotatably connected to each of left and right connecting parts (59a and 59a) disposed on an upper end portion of the first link member 59 and an upper front portion of the electric motor 25 for each front wheel 3, respectively. A pin is press-fit into a pinhole of a vertical intermediate portion of the first link member 59 and a pin is press-fit into pinholes of the boss portions 33b of the second center support member 33. Both end portions of the second link member 63 are rotatably connected to the respective pins (see FIGS. 8 and 12). The second link member 63 is formed like a frame. The electric actuator 57 is positioned inside the frame. When viewed from the side, the two structures partially overlap (see FIG. 12). This configuration enables the electric actuator 57 and the second link member 63 to work without interfering with each other and to be arranged compact. The front wheel support member 29, the first center support member 31, each camber shaft 49, the steering shaft member 51, the first link member 59, and each camber link member 61 correspond to a "camber angle adjusting means" according to the present invention.

While the steering shaft member 51 is tilted forwardly, the difference in torque applied between the front wheels 3 causes the front wheel support member 29 to rotate about the axis of the steering shaft member 51. The amount and rotation speed increases as the difference in the torque between the front wheels 3 becomes larger. The difference in the torque between the front wheels 3 may occur when there is a difference in given drive torque between the front wheels 3. Also, the difference may occur when drive torque is given to one front wheel 3 and brake torque is given to the other front wheel 3. In such a situation, the difference in torque can be enlarged.

In addition, as described below, the difference in torque applied between the rear wheels 9 causes each wheel holding member 65 to rotate about the axis of the swivel shaft 85, so that the wheel holding members 65 move vertically in opposite directions. In this case, the vehicle body frame 7 is tilted toward any one of the left and right directions. As a result, the difference in vertical load between the front wheels 3 causes the front wheel support member 29 to rotate about the axis of the steering shaft member 51. At this time, in order to offset the difference in vertical load between the front wheels 3, the front wheel support member 29 rotates about the axis of the steering shaft member 51 such that the front wheel 3 side having a relatively larger vertical load is displaced upwardly of the front wheel 3 side having a smaller vertical load.

In this way, either one of the difference in torque applied between the front wheels 3 and the difference in vertical load between the front wheels 3 may cause the front wheel support member 29 to rotate about the axis of the steering shaft member 51. In this case, this rotation is accompanied by a change in the camber angle of each front wheel 3.

In addition, the pivot allowing rotation of a lower end portion of the first link member 59 with respect to the first center support member main body 31a is positioned on a virtual straight line that penetrates through a junction between the camber link member 61 and the upper front portion of the electric motor 25 for the front wheel 3 and is perpendicular to the axis of the steering shaft member 51. This configuration enables the camber angle of each front wheel 3 to be subject to little change when the difference in torque applied between the front wheels 3 causes the front wheel support member 29 to rotate about the axis of the steering shaft member 51 while the steering shaft member 51 is not tilted further forwardly or when the vehicle longitudinal tilt angle of the steering shaft member 51 is altered while the front wheel support member 29 is not subject to rotation about the axis of the steering shaft member 51.

Figure 18:
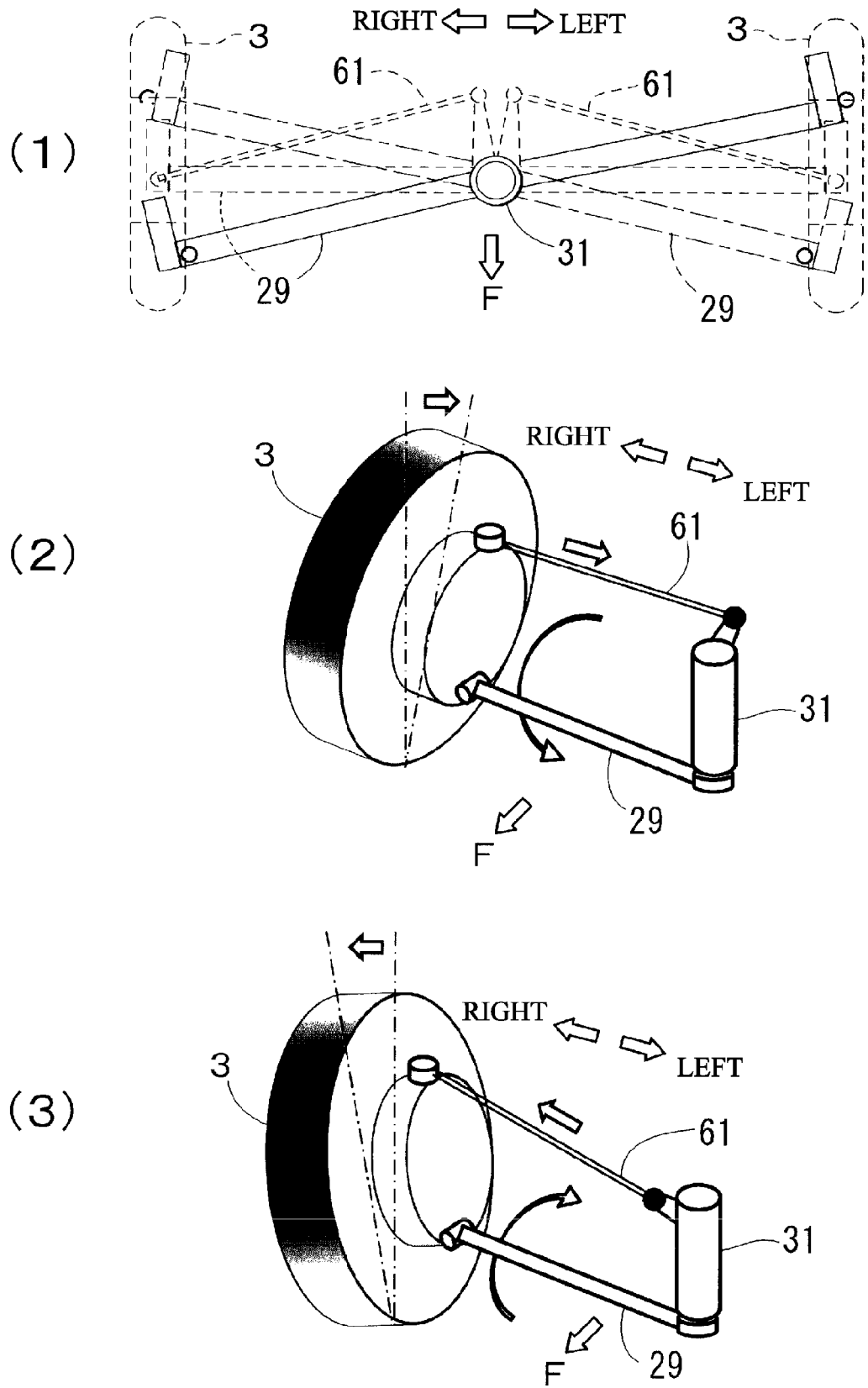
FIG. 18 is schematic diagrams illustrating how the camber angle of the front wheel of the vehicle is changed.

In FIG. 18(1), the dashed line indicates a state where the vehicle 1 travels straight. The solid line indicates a state where the front wheel support member 29 is rotated on the left side so as to turn the vehicle 1 on the left side. FIG. 18(2) shows a state where the front wheel support member 29 is rotated on the left side. The right front wheel 3 side is seen from the upper front. As is clear from this figure, the front wheel 3 is tilted toward the left side and the camber angle is changed. By contrast, the dashed-dotted line of FIG. 18(1) indicates a state where the front wheel support member 29 is rotated on the right side so as to turn the vehicle 1 on the right side. FIG. 18(3) shows a state where the front wheel support member 29 is rotated on the right side. The right front wheel 3 side is seen from the upper front. As is clear from this figure, the front wheel 3 is tilted toward the right side and the camber angle is changed. Note that instead of the structure of the camber angle adjusting means including the first link member 59 and the camber link member 61, the camber link member 61 may be replaced by a flexible electric actuator, both ends of which may be rotatably coupled via a universal joint to each of the front wheel support member 29 and the electric motor 25 for each front wheel 3. In such a configuration, the electric actuator can be made to stretch and shrink, which results in a change in the camber angle of the front wheel 3.

In addition, the position of the rotation center of the lower end portion of the first link member 59 and/or the coupling positions of both the end portions of the camber link member 61 may be appropriately set. In this case, a toe angle can be altered such that the front end of each front wheel 3 is directed more inwardly as the steering shaft member 51 is tilted forwardly while the front wheel support member 29 is not allowed to rotate about the axis of the steering shaft member 51.

Meanwhile, the rear-side suspension apparatus 11 includes: a pair of left and right wheel holding members (65 and 65), one end portion of which is fixed to an electric motor 25 for each rear wheel 9; a first center support member 67 that rotatably supports each wheel holding member 65 about the vehicle widthwise axis while the other ends of the wheel holding members 65 are placed face-to-face with an interval; a second center support member 69 that uses a rear end portion thereof to support a front end portion of this first center support member 67; and a rear-side torsion spring member 73 that supports, using a pair of shackles (71 and 71), a lower portion of the first center support member 67. The respective first center support member 67 and second center support member 69 are arranged on the virtual straight line Lc. Each wheel holding member 65 corresponds to a "wheel support member" according to the present invention. The first center support member 67 and the second center support member 69 correspond to a "base member" according to the present invention. In addition, each wheel holding member 65 and the first center support member 67 correspond to "wheel support means" according to the present invention. The second center support member 69 corresponds to "coupling means" according to the present invention. The pair of left and right wheel holding members (65 and 65) can rotate about a virtual straight line Lr1 by degrees within substantially the same vertical angle (e.g., about 45 degrees) relative to a neutral position defined as a state of being inclined by about 45 degrees with respect to a traveling road surface R while the wheel holding members 65 are positioned lower as the members each extend rearwardly in a longitudinal direction far from the virtual straight line Lr1 along the axis of the swivel shaft 85. The neutral position is referred to as the angle position of the wheel holding member 65 when the vehicle 1 is stopped on a leveled flat road surface while an occupant is being seated. Thus, in order to absorb traveling road surface R roughness-derived vibrations that spread form each rear wheel 9 to the wheel holding members 65, the movement range of each wheel holding member 65 can be set to a preferable range.

Figure 13:
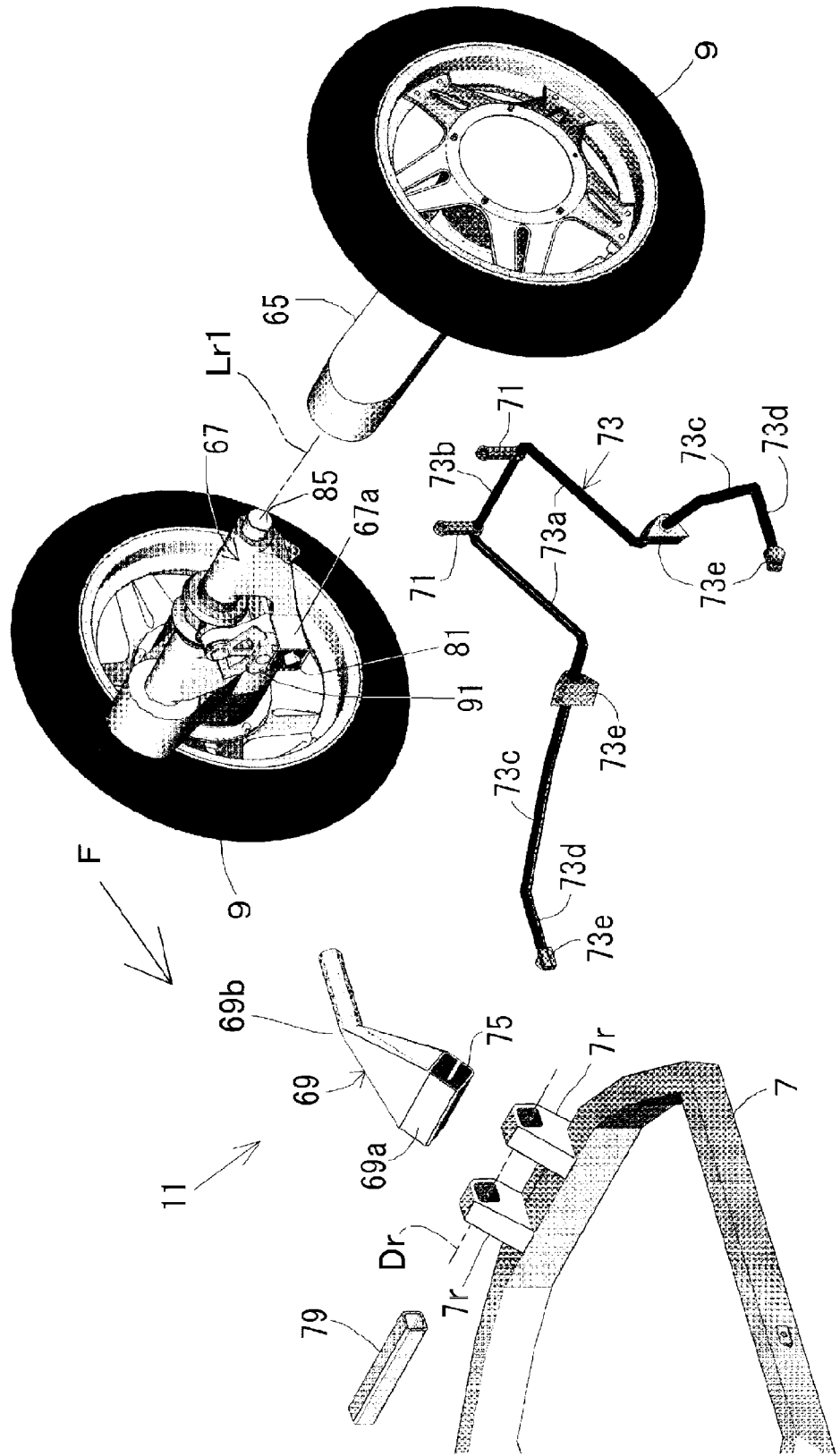
FIG. 13 is an exploded view illustrating a state in which a rear-side portion of the vehicle is disintegrated. This exploded view is seen from the upper front.
Figure 14:
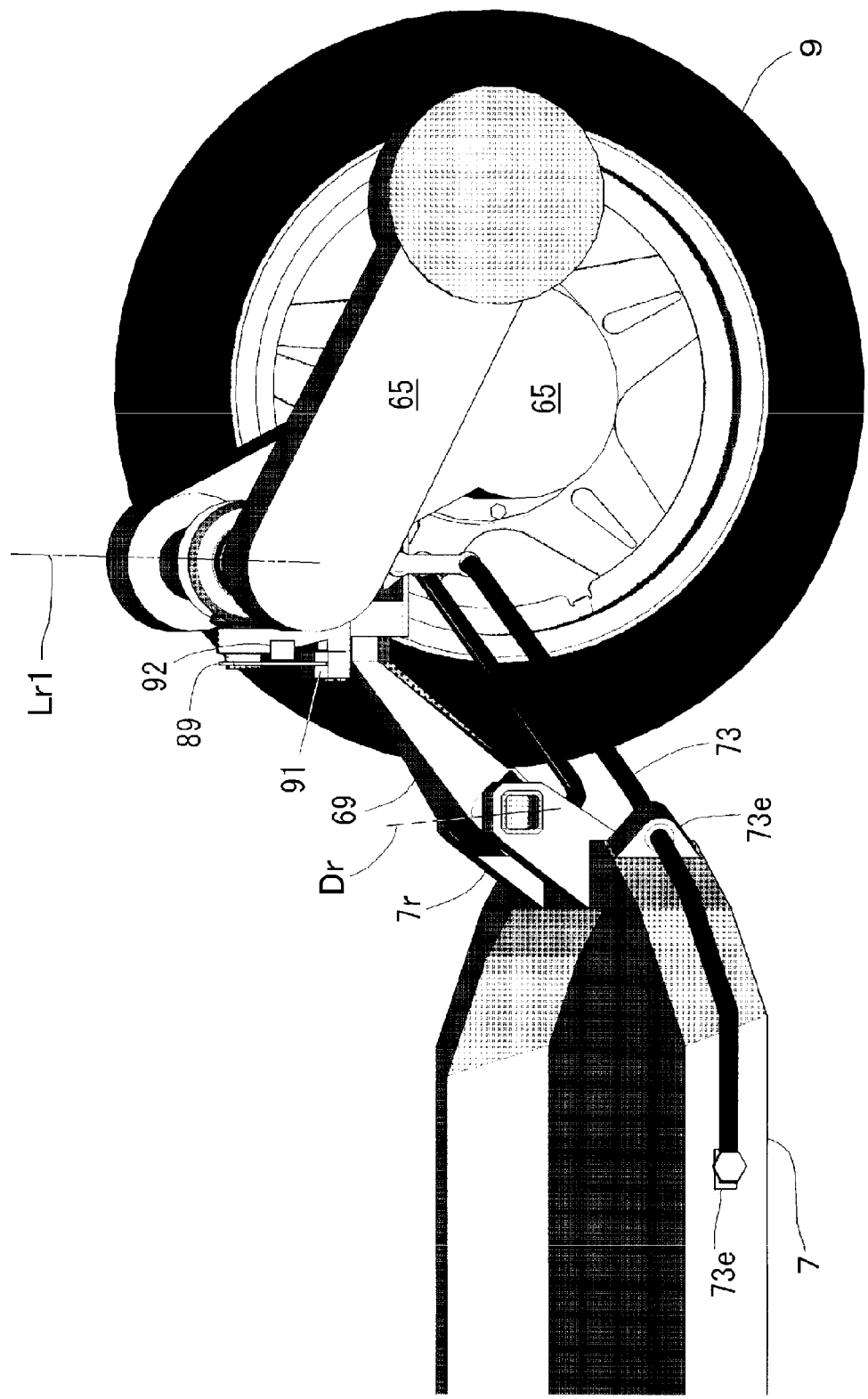
FIG. 14 is an enlarged outline view illustrating a state in which the left-side rear wheel has been removed from the rear-side portion of the vehicle under the state shown in FIG. 7. This enlarged outline view is seen from a left side.

A front end portion of the second center support member 69 is supported, using an elastic member 75 made of rubber or resin material, etc., by a pair of rear-side support parts (7r and 7r) that are attached to a rear end portion of the vehicle body frame 7 and protrude in an up-and-rear direction. The elastic member 75 and the rear-side torsion spring member 73 correspond to "elastic means" according to the present invention. As shown in FIG. 13, the rear-side torsion spring member 73 is formed such that a single rodlike member is bent symmetrically in the vehicle widthwise direction, and includes: a pair of parallel parts (73a and 73a) extending, in parallel, in the vehicle longitudinal direction and having therebetween a widthwise space larger than the vehicle widthwise width of the second center support member 69; a connecting part 73b that connects rear ends of the parallel parts 73a; obliquely extending parts 73c that start from front ends of the parallel parts 73a, are positioned along the rear end portion of the vehicle body frame 7, and extend obliquely forward with a certain interval therebetween; and front extending parts 73d, each further extending forwardly from the front end of each obliquely extending part 73c.

Regarding the rear-side torsion spring member 73, an end portion of each connecting part 73b is rotatably connected to a lower end portion of each shackle 71. A rear end portion of each obliquely extending part 73c and a front end portion of each front extending part 73d are supported, using support parts 73e, by rear portions of the vehicle body frame 7. Upper end portions of the shackles 71 are rotatably coupled via pins to a pair of left and right boss portions that protrude and are disposed at a lower portion of the first center support member 67. This gives the rear-side suspension apparatus 11 an initial load. Also, the rear wheels 9 are displaced to one another vertically in the same direction or opposite directions with respect to the vehicle body frame 7. Accordingly, the first center support member 67 is displaced vertically by means of each wheel holding member 65. In addition, when the first center support member 67 rotates about the below-described vehicle longitudinal virtual straight line Er, the rear-side torsion spring member 73 exerts spring force due to bending and/or torsion thereof so as to resist the rotation motion.

On a front end portion of the second center support member 69 is attached, by welding, a tubular member 69a that extends in the vehicle-widthwise direction and has a substantially square cross-section. Both left and right end surfaces of this tubular member 69a are fit between the rear-side support parts 7r of the vehicle body frame 7. A support shaft 79 with a substantially square cross-section is inserted into the tubular member 69a and through-holes created in the respective rear-side support parts 7r. The support shaft 79 is composed of a tubular member, and is fixed to each rear-side support part 7r by fastening with a screw member (not shown). The cross-section of the tubular member 69a attached to the second center support member 69 is larger than that of the support shaft 79. The difference between the rotation angles of the cross-section shapes (substantially square shapes) with respect to the axis in the insertion direction (the vehicle widthwise direction) of the support shaft 79 is 90 degrees. A gap between the both is filled with an elastic member 75 made of rubber material or resin material. The elastic member 75 is attached by press fitting, glazing, or bonding using an adhesive.

Specifically, both the second center support member 69 and the support shaft 79 fixed to each rear-side support part 7r of the vehicle body frame 7 are fit with a gap, and the gap is filled with the elastic member 75. In this way, the second center support member 69 is coupled to the vehicle body frame 7. This is what is called a "Neidhart rubber structure", and is adopted. This structure absorbs vibrations of the rear-side suspension apparatus 11 in the pitch direction of the vehicle 1. In addition, the rear end portion of the second center support member 69 can move vertically with respect to the vehicle body frame 7 while resisting to elastic force due to bending of the elastic member 75. Specifically, the second center support member 69 can rotate about the axis along a virtual straight line Dr (see FIGS. 13, 14, and 15) extending in the vehicle widthwise direction. The virtual straight line Dr corresponds to a "third axis" and a "pitch axis" according to the present invention.

Accordingly, when the traveling road surface roughness-derived vibrations spread from the rear wheel 9 via the wheel holding member 65 and the first center support member 67 to the second center support member 69, shear force and/or compressive force, etc., are given to the elastic member 75. As a result, the elastic member 75 is subject to appropriate elastic deformation, thereby capable of effectively reducing the shock. Here, the rear-side torsion spring member 73 in addition to the elastic members 75 and 81 is used to elastically support the first center support member 67. This configuration can further effectively resist the traveling road surface roughness-derived external force that is given from the rear wheel 9 via the wheel holding member 65 to the first center support member 67. The single rear-side torsion spring member 73 is used to resist the rotation of the first center support member 67 with respect to the second center support member 69 about the below-described vehicle longitudinal straight line Er. Consequently, the anti-rotation structure can be constructed using a small number of components and thus simplified.

In addition, the rear end portion of the second center support member 69 is positioned upwardly of the front end portion thereof. Because of this, when a compression shock load is applied horizontally on the rear end portion of the second center support member 69 from a rear side, the action point of the load is positioned upwardly of the vehicle widthwise virtual straight line Dr about which the front end portion of the second center support member 69 rotates. Thus, the second center support member 69 can smoothly rotate about the virtual straight line Dr. For example, the rear wheel 9 may go on a projection on a traveling road surface when the vehicle 1 moves rearwardly, the wheel holding member 65 may be pushed up and the upward force may spread to the second center support member 69. Even in this case, the second center support member 69 can smoothly rotate about the virtual straight line Dr. This can suitably prevent the shock from spreading to the vehicle body frame 7.

In addition, the second center support member 69 has the bent portion 69b (see FIG. 13) between the front end portion and the rear end portion thereof. Thus, when an excessive compression load is imposed on the second center support member 69 in the vehicle longitudinal direction, the bent portion 69b is bent and is likely to be subject to plastic deformation. Because of this, when a collision between the rear wheel 9 and an obstacle results in the excessive compression load on the second center support member 69, which load is mediated through the wheel holding member 65 and the first center support member 67, the bent portion 69b of the second center support member 69 is bent and is subject to plastic deformation. This can decrease damage to the vehicle body frame 7.

Figure 16:
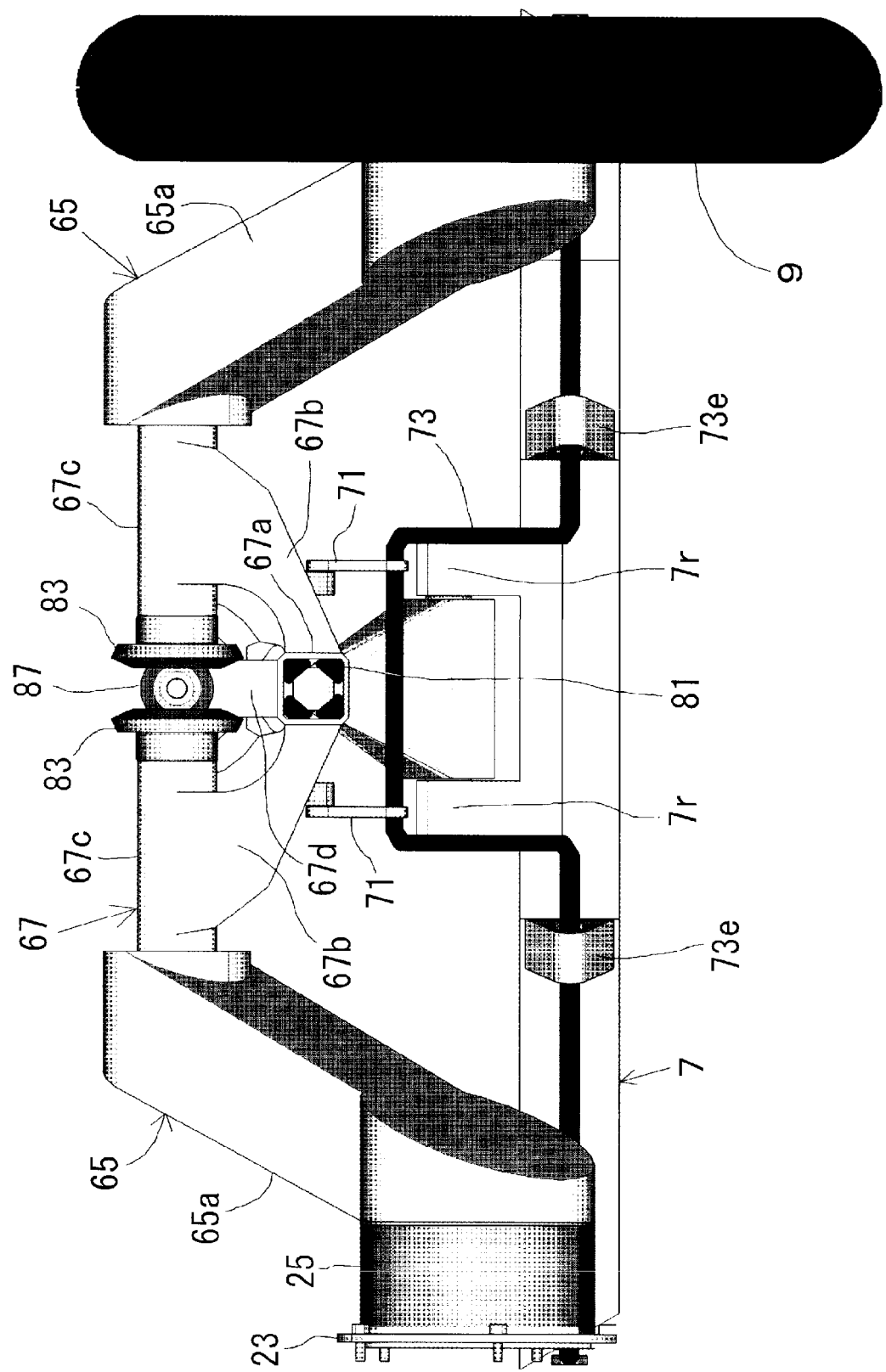
FIG. 16 is an enlarged outline view illustrating a state in which the left-side rear wheel and batteries have been removed from the rear-side portion of the vehicle. This enlarged outline view is seen from a rear side.

Regarding a vehicle widthwise middle portion of the first center support member 67, a tube-like part 67a with a substantially square cross-section is disposed such that an opening thereof is directed forwardly (see FIGS. 13 and 16). A rear end portion of the second center support member 69 has a substantially square cross-section smaller than that of the tube-like part 67a of the first center support member 67. The rear end portion of the second center support member 69 is inserted into the tube-like part 67a of the first center support member 67. The difference between the rotation angles of the cross-section shapes (substantially square shapes) with respect to the axis in the insertion direction (the vehicle longitudinal direction) is 90 degrees. A gap between the both is filled with an elastic member 81 made of rubber material or resin material. The elastic member 81 is attached by press fitting, glazing, or bonding using an adhesive.

Specifically, both the support members 67 and 69 are fit with a gap, and the gap is filled with the elastic member 81. In this way, both the support members 67 and 69 are coupled. This is what is called a "Neidhart rubber structure", and is adopted. This structure absorbs vibrations of the rear-side suspension apparatus 11 in the roll direction of the vehicle 1. In addition, the first center support member 67 can be relatively displaced (rotated) while resisting to the elastic force due to bending of the elastic member 81 not only in each of the vehicle widthwise and vertical directions relative to the second center support member 69, but also in the torsion direction about the axis along a virtual straight line Er (see FIGS. 3 and 15) extending in the insertion direction (the vehicle longitudinal direction). The virtual straight line Er corresponds to a "fourth axis" and a "roll axis" according to the present invention.

In addition, when the traveling road surface roughness-derived vibrations spread from the rear wheel 9 via the wheel holding member 65 to the first center support member 67, shear force and/or compressive force, etc., are given to the elastic member 81. As a result, the elastic member 81 is subject to appropriate elastic deformation, thereby capable of effectively reducing the shock.

Accordingly, the pair of left and right wheel holding members (65 and 65) supporting the pair of left and right rear wheels (9 and 9) and the first center support member 67 are rotatably coupled to the rear end portion of the second center support member 69 about the vehicle longitudinal virtual straight line Er. Also, the front end portion of the second center support member 69 is rotatably coupled to the vehicle body frame 7 about the vehicle widthwise virtual straight line Dr. Consequently, the structure that couples the rear wheels 9 and the vehicle body frame 7 can be constructed using a small number of components and thus simplified. Further, the vehicle 1 does not have impaired vehicle ride comfort by allowing the vehicle body frame 7 to be inclined as less as possible when any one of the pair of left and right rear wheels 9 goes on a projection on a traveling road surface. Furthermore, the front end portion of the second center support member 69 is rotatably coupled about the virtual straight line Dr arranged along the rear end portion, which extends in the vehicle widthwise direction, of the vehicle body frame 7. Accordingly, the distance between the rear-side support parts (7r and 7r), which provide part of the coupling structure, can be made larger. In accordance with this, the length of the tubular member 69a of the second center support member 69 can be made longer. This enables the coupling structure to be tough and compact in the vehicle longitudinal direction.

Note that, in this Embodiment, the rear end portion of the second center support member 69 is rotatably coupled to the first center support member 67 about the vehicle longitudinal virtual straight line Er; and the front end portion of the second center support member 69 is rotatably coupled to the vehicle body frame 7 about the vehicle widthwise virtual straight line Dr. However, the rear end portion of the second center support member 69 may be rotatably coupled to the first center support member 67 about the vehicle widthwise pitch axis; and the front end portion of the second center support member 69 may be rotatably coupled to the vehicle body frame 7 about the vehicle longitudinal roll axis. According to this configuration, the structure that couples the rear wheels 9 and the vehicle body frame 7 can also be constructed using a small number of components and thus simplified. Further, the vehicle 1 does not have impaired vehicle ride comfort by allowing the vehicle body frame 7 to be inclined as less as possible when any one of the pair of left and right rear wheels 9 goes on a projection on a traveling road surface.

Meanwhile, the rear wheels 9 may be displaced vertically by different amounts of displacement when each rear wheel goes on a rough traveling road surface. In this case, the relatively small amount of displacement as obtained by averaging the vertical displacements is an amount of displacement at the vehicle widthwise center of the first center support member 67. By the way, each wheel holding member 65 is supported via the first center support member 67 by the second center support member 69. These center support members (67 and 69) are arranged on the vehicle widthwise center virtual straight line Lc when viewed from the above. Accordingly, the rear wheels 9 may be displaced to one another vertically by different amounts of displacement. This causes a small amount of change corresponding to the average displacement at a vehicle widthwise center of the first center support member 67. Then, the first center support member 67 is displaced vertically by the small amount of change. For example, when the rear wheels 9 are displaced to one another vertically in opposite directions by substantially the same amount of displacement, the average displacement at the vehicle widthwise center of the first center support member 67 approaches 0. As a result, the second center support member 69 rotates about the vehicle widthwise virtual straight line Dr by a small rotation angle. Consequently, the amount of deformation of the elastic member 75 can be made smaller, so that the load imposed on the elastic member 75 can be small.

In addition, when the traveling road surface roughness-derived vibrations spread from the rear wheel 9 via each wheel holding member 65 and the first center support member 67 to the second center support member 69, each elastic member (75 or 81) and the rear-side torsion spring member 73 are subject to elastic deformation to disperse and absorb the vibrations. Hence, the load of each elastic member (75 or 81) and the load of the front-side torsion spring member 73 can be made smaller. Consequently, the maximum load imposed on each elastic member (75 or 81) and the rear-side torsion spring member 73 can be set to a small value. In view of the above, these members can be made small and lightweight.

In addition, the traveling road surface roughness-derived vibrations spread from the rear wheel 9 via each wheel holding member 65 and the first center support member 67 to the second center support member 69. Consequently, the vibration travel path is long. This results in a decreased specific frequency of the structure. Hence, it is possible to reduce noise caused by the vibrations of each wheel holding member 65, etc., thereby improving the ride comfort of the vehicle 1.

Note that the coupling between the second center support member 69 and each rear-side support part 7r of the vehicle body frame 7 and the coupling between the second center support member 69 and the first center support member 67 are mediated by the elastic members 75 and 81, respectively. Any one of the couplings may be mediated by a rotatable bearing and the other coupling may be mediated by an elastic member. This configuration allows at least one coupling to be mediated by the elastic member. Accordingly, elastic deformation of the elastic member can effectively prevent the traveling road surface roughness-derived vibrations from spreading from the rear wheel 9 via the wheel holding member 65, etc., to the vehicle body frame 7. On top of that, the vibration-proof structure can be constructed using a small number of components and thus simplified.

As shown in FIG. 16, the first center support member 67 includes: a pair of left and right obliquely extending parts (67b and 67b) that extend obliquely upward relative to both left and right lateral surfaces of the tube-like part 67a; a pair of left and right bearing parts (67c and 67c) disposed on the upper end of each obliquely extending part 67b; and an extension part (67d) that extends upwardly relative to the upper surface of the tube-like part 67a. Each bearing part 67c extends in the vehicle-widthwise direction. A pair of swivel shafts (85 and 85) (see FIG. 13) are rotatably set in shaft holes created in the bearing parts 67c. One end of each swivel shaft is attached to the wheel holding member main body 65a and the other end is attached to a main bevel gear 83. Each swivel shaft 85 extends such that the axis thereof is directed straight in the vehicle widthwise direction. A main body 65a of the wheel holding member and the swivel shaft 85 constitute part of the wheel holding member 65. The main body 65a is formed such that the main body extends outwardly in the vehicle widthwise direction as the main body is positioned from the one end attached to the swivel shaft 85 to the other end attached to the electric motor 25.

A pair of left and right main bevel gears (83 and 83) and a rear end portion of a swivel shaft of an intermediate bevel gear 87 are rotatably supported on an upper end portion of the extension part 67d. A front end portion of the swivel shaft of the intermediate bevel gear 87 is attached to a circular sector rotating plate 89 (see FIGS. 5, 10, 14, and 15). Note that the swivel shaft of the intermediate bevel gear 87 extends in the vehicle longitudinal direction. Each wheel holding member 65, the first center support member 67, each main bevel gear 83, each swivel shaft 85, and the intermediate bevel gear 87 correspond to a "linkage mechanism" according to the present invention. On a lower front portion of the extension part 67d is mounted a movement-restricting device 91 (see FIGS. 5, 14, and 15) for stopping the rotation of the intermediate bevel gear 87 by sandwiching the rotating plate 89 between pads (not shown) and for re-initiating the rotation. The movement-restricting device 91 corresponds to "resistance means" according to the present invention. In addition, an angle sensor 92 for detecting the rotation angle of the rotating plate 89 is fixed to a front surface of the extension part 67d and is disposed upwardly of the movement-restricting device 91 (see FIG. 14).

Accordingly, when the movement-restricting device 91 is disengaged, the difference in torque applied between the rear wheels 9 causes either one of the pair of left and right wheel holding members (65 and 65) to rotate about the axis of the swivel shaft 85. The amount and rotation speed increases as the difference in torque between the rear wheels 9 becomes larger. The difference in torque between the rear wheels 9 may occur when there is a difference in given drive torque between the rear wheels 9. Also, the difference may occur when drive torque is given to one rear wheel 9 and brake torque is given to the other rear wheel 9. In such a situation, the difference in torque can be enlarged.

In addition, the difference in torque applied between the front wheels 3 may cause each front wheel support member 29 to rotate about the axis of the steering shaft member 51. In this case, the vehicle body frame 7 is tilted toward any one of the left and right directions. The resulting difference in vertical load between the rear wheels 9 causes either one of the pair of left and right wheel holding members (65 and 65) to rotate about the axis of the swivel shaft 85. At this time, in order to offset the difference in vertical load between the rear wheels 9, the wheel holding members 65 each rotate about the axis of the swivel shaft 85 such that the wheel holding member 65 on the rear wheel 9 side having a relatively larger vertical load is displaced upwardly of the wheel holding member 65 on the rear wheel 9 side having a smaller vertical load.

Figure 19:
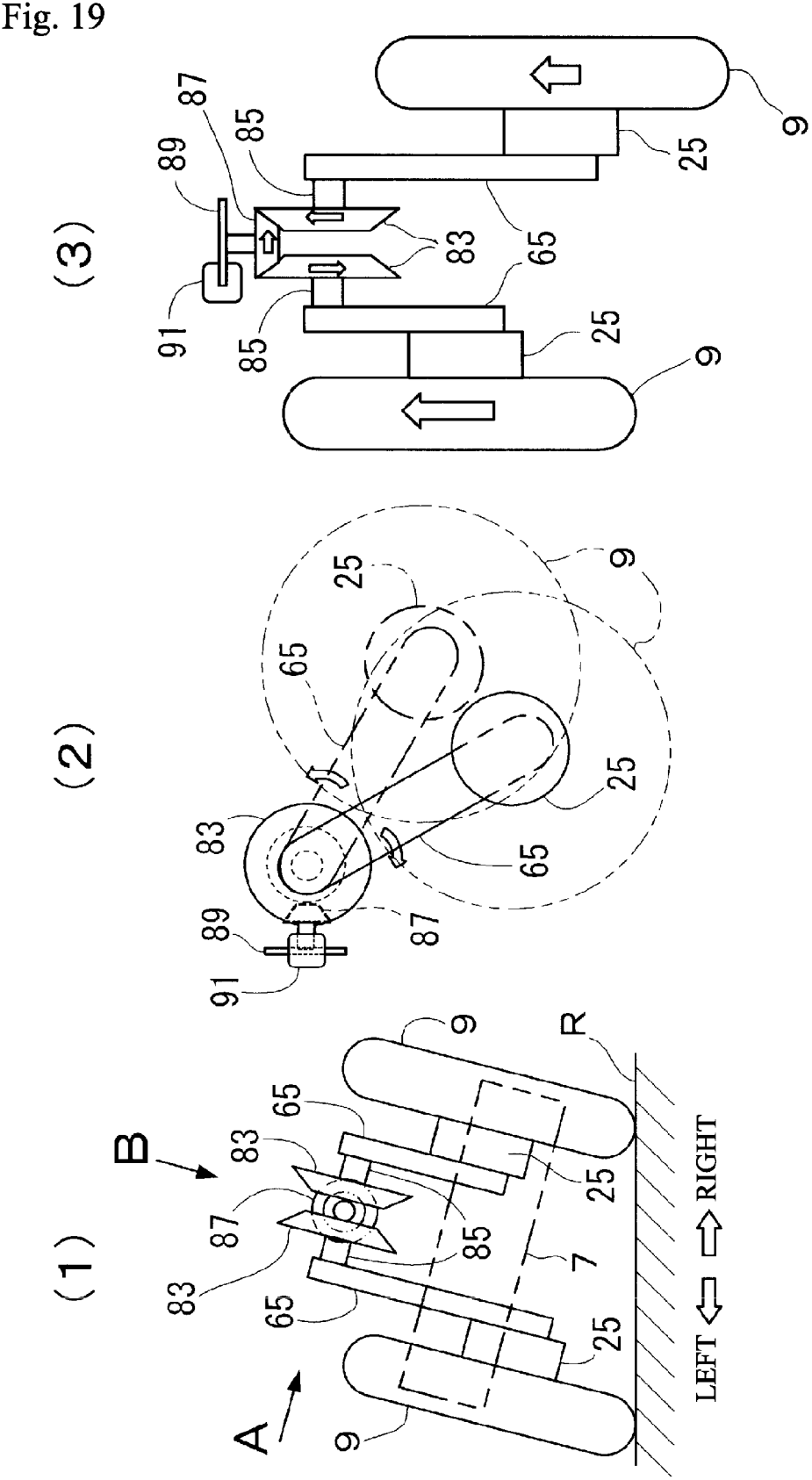
FIG. 19 is schematic diagrams illustrating states in which the rear wheels are displaced relatively to one another vertically in opposite directions with respect to the vehicle body frame.

In this way, either one of the difference in torque applied between the rear wheels 9 and the difference in vertical load between the rear wheels 9 may cause either one of the pair of left and right wheel holding members (65 and 65) to rotate about the axis of the swivel shaft 85. This rotation cause one of the swivel shafts 85 and the main bevel gear 83 to rotate, which further causes the intermediate bevel gear 87 to rotate. This rotation of the intermediate bevel gear 87 causes the other main bevel gear 83 and swivel shaft 85 to rotate in communication with one another. At this time, the engagement relationship between the pair of main bevel gears (83 and 83) and the intermediate bevel gear 87 sets the pair of main bevel gears (83 and 83) to rotate in opposite directions. Accordingly, the pair of swivel shafts 85 rotate in opposite directions. This causes the pair of wheel holding members (65 and 65) to move in opposite directions. FIG. 19 shows a state where the left rear wheel 9 is relatively displaced downwardly with respect to the vehicle body frame 7; and where the right rear wheel 9, in turn, is relatively displaced upwardly with respect to the vehicle body frame 7. FIG. 19(1) shows a state when viewed from the rear side of the vehicle 1. FIG. 19(2) shows a state when viewed from the arrow A of FIG. 19(1). FIG. 19(3) shows a state when viewed from the arrow B of FIG. 19(1). In this case, as illustrated in FIG. 19(1), the vehicle body frame 7 is tilted toward the right side relative to a traveling road surface R.

Figure 3:
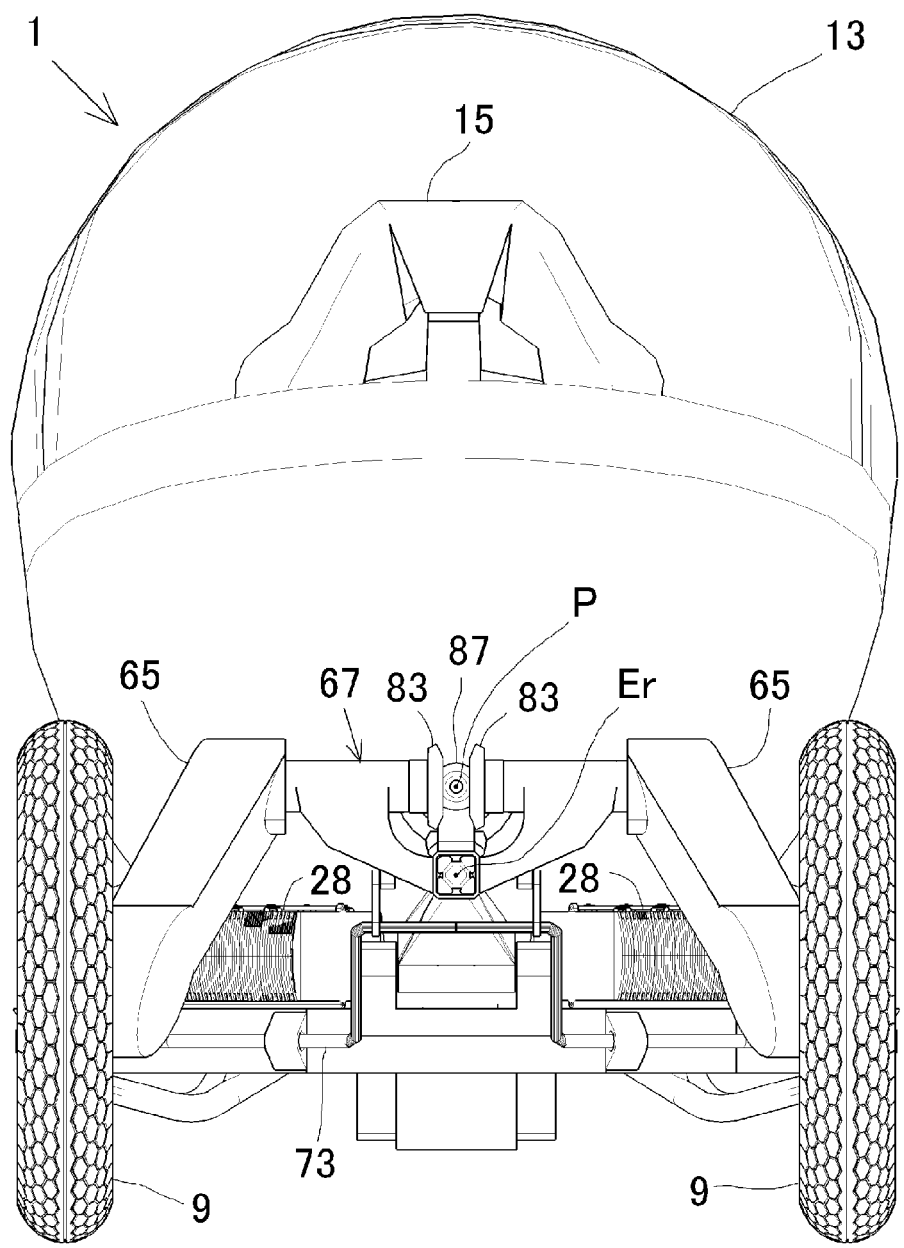
FIG. 3 is an outline view of the vehicle when viewed from a rear side.
Figure 4:
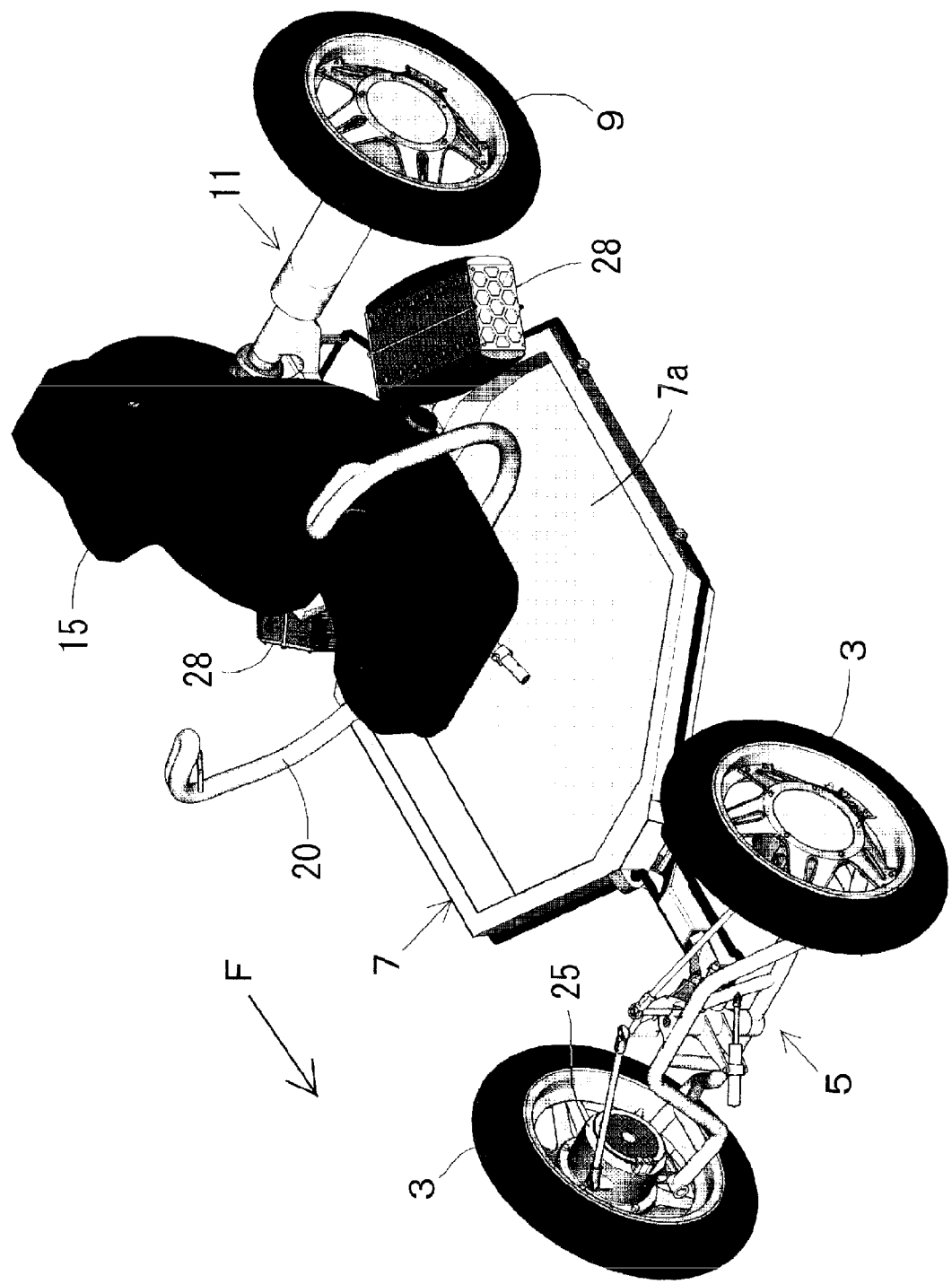
FIG. 4 is an outline view of the vehicle without a cabin frame of FIG. 1 when seen from the upper front.
Figure 5:
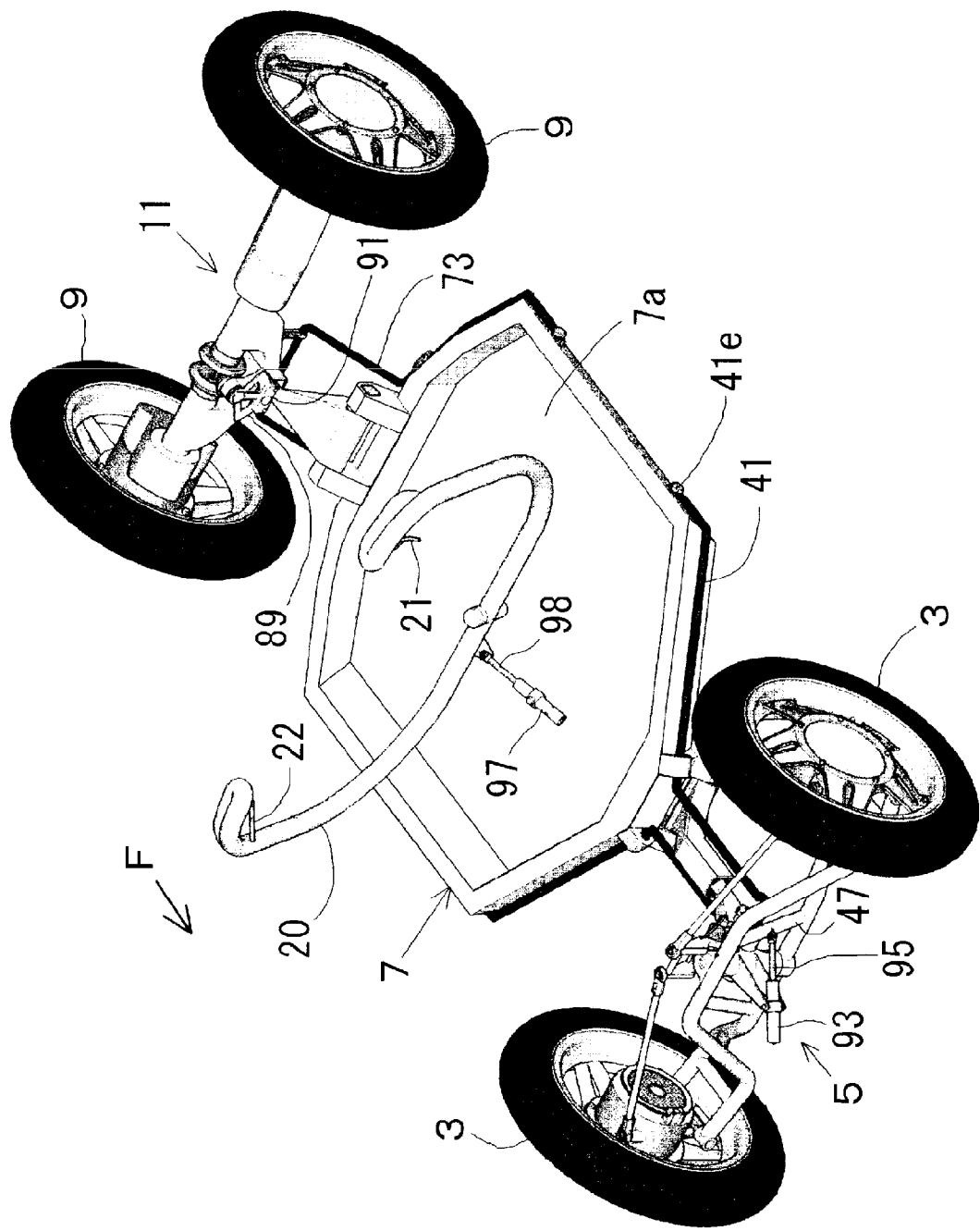
FIG. 5 is an outline view of the vehicle without a seat and batteries of FIG. 4 when seen from the upper front.
Figure 6:
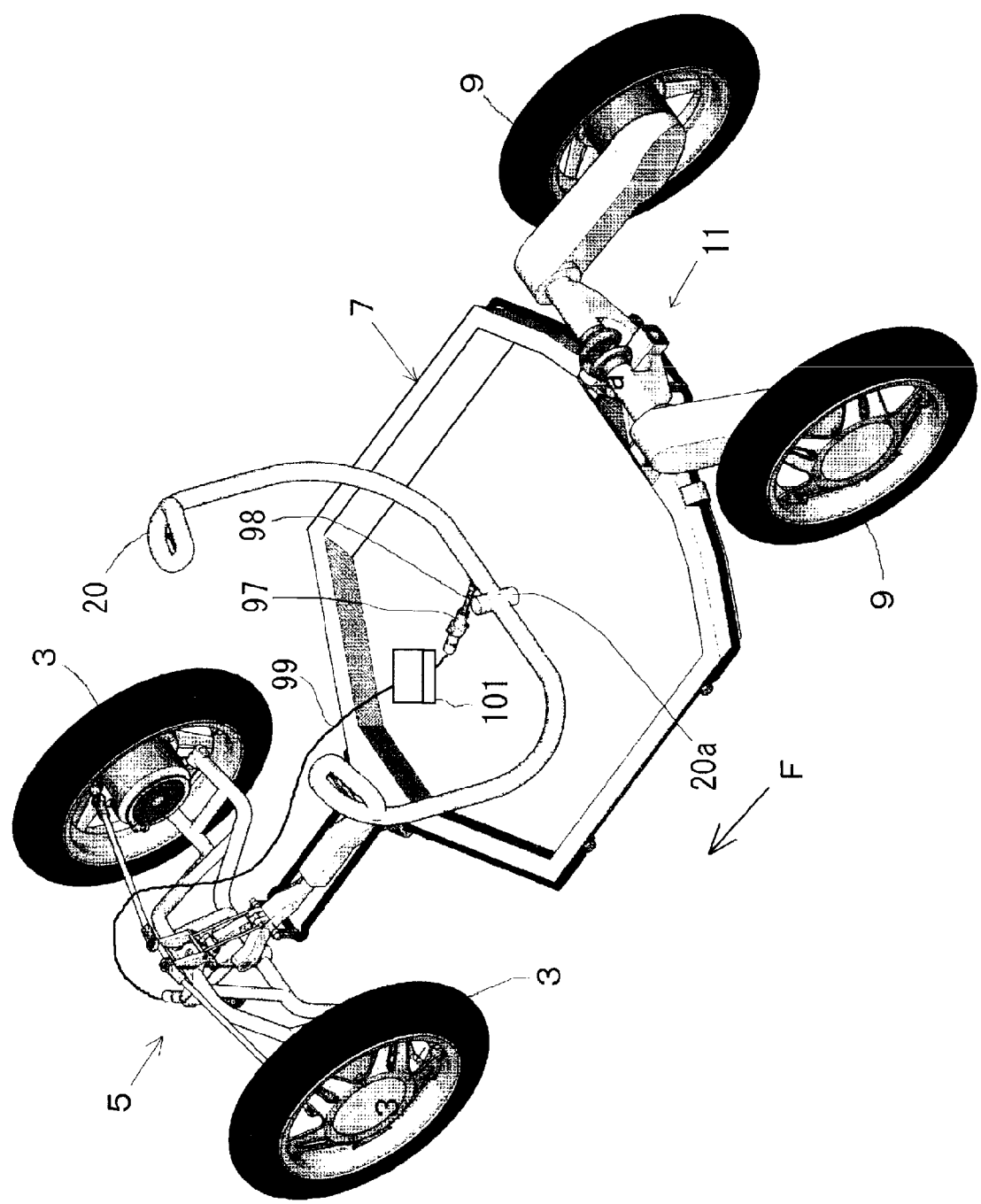
FIG. 6 is an outline view of the vehicle under the state shown in FIG. 5 when seen from the upper rear.
Figure 7:
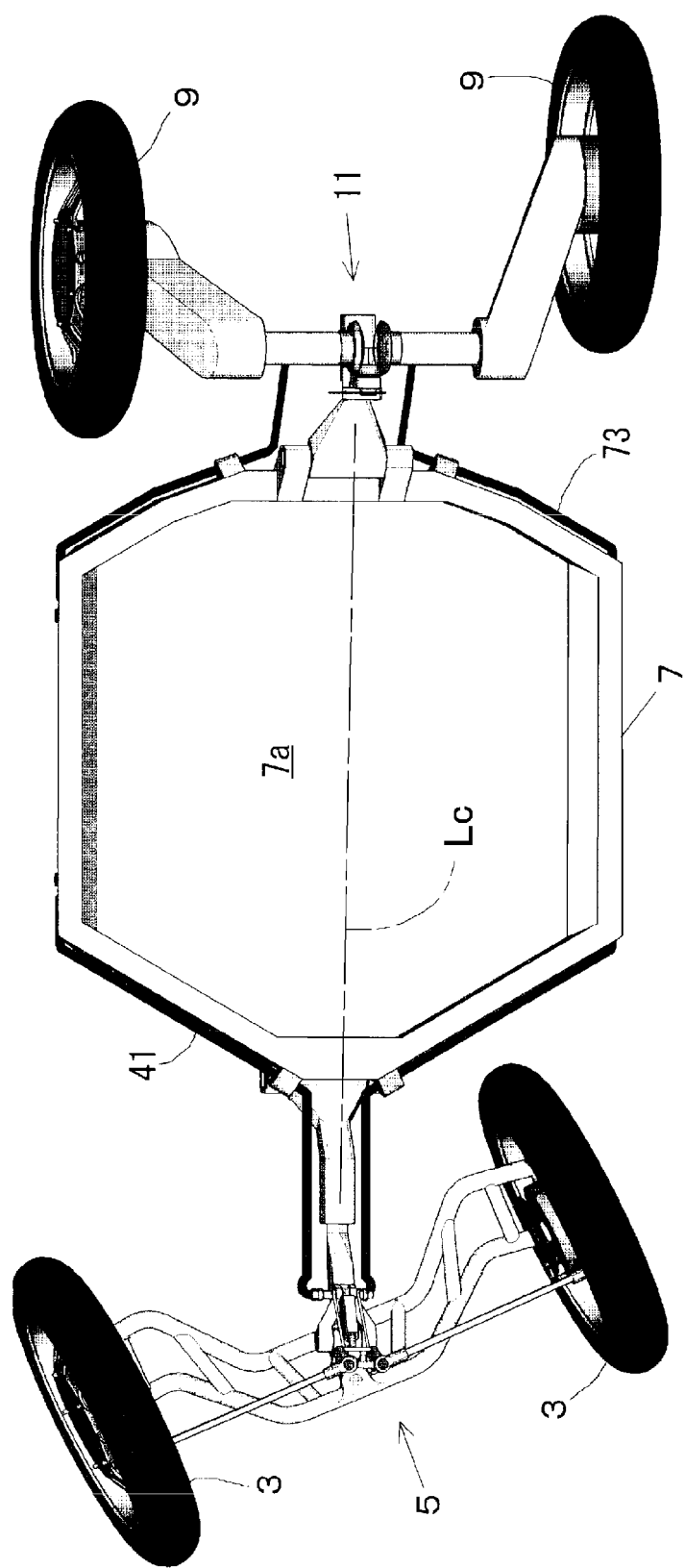
FIG. 7 is an outline view of a state in which the steering yoke has been removed from the state shown in FIG. 5 and the front wheels and the rear wheels are displaced with regard to the vehicle body. This outline view is seen from the above.
Figure 15:
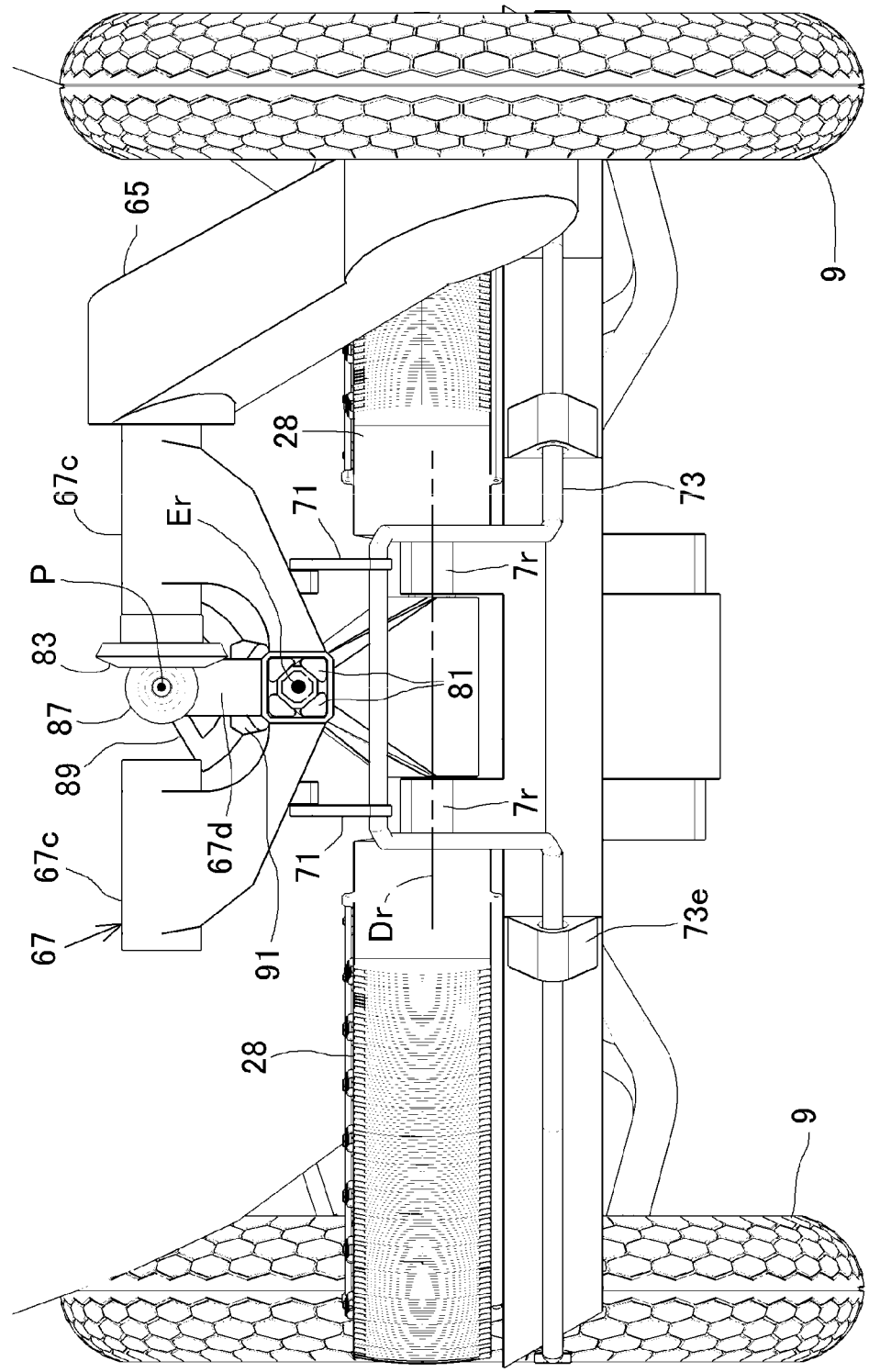
FIG. 15 is an enlarged outline view illustrating a state in which the left-side rear wheel support member has been removed from the rear-side portion of the vehicle. This enlarged outline view is seen from a rear side.

In addition, as illustrated in FIGS. 3 and 15, the tilting center P when the vehicle body frame 7 is tilted in the vehicle-widthwise direction is positioned at or near the axis of the swivel shaft of the intermediate bevel gear 87. Meanwhile, batteries 28 are supported by the vehicle body frame 7 such that the center of gravity of each battery 28 is positioned below the tilting center P and the vehicle longitudinal virtual straight line Er. The center of gravity of the rectangular parallelepiped battery 28 is located in substantially the center of the battery shape. This configuration lowers the position of the center of gravity of the vehicle 1 in such a manner. This enables the vehicle 1 to stay under stable stop conditions even if the position of the center of gravity of the vehicle 1 having an occupant is shifted when the occupant gets on and off the vehicle 1. Further, this can also prevent the vehicle body frame 7 from being tilted outwardly in the turning direction due to centrifugal force imposed on the battery 28 when the vehicle 1 turns.

In addition, the pair of batteries (28 and 28) are arranged in the rear end portion of the vehicle body frame 7 on the left and right sides by sandwiching the virtual straight line Lc therebetween and are apart from each other. When compared with an arrangement where the batteries are centralized in a center portion of the vehicle body frame 7, the above arrangement is unlikely to cause each battery 28 to interfere with the cabin 13. Thus, the cabin 13 can be arranged at a lower position. Further, the batteries 28 are arranged at left and right positions apart from the tilting center P of the vehicle body frame 7 and the virtual straight line Lc. This enlarges the moment of inertia about the tilting center P. Thus, the vehicle body frame 7 can be prevented from being subject to rolling about the tilting center P.

Note that the configuration where the batteries 28 are arranged in the rear end portion of the vehicle body frame 7 may not be used. Instead, with the above configuration being used, other batteries 28 are supported by a front end portion of the vehicle body frame 7 while the batteries 28 are arranged in the front end portion such that the center of gravity of each battery 28 is positioned below the vehicle longitudinal virtual straight line Ef and below the tilting center when the rotation of the front wheel support member 29 about the axis of the steering shaft member 51 causes the vehicle body frame 7 to be tilted in the vehicle-widthwise direction. This can contribute to stabilization of the vehicle 1 under stopping conditions. At the same time, this can contribute to preventing the vehicle body frame 7 from being tilted outwardly in the turning direction.

Now back to FIG. 8. A pair of brackets (31*d* and 31*d*) extend forwardly and are attached, with a vertical prescribed space, onto a lengthwise middle and front portion of the main body 31*a* of the first center support member 31 that rotatably supports the front wheel support member 29. Between front end portions of the brackets 31*d* are rotatably attached a lengthwise intermediate portion of a master-side hydraulic cylinder 93. One end portion of a master-side piston 95 can be slidably inserted into the hydraulic cylinder 93. The other end portion is rotatably coupled to a vertical intermediate portion of a link pipe member 47 (a link pipe member 47 positioned substantially on the left side of the first center support member 31) of the front wheel support member 29 (see FIG. 5).

Meanwhile, on a bottom surface portion of the cabin 13 is rotatably attached a lengthwise intermediate portion of a slave-side hydraulic cylinder 97. One end portion of a slave-side piston 98 (see FIG. 6) can be slidably inserted into the slave-side hydraulic cylinder 97. The other end portion is rotatably mounted at or near a steering yoke shaft 20*a* of the steering yoke 20. The inside of the master-side hydraulic cylinder 93 and the inside of the slave-side hydraulic cylinder 97 are connected via a pressure-resistant hydraulic pipe 99 (see FIG. 6) in a liquid-tight manner. These insides are filled with hydraulic oil. Consequently, the steering yoke 20 and the front wheel support member 29 are interlocked and coupled via the respective hydraulic cylinders (93 and 97) and the hydraulic pipe 99. The rotation about the axis of the steering shaft member 51 of the front wheel support member 29 and the rotation about the axis of the steering yoke shaft 20*a* of the steering yoke 20 are in communication by means of the pressure of the hydraulic oil flowing through the inside of the respective hydraulic cylinders (93 and 97) and the hydraulic pipe 99. In addition, partway through the hydraulic pipe 99 is disposed a flow resistance-adjusting device 101 (see FIG. 6) for adjusting the flow resistance when the hydraulic oil flows through the hydraulic pipe 99. The respective hydraulic cylinders (93 and 97) and the hydraulic pipe 99 correspond to "motive actuating-force transmission means" according to the present invention. The flow resistance-adjusting device 101 corresponds to "resistance means" according to the present invention.

The flow resistance setting can prevent the front wheel support member 29 and/or the steering yoke 20 from abruptly rotating, for example, when an excessive load is applied to the front wheel support member 29 from any one of the pair of left and right front wheels (3 and 3). Note that the flow resistance-adjusting device 101 includes an electromagnetic on-off valve. Accordingly, the level of the flow resistance is adjusted by executing PWM control that appropriately modifies a duty ratio of a current conduction time to a current shut-off time. When the electrical conduction is shut off due to defects in an electrical system, the electromagnetic on-off valve is made to open, so that the flow resistance of the flow resistance-adjusting device 101 is minimized. According to this configuration, an occupant can manually operate the steering yoke 20, and the resulting pressure of the hydraulic oil inside the respective hydraulic cylinders (93 and 97) and the hydraulic pipe 99 causes the front wheel support member 29 to manually rotate about the axis of the steering shaft member 51. By doing so, each front wheel 3 can be steered.

Note that instead of using the respective hydraulic cylinders (93 and 97), the hydraulic pipe (99), and the flow resistance-adjusting device 101, a link or push-pull wire may be used to interlock and couple the steering yoke 20 with the front wheel support member 29. At the same time, means for applying friction resistance by gripping the link or push-pull wire when the wire works may be disposed in a lengthwise intermediate portion thereof. In this case, the link or push-pull wire corresponds to "motive actuating-force transmission means" according to the present invention. The means for applying friction resistance corresponds to "resistance means" according to the present invention.

Figure 20:
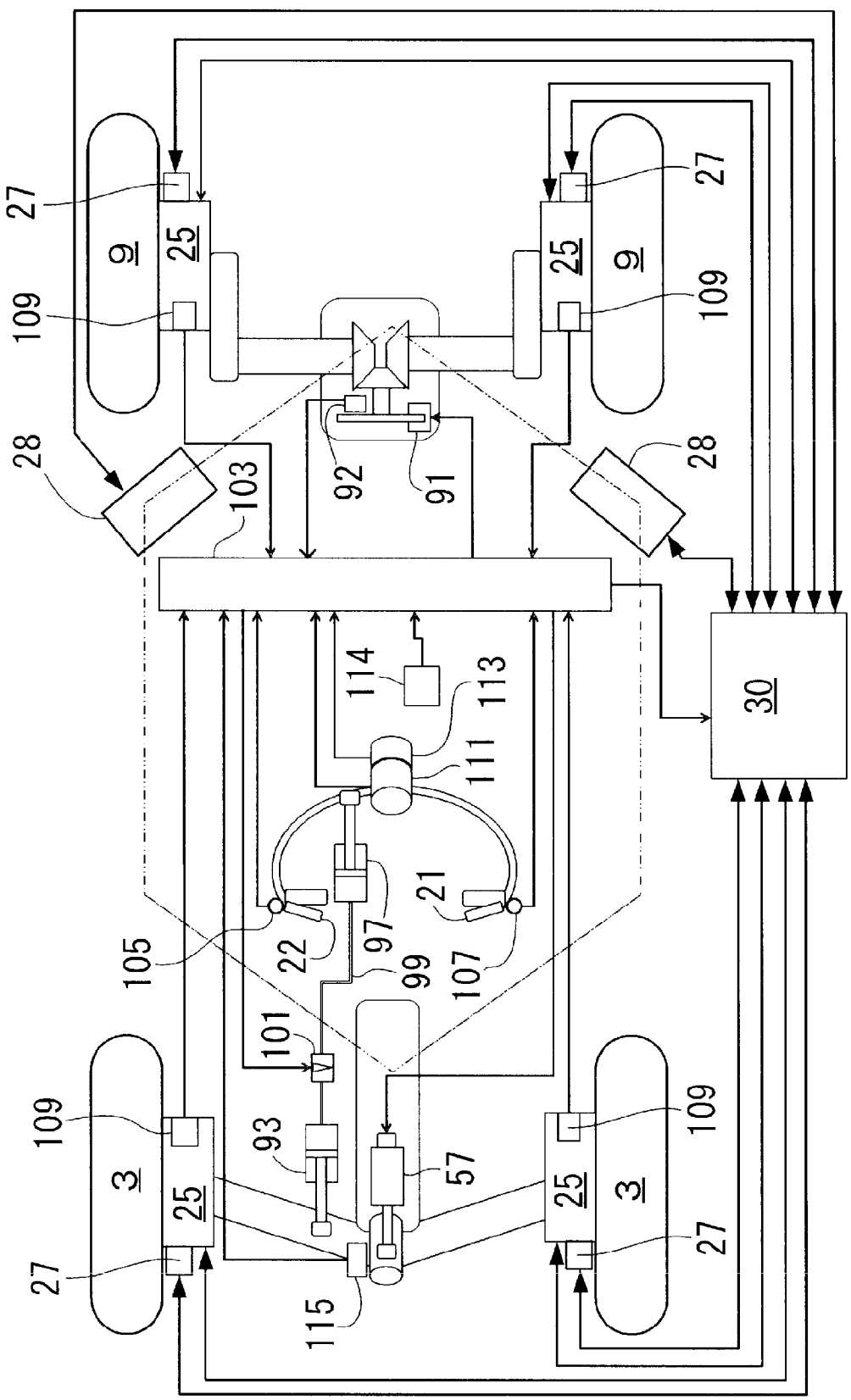
FIG. 20 is a block diagram illustrating a rough sketch of an on-vehicle control unit and various devices pertaining to the control unit.

By referring to FIGS. 20 to 25, the following describes the vehicle 1 control executed by an on-vehicle control unit 103. First, the main routine, which provides a general sketch of the control, is described by referring to FIGS. 20 and 21(1). In FIG. 20, the arrowed lines denote electric cables and the arrows denotes the flow directions of input/output signals. The arrowed line having arrow heads at both ends means a bidirectional input/output signal.

First, the total (hereinafter, referred to as "vehicle requirement torque") is calculated by adding the sum (hereinafter, referred to as "front wheel requirement torque") of drive torque required for the front wheels 3 of the vehicle 1 by the electric motors 25 and brake torque required for the front wheels 3 by the electric brake motors 27 and the sum (hereinafter, referred to as "rear wheel requirement torque") of drive torque required for the rear wheels 9 by the electric motors 25 and brake torque required for the rear wheels 9 by the electric brake motors 27 (Step M1).

Next, the target turning radius of the vehicle 1 is calculated (Step M2). Next, the target front-to-rear tilt angle (target front-to-rear tilt angle of a steering axis) of the virtual straight line Lf along the axis of steering shaft member 51 is calculated (Step M3). Next, the target tilt angle of the vehicle (target vehicle widthwise tilt angle of a vehicle), which angle is the vehicle widthwise tilt angle of the vehicle 1, is calculated (Step M4). Next, the target turning resistance amount that should be given as the resistance when the front wheel support member 29 rotates about the virtual straight line Lf along the axis of the steering shaft member 51 is calculated (Step M5). Next, the target rear wheel movement-restricting amount that should be given to the movement-restricting device 91 as the resistance when the pair of left and right wheel holding members (65 and 65) each rotate about the axis of the swivel shaft 85 (Step M6). Giving the movement-restricting device 91 the resistance can prevent the wheel holding members 65 from abruptly rotating, for example, when an excessive load is applied to the wheel holding member 65 from any one of the pair of left and right rear wheels (9 and 9).

Next, the respective target torque values for the respective wheels (i.e., each value of drive torque given to each of the front wheels 3 and the rear wheels 9 by each electric motor 25 and each value of brake torque given to each of the front wheels 3 and the rear wheels 9 by each electric brake motor 27) are calculated (Step M7). Finally, based on the values as obtained in each step, command values used to actuate each device are calculated (Step M8). This Step M8 will be described below in detail.

Hereinafter, subroutines executed in each of Steps M1 to M8 of the main routine shown in FIG. 21(1) are described in detail by referring to FIG. 21(2) to FIG. 23(8).

Figure 21:
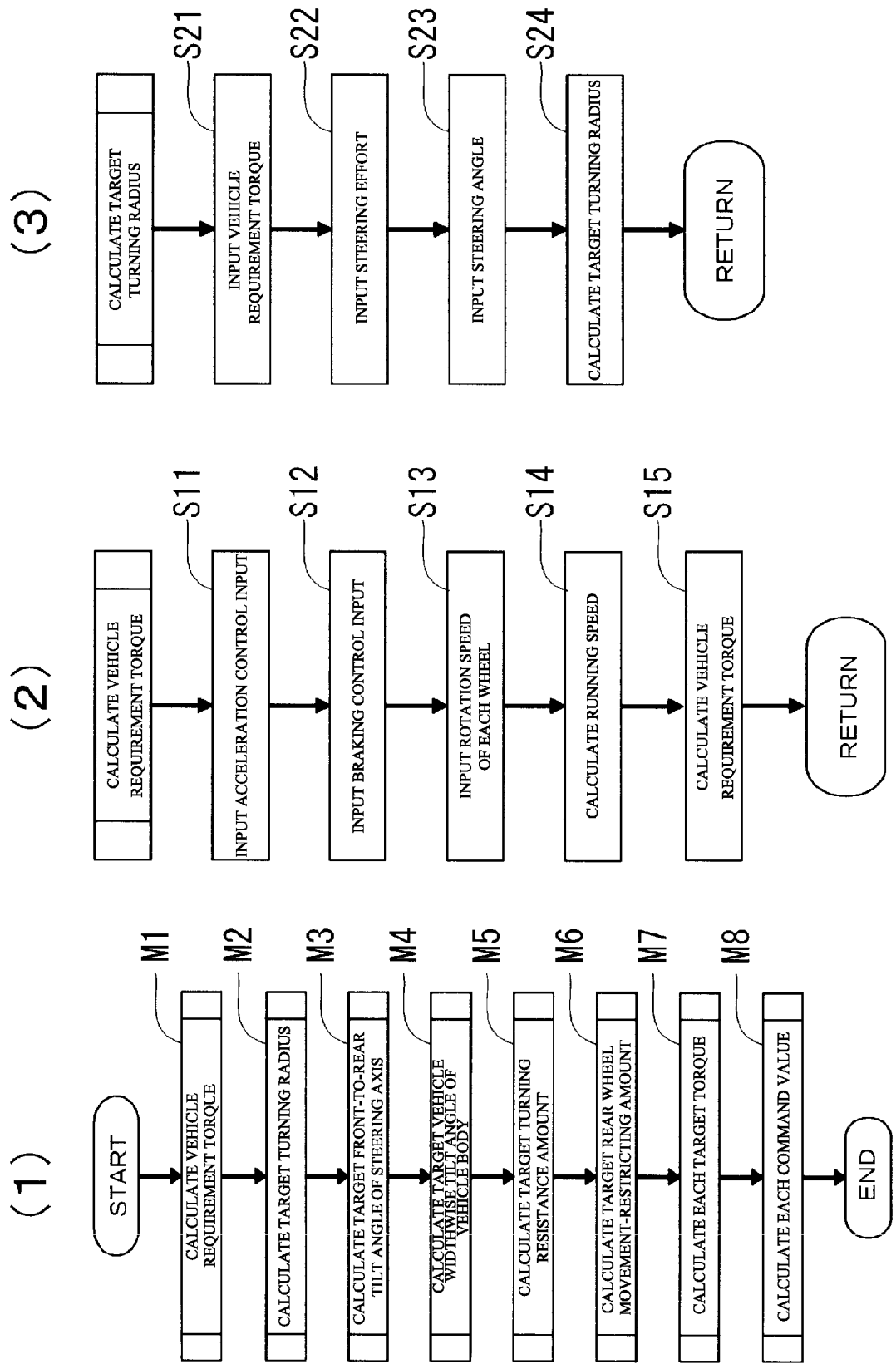
FIG. 21 is part of flow charts illustrating the specifics of the control executed by the control unit.
Figure 26:
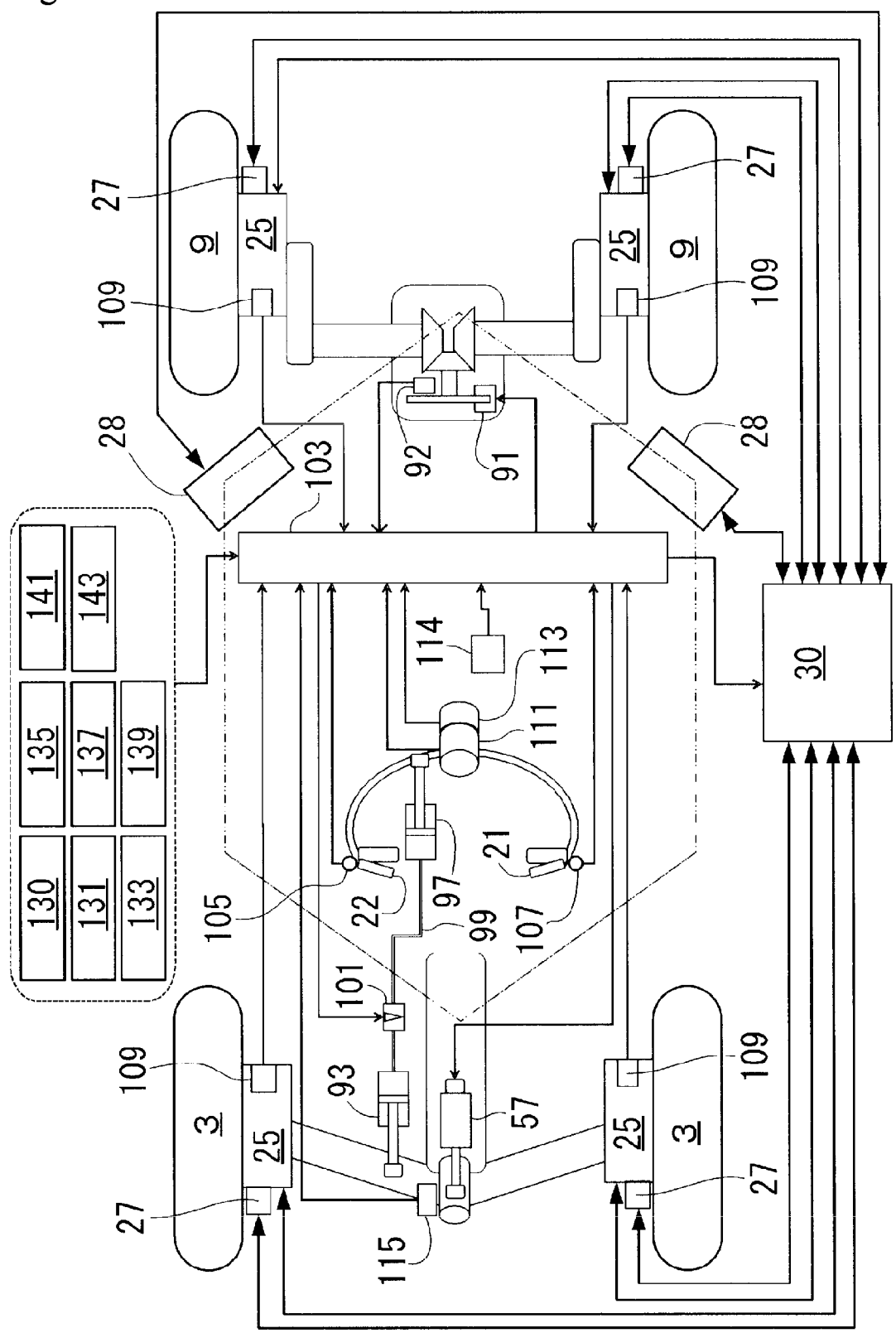
FIG. 26 is a block diagram illustrating a rough sketch of a control unit included in a vehicle according to the first Modification Embodiment of the present invention and various devices pertaining to the control unit.

First, the subroutine for calculating the vehicle requirement torque in Step M1 is described by referring to FIG. 21(2). An acceleration sensor 105 disposed near the acceleration operator 22 is used to detect an acceleration control input from the acceleration operator 22, and the input value is input (Step S11). Next, a brake sensor 107 disposed near the brake operator 21 is used to detect a braking control input from the brake operator 21, and the input value is input (Step S12). Note that when both the acceleration operator 22 and the brake operator 21 are operated and thus both the acceleration control input and the braking control input are detected in Steps S11 and S12, only the braking control input is used and the acceleration control input is neglected. By doing so, the value of the vehicle requirement torque is calculated by the control unit 103.

Next, the rotation speed of each of the front wheels 3 and the rear wheels 9 is detected (Step S13). Each rotation speed is detected by a rotation speed sensor 109 having a built-in rotary encoder of each electric motor 25, and the value is input and the average rotation speed is calculated. Then, the running speed of the vehicle 1 is determined on the basis of this average value (Step S14). Finally, the value of the vehicle requirement torque is calculated (Step S15) using each of the values of the acceleration control input, the braking control input, and the running speed as obtained in Steps S11, S12, and S14. The value of this vehicle requirement torque can be determined using, for example, a three-dimensional map or a relational expression while a relationship among the acceleration control input and the braking control input, the running speed, and the vehicle requirement torque is determined beforehand by experiments and is pre-stored in a memory section of the control unit 103 as the three-dimensional map or the relational expression.

Hereinafter, the subroutine for calculating the target turning radius in Step M2 of the main routine is described by referring to FIG. 21(3). First, the value of the vehicle requirement torque as calculated in Step S15 of the above subroutine is input (Step S21). Next, the rotation torque, which corresponds to the steering effort during the rotation of the steering yoke 20 about the axis of the steering yoke shaft 20a, is detected by a torque sensor 111, and the value is input (Step S22). The torque sensor 111 is disposed on the axis of the steering yoke shaft 20a. Next, the rotation angle, which corresponds to the steering angle during the rotation of the steering yoke 20 about the axis of the steering yoke shaft 20a, is detected by an angle sensor 113 having a rotary encoder, and the value is input (Step S23). The angle sensor 113 is disposed on the axis of the steering yoke shaft 20a. The rotation angle of the steering yoke 20 when the vehicle 1 travels straight is set to 0. Any one of the clockwise and counterclockwise rotation directions with respect to the above angle is defined as a positive direction. In turn, the other rotation direction is defined as a negative direction. In this way, the angle is so detected. According to this configuration, the rotation direction of the steering yoke 20 can also be determined. In addition, the vehicle 1 also carries a vehicle attitude detection sensor 114 for detecting the acceleration and the angular velocity of the vehicle body frame 7.

Note that the torque sensor 111 may be used as an alternative for the angle sensor 113 to determine the rotation direction. In this case, the rotation torque of the steering yoke 20 when the vehicle 1 travels straight is set to 0. The rotation torque when the steering yoke 20 rotates in any one of the clockwise and counterclockwise rotation directions about the axis of the steering yoke shaft 20a with respect to the above state is defined as a positive rotation torque. In turn, the rotation torque when the steering yoke 20 rotates in the other rotation direction is defined as a negative rotation torque.

Finally, the target turning radius, with which the center of the vehicle 1 moves during driving of the vehicle 1, is calculated (Step S24) using each of the values of the vehicle requirement torque, the rotation torque, and the rotation angle as input in Steps S21 to S23. In this case, the center of the vehicle 1 refers to an intersection point where the vehicle longitudinal center line and the vehicle widthwise center line intersect each other when viewed from the above. The target turning radius can be determined using, for example, a relational expression while a relationship among the vehicle requirement torque, the rotation torque, the rotation angle, and the target turning radius is determined beforehand by experiments and is pre-stored in the memory section of the control unit 103 as the relational expression.

Hereinafter, the subroutine for calculating the target front-to-rear tilt angle of a steering axis in Step M3 of the main routine is described by referring to FIG. 22(4). First, the same steps as Steps S11 to S14 of the above subroutine are executed (Steps S31 to S34). Note that when both the acceleration operator 22 and the brake operator 21 are operated and thus both the acceleration control input and the braking control input are detected in Steps S31 and S32, only the braking control input is used and the acceleration control input is neglected. Accordingly, the control unit 103 processes the task.

Finally, the value of the target front-to-rear tilt angle of the virtual straight line Lf (the steering axis) along the axis of the steering shaft member 51 is calculated (Step S35) using each of the values of the acceleration control input, the braking control input, and the running speed as obtained in Steps S31, S32, and S34. The value of the target front-to-rear tilt angle of a steering axis can be determined using, for example, a three-dimensional map or a relational expression while a relationship among the acceleration control input and the braking control input, the running speed, and the target front-to-rear tilt angle of a steering axis is determined beforehand by experiments and is pre-stored in the memory section of the control unit 103 as the three-dimensional map or the relational expression.

Hereinafter, the subroutine for calculating the target vehicle widthwise tilt angle of a vehicle body in Step M4 of the main routine is described by referring to FIG. 22(5). First, the value of the vehicle requirement torque as calculated in Step S15 of the above subroutine is input (Step S41). Next, the value of the target turning radius as calculated in Step S24 of the above subroutine is input (Step S42). Then, the value of the target front-to-rear tilt angle of a steering axis as calculated in Step S35 of the above subroutine is input (Step S43). Subsequently, using each of the values of the vehicle requirement torque, the target turning radius, and the target front-to-rear tilt angle of a steering axis as input in Steps S41 to S43, the value of the target vehicle widthwise tilt angle of the virtual straight line Lf (the target vehicle widthwise tilt angle of a steering axis) along the axis of the steering shaft member 51 and the value of the target rotation angle (target rear wheel movement angle) when the wheel holding members 65 rotate one another in opposite directions with respect to the first center support member 67 are each calculated (Steps S44 and S45).

The value of the target vehicle widthwise tilt angle of a steering axis can be determined using, for example, a relational expression while a relationship among the vehicle requirement torque, the target turning radius, the target front-to-rear tilt angle of a steering axis, and the target vehicle widthwise tilt angle of a steering axis is determined beforehand by experiments and is pre-stored in the memory section of the control unit 103 as the relational expression. In addition, the value of the target rear wheel movement angle can be determined using, for example, a relational expression while a relationship among the vehicle requirement torque, the target turning radius, the target front-to-rear tilt angle of a steering axis, and the target rear wheel movement angle is determined beforehand by experiments and is pre-stored in the memory section of the control unit 103 as the relational expression. The values of the target vehicle widthwise tilt angle of a steering axis and the target rear wheel movement angle when the vehicle 1 turns are each set such that the vehicle 1 is inclined by an optimal angle depending on the magnitude of the centrifugal force imposed on the vehicle 1.

Hereinafter, the subroutine for calculating the target turning resistance amount in Step M5 of the main routine is described by referring to FIG. 22(6). First, the rotation speed of each of the front wheels 3 and the rear wheels 9 is detected by each rotation speed sensor 109 (Step S51). Each rotation speed detected is averaged and the running speed of the vehicle 1 is determined on the basis of this average value (Step S52). Next, the rotation torque, which corresponds to the steering effort of the steering yoke 20, is detected by the torque sensor 111, and the value is input (Step S53). Then, the rotation angle, which corresponds to the steering angle of the steering yoke 20, is detected by the angle sensor 113, and the value is input (Step S54). After that, the turning angle, which corresponds to the rotation angle when the front wheel support member 29 rotates about the virtual straight line Lf along the axis of the steering shaft member 51, is detected by a turning angle sensor 115 having a rotary encoder, and the value is input (Step S55). The turning angle sensor 115 is disposed near the steering shaft member 51. The turning angle when the vehicle 1 travels straight is set to 0. Any one of the clockwise and counterclockwise rotation directions with respect to the above angle is defined as a positive direction. In turn, the other rotation direction is defined as a negative direction. In this way, the angle is so detected.

Note that instead of using the turning angle sensor 115, a yaw rate sensor can be employed that detects the angular velocity when the front wheel support member 29 rotates about the axis of the steering shaft member 51.

Thereafter, the turning angular velocity, which corresponds to the rotation angular velocity when the front wheel support member 29 rotates about the virtual straight line Lf along the axis of the steering shaft member 51, is calculated (Step S56) using the value of the turning angle as input in Step S55. Finally, each of the values of the running speed, the steering effort, the steering angle, and the turning angular velocity as obtained in Steps S52, S53, S54, and S56 is used to calculate (Step S57) the value of the target turning resistance amount that should be given as the resistance when the front wheel support member 29 rotates about the virtual straight line Lf. The target turning resistance amount can be determined using, for example, a relational expression while a relationship among the running speed, the steering effort, the steering angle, the turning angular velocity, and the target turning resistance amount is determined beforehand by experiments and is pre-stored in the memory section of the control unit 103 as the relational expression. The value of the target turning resistance amount is set such that as the running speed of the vehicle 1 increases, the braking force applied increases and when the vehicle 1 is stopped, the braking force is 0.

Hereinafter, the subroutine for calculating the target rear wheel movement-restricting amount in Step M6 of the main routine is described by referring to FIG. 23(7). First, the same steps as Steps S51 to S54 of the above subroutine are executed (Steps S61 to S64). Next, the target turning resistance amount as calculated in the subroutine for calculating the target turning resistance amount in the above Step M5 is input (Step S65). Finally, each of the values of the running speed, the steering effort, the steering angle, and the target turning resistance amount as obtained in Steps S62 to S65 is used to calculate (Step S66) the value of the target rear wheel movement-restricting amount that should be given as the resistance by the movement-restricting device 91 when the pair of left and right wheel holding members (65 and 65) each rotate about the axis of each swivel shaft 85. The value of the target rear wheel movement-restricting amount can be determined using, for example, a relational expression while a relationship among the running speed, the steering effort, the steering angle, the target turning resistance amount, and the target rear wheel movement-restricting amount is determined beforehand by experiments and is pre-stored in the memory section of the control unit 103 as the relational expression. The value of the target rear wheel movement-restricting amount is basically set such that as the running speed of the vehicle 1 increases, the braking force applied increases. However, when the vehicle 1 is stopped or travels straight at a low speed, the braking force may be maximum, so that the movement-restricting device 91 may be set under a locking condition. In addition, when the vehicle 1 turns, the braking force may be set in accordance with each of the values of the running speed and the turning angle.

Hereinafter, the subroutine for calculating each target torque in Step M7 of the main routine is described by referring to FIG. 23(8). First, the rotation torque, which corresponds to the steering effort of the steering yoke 20, is detected by the torque sensor 111, and the value is input (Step S71). Next, the rotation angle, which corresponds to the steering angle of the steering yoke 20, is detected by the angle sensor 113, and the value is input (Step S72). Then, each of the values of the rotation torque and the rotation angle as input in Steps S71 and S72 and the turning state determination table as shown in Table 1 are used to determine which of the straight running state or the turning state the vehicle 1 undergoes (Step S73). The turning state determination table is pre-stored in the memory section inside the control unit 103. If both the value of the rotation torque detected by the torque sensor 111 and the value of the rotation angle detected by the angle sensor 113 are 0, it is determined that the vehicle 1 is under the straight running state. In addition, if the value of the rotation torque detected by the torque sensor 111 increases from 0 to some positive value and the value of the rotation angle detected by the angle sensor 113 is 0, it is determined that the vehicle 1 is switched from the straight running state to the turning state.

TABLE 1

Turning State Determination Table

| Steering Effort | 0 | 0 -> + | + | + -> 0 |
|---|---|---|---|---|
| Steering Angle | 0 | 0 | + | + |
| Determination | Straight Running State | Straight Running -> Turning | During Turning | Turning -> Straight Running |

In addition, if both the value of the rotation torque detected by the torque sensor 111 and the value of the rotation angle detected by the angle sensor 113 are some positive values, it is determined that the vehicle 1 is turning. In addition, if the value of the rotation torque detected by the torque sensor 111 decreases from some positive value to 0 and the value of the rotation angle detected by the angle sensor 113 is some positive value, it is determined that the vehicle 1 is switched from the turning state to the straight running state. Next, the value of the target front-to-rear tilt angle of a steering axis as calculated in Step S35 of the above subroutine is input (Step S74). Then, the value of the vehicle requirement torque as calculated in Step S15 of the above subroutine is input (Step S75). After that, the map selection table shown in Table 2 is used to select a map on the basis of the straight running or turning state of the vehicle 1 as determined in Step 73 and the value of the vehicle requirement torque as input in Step S75. The selected map is used to calculate (Step S76) the difference between the front wheel requirement torque (drive torque or brake torque) that should be given to each front wheel 3 and the rear wheel requirement torque (drive torque or brake torque) that should be given to each rear wheel 9. Note that the map selection table shown in Table 2 has two sections in accordance with whether the vehicle requirement torque is positive or negative. Instead of using this, the table may be divided stepwise into three or more sections depending on the value of the vehicle requirement torque.

TABLE 2

Map Selection Table

| Vehicle Requirement Torque | Positive | Negative |
|---|---|---|
| Straight Running State | Map 11 | Map 12 |
| Straight Running -> Turning | Map 21 | Map 22 |
| During Turning | Map 31 | Map 32 |
| Turning -> Straight Running | Map 41 | Map 42 |

Next, the front wheel requirement torque and the rear wheel requirement torque are determined (Step S77) on the basis of the difference between the front wheel requirement torque and the rear wheel requirement torque as calculated in Step S76 and the value of the vehicle requirement torque as input in Step S75. Steps S76 and S77 are further detailed by referring to FIGS. 24 and 25. For instance, if it is determined in Step 73 that the vehicle 1 is under the straight running state and is determined that the value of the vehicle requirement torque as input in Step S75 is positive, the map 11 is selected using the map selection table. In maps 11 and 12 shown in FIG. 24, the abscissa represents the target front-to-rear tilt angle of a steering axis. The ordinate represents the front wheel requirement torque and the rear wheel requirement torque. The solid line denotes characteristics of the front wheel requirement torque. The dashed line denotes characteristics of the rear wheel requirement torque. These characteristics can be determined by experiments. Note that for convenience, FIG. 24 depicts only maps 11 and 12 among a plurality of maps described in Table 2. However, there are other maps (e.g., map 21) like these maps. All the maps are pre-stored in the memory section inside the control unit 103.

In map 11 shown in FIG. 24(1), the target front-to-rear tilt angle of a steering axis as input in Step S74 is Θ1. In addition, the front wheel requirement torque and the rear wheel requirement torque corresponding to the Θ1 in map 11 are Tf1 and Tr1, respectively. Then, the difference ΔT1 between the front wheel requirement torque Tf1 and the rear wheel requirement torque Tr1 is determined (Step S76). In this case, the front wheel requirement torque Tf1 is a total of the values of the drive torque given to each front wheel 3 by each electric motor 25. Also, the rear wheel requirement torque Tr1 is a total of the values of the drive torque given to each rear wheel 9 by each electric motor 25.

Meanwhile, if it is determined in Step 73 that the vehicle 1 is under the straight running state and is determined that the value of the vehicle requirement torque as input in Step S75 is negative, the map 12 is selected (see FIG. 24(2)) using the map selection table of Table 2. Here, the value of the target front-to-rear tilt angle of a steering axis as input in Step S74 is Θ1. In addition, the front wheel requirement torque and the rear wheel requirement torque corresponding to the Θ1 are Tf2 and Tr2, respectively. Then, the difference ΔT2 between the front wheel requirement torque Tf2 and the rear wheel requirement torque Tr2 is determined (Step S76). In this case, the front wheel requirement torque Tf2 is a total of the values of the brake torque given to each front wheel 3 by each electric brake motor 27. Also, the rear wheel requirement torque Tr2 is a total of the values of the brake torque given to each rear wheel 9 by each electric brake motor 27.

FIG. 25 schematically illustrates states where the front wheel requirement torque (Tf1 and Tf2) and the rear wheel requirement torque (Tr1 and Tr2) are applied to each front wheel 3 and each rear wheel 9. As is clear from FIG. 25(1), when the front-to-rear tilt angle of a steering axis is Θ1, the intersection point K where the virtual straight line Lf along the axis of the steering shaft member 51 intersects the traveling road surface R is positioned forwardly of a virtual straight line (including ground contact points) drawn between the ground contact points of the front wheels 3 on the traveling road surface R. The caster offset Q is a positive value.

In addition, when the target front-to-rear tilt angle of a steering axis is Θ2, the value of the front wheel requirement torque Tf3 is equal to the value of the rear wheel requirement torque Tr3 in map 11. Thus, the difference ΔT3 therebetween is 0. Also, the value of the front wheel requirement torque Tf4 is equal to the value of the rear wheel requirement torque Tr4 in map 12. Thus, the difference ΔT4 therebetween is 0. In this case, the front wheel requirement torque Tf3 is a total of the values of the drive torque given to each front wheel 3 by each electric motor 25. Also, the rear wheel requirement torque Tr3 is a total of the values of the drive torque given to each rear wheel 9 by each electric motor 25. In addition, the front wheel requirement torque Tf4 is a total of the values of the brake torque given to each front wheel 3 by each electric brake motor 27. Also, the rear wheel requirement torque Tr4 is a total of the values of the brake torque given to each rear wheel 9 by each electric brake motor 27. FIG. 25(2) schematically illustrates a state where the front wheel requirement torque (Tf3 and Tf4) and the rear wheel requirement torque (Tr3 and Tr4) are applied to each front wheel 3 and each rear wheel 9. As is clear from this diagram, when the front-to-rear tilt angle of a steering axis is Θ2, the intersection point K where the virtual straight line Lf along the axis of the steering shaft member 51 intersects the traveling road surface R is positioned on the virtual straight line (including ground contact points) drawn between the ground contact points of the front wheels 3 on the traveling road surface R. Thus, the caster offset Q is 0.

In addition, when the target front-to-rear tilt angle of a steering axis is Θ3, the difference between the value of the front wheel requirement torque Tf5 and the value of the rear wheel requirement torque Tr5 in map 11 is ΔT5. Meanwhile, the difference between the value of the front wheel requirement torque Tf6 and the value of the rear wheel requirement torque Tr6 in map 12 is ΔT6. In this case, the front wheel requirement torque Tf5 is a total of the values of the drive torque given to each front wheel 3 by each electric motor 25. Also, the rear wheel requirement torque Tr5 is a total of the values of the drive torque given to each rear wheel 9 by each electric motor 25. In addition, the front wheel requirement torque Tf6 is a total of the values of the brake torque given to each front wheel 3 by each electric brake motor 27. Also, the rear wheel requirement torque Tr6 is a total of the values of the brake torque given to each rear wheel 9 by each electric brake motor 27. FIG. 25(3) schematically illustrates a state where the front wheel requirement torque (Tf5 and Tf6) and the rear wheel requirement torque (Tr5 and Tr6) are applied to each front wheel 3 and each rear wheel 9. As is clear from this diagram, when the front-to-rear tilt angle of a steering axis is Θ3, the intersection point K where the virtual straight line Lf along the axis of the steering shaft member 51 intersects the traveling road surface R is positioned rearwardly of the virtual straight line (including ground contact points) drawn between the ground contact points of the front wheels 3 on the traveling road surface R. Thus, the caster offset Q is a negative value. Such a state is suited for when the vehicle 1 accelerates, so that the straight-traveling stability can be better.

Hereinafter, regarding the values of each requirement torque, the front wheel requirement torque is generally referred to as Tfn and the rear wheel requirement torque as Trn. The difference between Tfn and Trn is ΔTn. Further, a total of Tfn and Trn is the vehicle requirement torque Tn. The relational expressions for the respective values are represented by the following equations 1 and 2. These equations are used to determine the front wheel requirement torque Tfn and the rear wheel requirement torque Trn (Step S77).

[Expression 1]

$$Tf_n - Tr_n = \Delta T_n \quad \text{(Equation 1)}$$

$$Tf_n + Tr_n = T_n \quad \text{(Equation 2)}$$

Next, the value of the target turning radius as calculated in Step S24 of the above subroutine is input (Step S78). Then, the rotation speed of each of the front wheels 3 and the rear wheels 9 is detected by each rotation speed sensor 109, and the value is input (Step S79). Each rotation speed is averaged and the running speed of the vehicle 1 is determined on the basis of this average value (Step S80). After that, the value of the target vehicle widthwise tilt angle of a steering axis as calculated in Step S44 of the above subroutine and the value of the target rear wheel movement angle as calculated in Step S45 of the above subroutine are input (Steps S81 and S82).

Finally, the value of each requirement torque that should be given to each front wheel 3 is calculated (Step S83) on the basis of each of the values of the front wheel requirement torque as calculated in Step S77, the target turning radius as input in Step 78, the running speed of the vehicle 1 as calculated in Step S80, and the target vehicle widthwise tilt angle of a steering axis as input in Step S81. At the same time, the value of each requirement torque that should be given to each rear wheel 9 is calculated (Step S83) on the basis of each of the values of the rear wheel requirement torque as calculated in Step S77, the target turning radius, the running speed, and the target rear wheel movement angle as input in Step S82. The value of each requirement torque that should be given to each front wheel 3 can be determined using, for example, a relational expression while a relationship among the front wheel requirement torque, the target turning radius, the running speed of the vehicle 1, the target vehicle widthwise tilt angle of a steering axis, and each given requirement torque is determined beforehand by experiments and is pre-stored in the memory section of the control unit 103 as the relational expression.

Likewise, the value of each requirement torque that should be given to each rear wheel 9 can be determined using, for example, a relational expression while a relationship among the rear wheel requirement torque, the target turning radius, the running speed of the vehicle 1, the target rear wheel movement angle, and each given requirement torque is determined beforehand by experiments and is pre-stored in the memory section of the control unit 103 as the relational expression. Note that this relational expression includes the target turning radius and the running speed of the vehicle 1. This is because the centrifugal force imposed, depending on these values, on the vehicle 1 causes the vertical loads of each front wheel 3 and each rear wheel 9 to differ from one another. This is taken into consideration to determine the appropriate value of each requirement torque that should be given to each of the front wheels 3 and the rear wheels 9.

Now, back to the main routine illustrated in FIG. 21(1). The following describes the control of the vehicle 1 by the control unit 103. In Step M8, each of the values of the vehicle requirement torque as calculated in Step M1 and the target torque for each wheel as calculated in Step M7 is used to calculate respective command values so as to actuate each electric motor 25 and each electric brake motor 27. The value of the target front-to-rear tilt angle of a steering axis as calculated in Step M3 is used to calculate a command value so as to actuate the electric actuator 57. The value of the target turning resistance amount as calculated in Step M5 is used to calculate a command value so as to actuate the flow resistance-adjusting device 101. The value of the target rear wheel movement-restricting amount as calculated in Step M6 is used to calculate a command value so as to actuate the movement-restricting device 91. Each command value as obtained by these calculations is used to make the control unit 103 control various devices such as each electric motor 25 and/or each electric brake motor 27.

Note that when the vehicle 1 travels at a low speed, the rear wheel 9 side has larger torque given than the front wheel 3 side. When the vehicle 1 travels at a high speed, the configuration is the other way around. Because of this, a high-speed rotation motor such as an SR (Switched Reluctance) motor is preferably used as the motor 25 on the front wheel 3 side. Also, a high-torque motor such as an IPM (Interior Permanent Magnet) motor, which has a magnet embedded in a rotor, is preferably used as the motor 25 on the rear wheel 9 side. In addition, when a motor of the same type is used on the front wheel 3 side and the rear wheel 9 side as an alternative, it is desirable that the motor used on the rear wheel 9 side has a higher speed reduction rate than that on the front wheel 3 side.

Regarding whether or not the various devices are controlled correctly in response to the command values, various sensors continuously monitor how the various devices work. Then, feedback control is executed such that the various devices work correctly in response to the command values. For instance, the feedback control regarding the target vehicle widthwise tilt angle of a steering axis as obtained in Step S44 of the subroutine shown in FIG. 22(5) is executed while the vehicle body frame 7 attitude is monitored by a vehicle attitude detection sensor 114. The control of the target rear wheel movement angle as obtained in Step S45 of the above subroutine is executed while the rotation angle position of the rotating plate 89 is monitored by the angle sensor 92.

According to the above-described Embodiment of the present invention, the front wheels 3 (and the rear wheels 9) are mechanically interlocked to one another by means of the front wheel support member 29 (and the wheel holding members 65) and can be displaced relatively to one another vertically in opposite directions with respect to the vehicle body frame 7. The difference in torque, which is given by the electric motors 25 and the electric brake motors 27, between the front wheels 3 (the rear wheels 9) causes the front wheel support member 29 (the wheel holding members 65) to rotate with respect to the first center support member 31 (67). This allows the front wheels 3 (the rear wheels 9) to be displaced relatively to one another vertically in opposite directions with respect to the vehicle body frame 7. Thus, the front wheels 3 (the rear wheels 9) can be reliably displaced to one another vertically in opposite directions. Accordingly, only one front wheel 3 (or only one rear wheel 9) cannot be displaced disproportionately.

Meanwhile, the second center support member 33, which supports the front wheel support member 29 by means of the first center support member 31, is supported via the elastic member 35 by the third center support member 37. The third center support member 37 is supported via the elastic member 39 by the vehicle body frame 7. Further, the second center support member 33 is supported by the front-side torsion spring member 41 fixed to the vehicle body frame 7.

Meanwhile, the first center support member 67 supporting the wheel holding members 65 is supported via the elastic member 81 by the second center support member 69. The second center support member 69 is supported via the elastic member 75 by the vehicle body frame 7. Further, the first center support member 67 is supported by the rear-side torsion spring member 73 fixed to the vehicle body frame 7. Consequently, the traveling road surface R roughness-derived vibrations can be prevented from spreading from each front wheel 3 (each rear wheel 9) via the front wheel support member 29 (the wheel holding member 65), etc., and the second center support member 33 and the third center support member 37 (the second center support member 69) further to the vehicle body frame 7.

In addition, the front wheel support member 29 is pivotally supported using the first center support member 31, etc., by the vehicle body frame 7 about the virtual straight line Lf along the axis of the tilted steering shaft member 51, the upper portion of which is positioned forwardly of the lower portion. Accordingly, the difference in drive torque or brake torque given to each front wheel 3 causes the front wheel support member 29 to rotate with respect to the first center support member 31, so that the front wheels 3 can be easily displaced vertically in opposite directions.

In this way, the front wheels 3 can be mechanically interlocked and be displaced relatively to one another vertically in opposite directions with respect to the vehicle body frame 7. Accordingly, the front wheel support member 29 can be rotated with respect to the first center support member 31 while the front wheel support member 29, the first center support member 31, and the second center support member 33 are not rotated with respect to the third center support member 37 about the virtual straight line Ef. Thus, the front wheels 3 can be displaced relatively to one another vertically in opposite directions, so that the vehicle body frame 7 can be tilted. As a result, when the front wheel support member 29, the first center support member 31, and the second center support member 33 as a whole rotate, in response to the traveling road surface roughness, about the virtual straight line Ef, the front wheel support member 29 can be rotated, independent of the former rotation, with respect to the first center support member 31. This configuration enables the vehicle body frame 7 to be reliably tilted. Hence, the control that allows the vehicle body frame 7 to be tilted can be easily carried out.

In addition, regarding the rear wheel 9 side, the rear wheels 9 are mechanically interlocked by means of the main bevel gears 83 and the intermediate bevel gear 87 and can be displaced relatively to one another vertically in opposite directions with respect to the vehicle body frame 7. Accordingly, the rear wheels 9 can be reliably displaced vertically in opposite directions. Also, the linkage mechanism therefor can be constructed using a simple mechanism.

In this way, the rear wheels 9 can be mechanically interlocked and be displaced relatively to one another vertically in opposite directions with respect to the vehicle body frame 7. Accordingly, each wheel holding member 65 can be rotated with respect to the first center support member 67 while each wheel holding member 65 and the first center support member 67 are not rotated with respect to the second center support member 69 about the virtual straight line Er. Thus, the rear wheels 9 can be displaced relatively to one another vertically in opposite directions, so that the vehicle body frame 7 can be tilted. As a result, when each wheel holding member 65 and the first center support member 67 as a whole rotate, in response to the traveling road surface roughness, about the virtual straight line Er, each wheel holding member 65 can be rotated, independent of the former rotation, with respect to the first center support member 67. This configuration enables the vehicle body frame 7 to be reliably tilted. Hence, the control that allows the vehicle body frame 7 to be tilted can be easily carried out.

In addition, when the front wheel support member 29 rotates about the virtual straight line Lf along the axis of the steering shaft member 51, each camber shaft 49, the steering shaft member 51, the first link member 59, and each camber link member 61, etc., are interlocked to one another. Depending on the amount of the rotation, each front wheel 3 is tilted inwardly in the turning direction, which improves the turning ability of the vehicle 1.

In addition, the steering shaft member 51 is tilted such that when the vehicle 1 accelerates in a traveling direction, the intersection point K where the traveling road surface R intersects the virtual straight line Lf along the axis of the steering shaft member 51 is positioned in the vehicle 1 traveling direction rearwardly of the virtual straight line connecting the ground contact points S of the front wheels 3. Thus, the vehicle 1 can have improved straight-traveling stability during acceleration.

Furthermore, when the electric actuator 57 is appropriately actuated, the angle of inclination of the virtual straight line Lf along the axis of the steering shaft member 51 can be altered depending on the running speed of the vehicle 1. Thus, the angle of inclination of the virtual straight line Lf can be set to an angle that is fit for the running speed of the vehicle 1.

The following describes eight Modification Embodiments of the present invention. Note that in the drawings referred to in the descriptions of these Modification Embodiments, the same reference signs are used for the same or comparable members, parts, and directions as in the descriptions of the above-described Embodiment and the preceding Modification Embodiments. Also, the detailed explanations are omitted. It is needless to say that these Modification Embodiments can exert substantially the same effects in the same or comparable configurations as described in the above-described Embodiment and the preceding Modification Embodiments.

First Modification Embodiment

The previous Embodiment illustrates an example in which an occupant on the vehicle 1 operates the brake operator 21 and the acceleration operator 22 installed on the steering yoke 20 and manually drives the vehicle 1. However, like the first Modification Embodiment as illustrated in FIGS. 26 to 30, the automatic driving mode in which neither the steering yoke 20, the brake operator 21, nor the acceleration operator 22 of the vehicle 1 is manipulated may be optionally switched to and from the above manual driving mode.

In this Modification Embodiment, the vehicle 1 carries various on-vehicle devices including: a switching unit 130 for switching between the manual driving mode and the automatic driving mode; an imaging unit 131 for imaging the traveling direction of the vehicle 1; a map information storage unit 133 for storing road map information; a travel route control unit 135 for guiding the vehicle through a travel route to a destination after the destination has been input; a traffic information-receiving unit 137 for receiving traffic information such as the location of traffic jam and/or an accident on a road; a GPS receiver 139 for receiving information on the current position of the vehicle 1; a drive assistance and communication unit 141 for performing wireless communication with communication devices installed at or near the road and/or other vehicles; and an obstacle detection unit 143 for detecting an obstacle such as another vehicle and/or trees.

Figure 27:
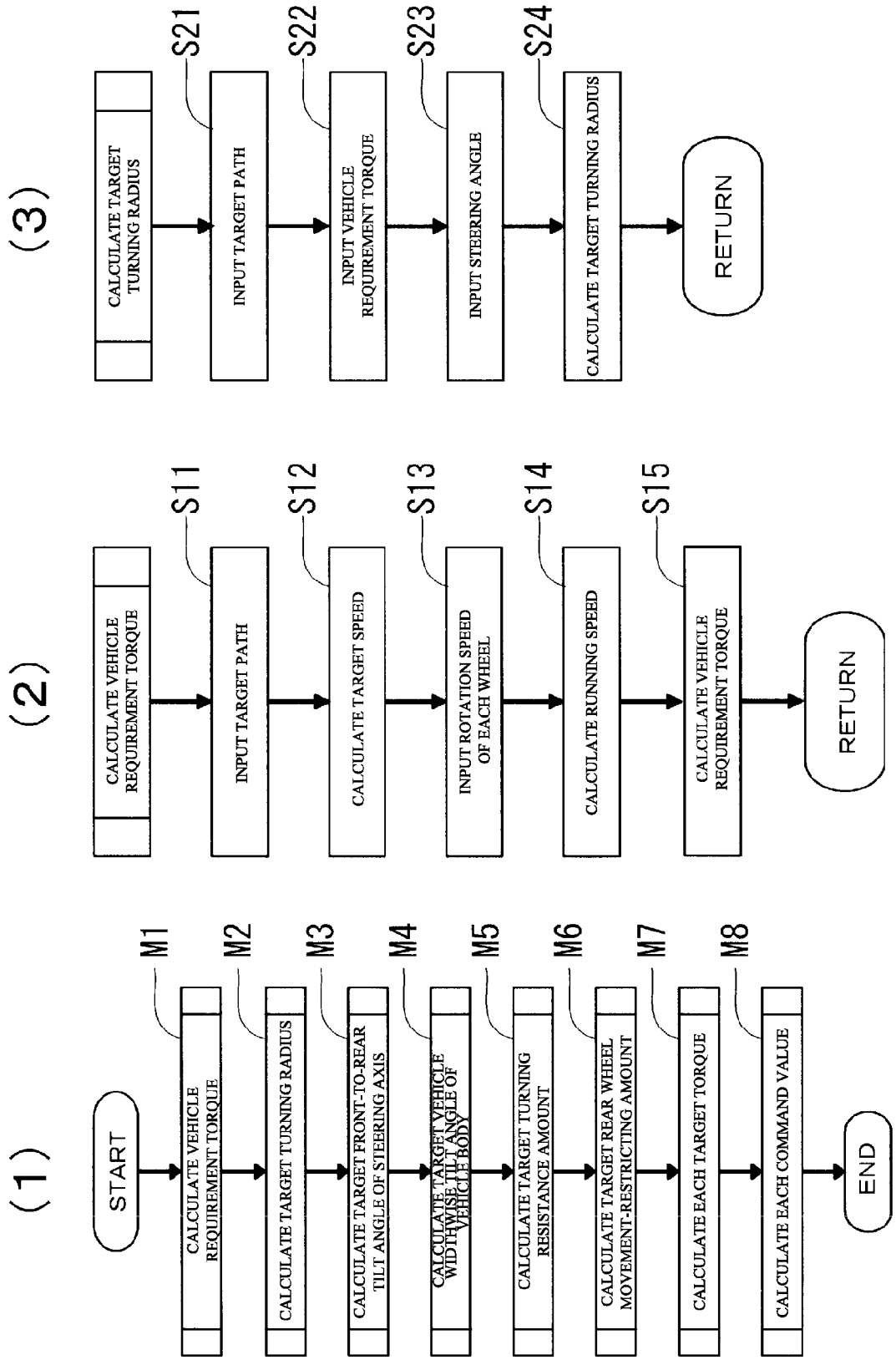
FIG. 27 is part of flow charts illustrating the specifics of the control executed by the control unit of the vehicle according to the first Modification Embodiment.

The following describes the vehicle 1 control executed by the on-vehicle control unit 103. FIG. 27(1) illustrates a general sketch of control in a main routine. This main routine is identical to that of the Embodiment shown in FIG. 21(1). Thus, the detailed explanation is omitted.

Figure 29:
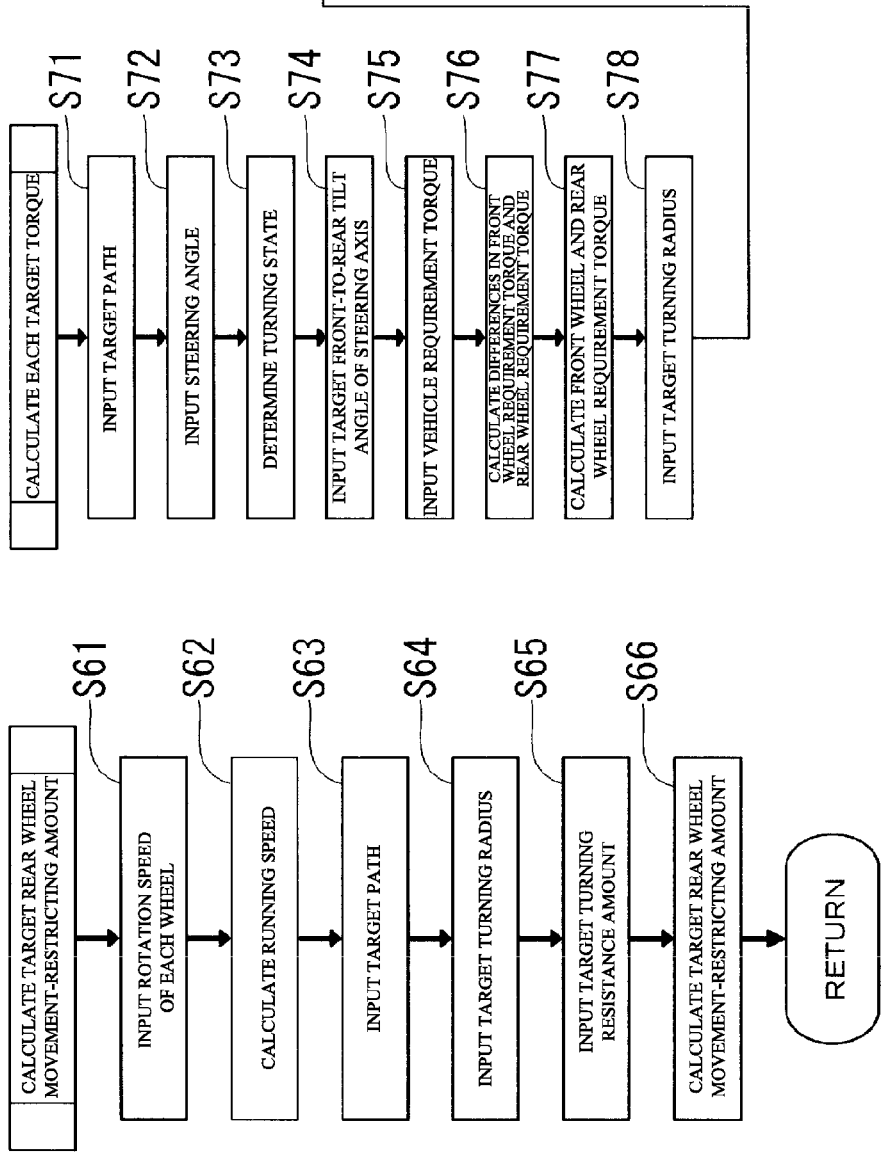
FIG. 29 is part of flow charts illustrating the specifics of the control executed by the control unit of the vehicle according to the first Modification Embodiment.

Hereinafter, subroutines executed in each of Steps M1 to M8 of the main routine shown in FIG. 27(1) are described in detail by referring to FIG. 27(2) to FIG. 29(8).

First, the subroutine for calculating the vehicle requirement torque in Step M1 is described by referring to FIG. 27(2). By using the road map information stored in the map information storage unit 133, the destination input by the travel route control unit 135, and the information received by the GPS receiver 139 with regard to the current position of the vehicle 1, the path to the destination (target path) is calculated, and the path information is input (Step S11). When this target path is calculated, the calculation may be performed by taking into consideration traffic information such as the location of traffic jam and/or an accident as received by the traffic information-receiving unit 137. The path information includes information on the distance from the current position to the destination and the road grade.

Next, the drive assistance and communication unit 141 is used to receive information on the speed limit of the road from the communication devices installed at or near the road. By using the information on the speed limit and/or the path information as input in Step S11, the target speed is calculated (Step S12).

Then, in the same manner as in Steps S13 and S14 of the previous Embodiment in FIG. 21(2), the rotation speed of each of the front wheels 3 and the rear wheels 9 is detected (Step S13); and the running speed of the vehicle 1 is determined (Step S14). Finally, the value of the vehicle requirement torque is calculated (Step S15) using each of the values of the path information, the target speed, and the running speed as obtained in Steps S11, S12, and S14. The value of this vehicle requirement torque can be determined using, for example, a relational expression while a relationship among the path information, the target speed, the running speed, and the vehicle requirement torque is determined beforehand by experiments and is pre-stored in the memory section of the control unit 103 as the relational expression.

Hereinafter, the subroutine for calculating the target turning radius in Step M2 of the main routine is described by referring to FIG. 27(3). First, the target path is determined in the same manner as in Step S11 of the above subroutine, and the path information is input (Step S21). Next, the value of the vehicle requirement torque as calculated in Step S15 of the above subroutine is input (Step S22). Then, the rotation angle, which corresponds to the steering angle during the rotation of the steering yoke 20 about the axis of the steering yoke shaft 20*a*, is detected by the angle sensor 113, and the value is input (Step S23). Note that an electromagnetic clutch may be disposed in a lengthwise intermediate section of the steering yoke shaft 20*a*. In the case of the manual driving mode, the electromagnetic clutch is engaged, so that the steering yoke 20 and the steering yoke shaft 20*a* rotate as one structure. By contrast, in the case of the automatic driving mode, the electromagnetic clutch may be disengaged, so that the steering yoke 20 is locked such that the steering yoke 20 does not rotate.

Finally, the target turning radius, with which the center of the vehicle 1 moves during driving of the vehicle 1, is calculated (Step S24) using each of the values of the target path, the vehicle requirement torque, and the rotation angle as input in Steps S21 to S23. The turning radius can be determined using, for example, a relational expression while a relationship among the target path, the vehicle requirement torque, the rotation angle, and the target turning radius is determined beforehand by experiments and is pre-stored in the memory section of the control unit 103 as the relational expression.

Figure 28:
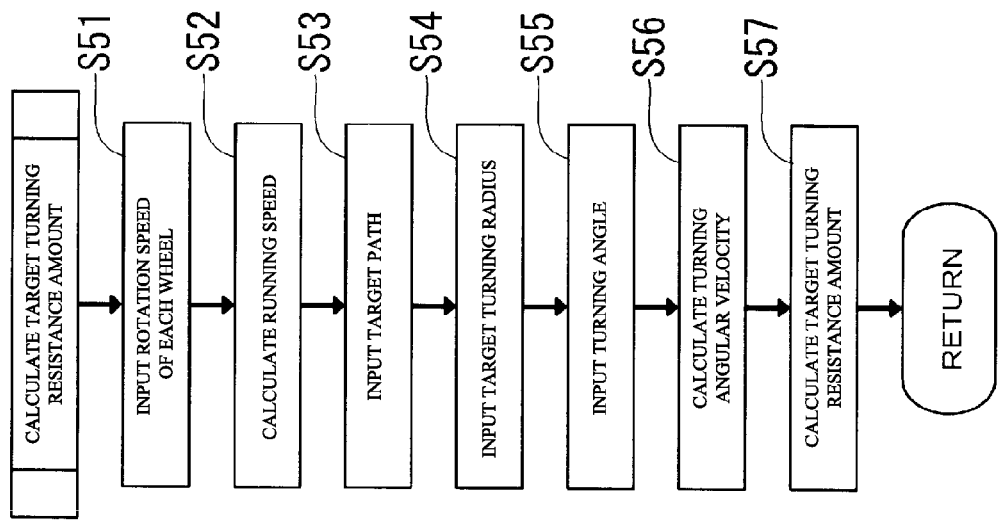
FIG. 28 is part of flow charts illustrating the specifics of the control executed by the control unit of the vehicle according to the first Modification Embodiment.

Hereinafter, the subroutine for calculating the target front-to-rear tilt angle of a steering axis in Step M3 of the main routine is described by referring to FIG. 28(4). First, the same steps as Steps S11 to S14 of the above subroutine are executed (Steps S31 to S34).

Finally, the value of the target front-to-rear tilt angle of the virtual straight line Lf along the axis of the steering shaft member 51 (the target front-to-rear tilt angle of a steering axis) is calculated (Step S35) using each of the values of the target path, the target speed, and the running speed as obtained in Steps S31, S32, and S34. The value of the target front-to-rear tilt angle of a steering axis can be determined using, for example, a relational expression while a relationship among the acceleration control input and the braking control input, the running speed, and the target front-to-rear tilt angle of a steering axis is determined beforehand by experiments and is pre-stored in the memory section of the control unit 103 as the relational expression.

Hereinafter, the subroutine for calculating the target vehicle widthwise tilt angle of a vehicle in Step M4 of the main routine is described by referring to FIG. 28(5). First, in the same manner as in Steps S41 to S45 of the previous Embodiment in FIG. 22(5), the value of the target vehicle widthwise tilt angle of the virtual straight line Lf along the axis of the steering shaft member 51 (the target vehicle widthwise tilt angle of a steering axis) and the value of the target rotation angle (target rear wheel movement angle) when the wheel holding members 65 rotate to one another in opposite directions with respect to the first center support member 67 are each calculated (Steps S41 to S45).

The target vehicle widthwise tilt angle of a steering axis can be determined using, for example, a relational expression while a relationship among the vehicle requirement torque, the target turning radius, the target front-to-rear tilt angle of a steering axis, and the target vehicle widthwise tilt angle of a steering axis is determined beforehand by experiments and is pre-stored in the memory section of the control unit 103 as the relational expression. In addition, the value of the target rear wheel movement angle can be determined using, for example, a relational expression while a relationship among the vehicle requirement torque, the target turning radius, the target front-to-rear tilt angle of a steering axis, and the target rear wheel movement angle is determined beforehand by experiments and is pre-stored in the memory section of the control unit 103 as the relational expression.

Hereinafter, the subroutine for calculating the target turning resistance amount in Step M5 of the main routine is described by referring to FIG. 28(6). First, the rotation speed of each of the front wheels 3 and the rear wheels 9 is detected by each rotation speed sensor 109 (Step S51). Each rotation speed detected is averaged and the running speed of the vehicle 1 is determined on the basis of this average value (Step S52). Next, the target path is determined in the same manner as in Step S11 of the above subroutine, and the path information is input (Step S53). Then, the target turning radius as calculated in Step S24 of the above subroutine is input (Step S54). After that, the turning angle, which corresponds to the rotation angle when the front wheel support member 29 rotates about the virtual straight line Lf along the axis of the steering shaft member 51, is detected by the turning angle sensor 115, and the value is input (Step S55).

Thereafter, the turning angular velocity, which corresponds to the rotation angular velocity when the front wheel support member 29 rotates about the virtual straight line Lf along the axis of the steering shaft member 51, is calculated (Step S56) using the value of the turning angle as input in Step S55. Finally, each of the values of the running speed, the target path, the target turning radius, and the turning angular velocity as obtained in Steps S52, S53, S54, and S56 is used to calculate (Step S57) the value of the target turning resistance amount that should be given as the resistance when the front wheel support member 29 rotates about the virtual straight line Lf along the axis of the steering shaft member 51. The value of the target turning resistance amount can be determined using, for example, a relational expression while a relationship among the running speed, the target path, the target turning radius, the turning angular velocity, and the target turning resistance amount is determined beforehand by experiments and is pre-stored in the memory section of the control unit 103 as the relational expression.

Hereinafter, the subroutine for calculating the target rear wheel movement-restricting amount in Step M6 of the main routine is described by referring to FIG. 29(7). First, the same steps as Steps S51 to S54 of the above subroutine are executed (Steps S61 to S64). Next, the target turning resistance amount as calculated in Step S57 of the above subroutine is input (Step S65). Finally, each of the values of the running speed, the target path, the target turning radius, and the target turning resistance amount as obtained in Steps S62 to S65 is used to calculate (Step S66) the value of the target rear wheel movement-restricting amount that should be given as the resistance by the movement-restricting device 91 when the pair of left and right wheel holding members (65 and 65) each rotate about the axis of each swivel shaft 85. The value of the target rear wheel movement-restricting amount can be determined using, for example, a relational expression while a relationship among the running speed, the target path, the target turning radius, the target turning resistance amount, and the target rear wheel movement-restricting amount is determined beforehand by experiments and is pre-stored in the memory section of the control unit 103 as the relational expression.

Hereinafter, the subroutine for calculating each target torque in Step M7 of the main routine is described by referring to FIG. 29(8). First, the target path is determined in the same manner as in Step S11 of the above subroutine, and the path information is input (Step S71). Next, the turning angle is input (Step S72) in the same manner as in Step S55 of the above subroutine. Then, each of the values of the path information and the turning angle as input in Steps S71 and S72 and the turning state determination table as shown in Table 3 are used to determine which of the straight running state or the turning state the vehicle 1 undergoes (Step S73). The turning state determination table is pre-stored in the memory section inside the control unit 103. When the path information input in Step S71 indicates that the vehicle travels straight and the value of the turning angle detected by the turning angle sensor 115 is 0, it is determined that the vehicle 1 is under the straight running state. In addition, when the path information indicates that the vehicle is going to turn after the straight running and the value of the turning angle detected by the turning angle sensor 115 is 0, it is determined that the state of the vehicle 1 is switched from the straight running state to the turning state.

TABLE 3

Turning State Determination Table

| Target Path | Straight Running | Straight Running -> turning | Turning | Turning -> Straight Running |
|---|---|---|---|---|
| Turning Angle Determination | 0 | 0 | + | + |
| | Straight Running State | Straight Running -> turning | During Turning | Turning -> Straight Running |

Further, when the path information indicates that the vehicle is going to turn and the value of the turning angle detected by the turning angle sensor 115 is some positive value, it is determined that the vehicle 1 is turning. Furthermore, when the path information indicates that the vehicle is going to travel straight after the turning state and the value of the turning angle detected by the turning angle sensor 115 is some positive value, it is determined that the state of the vehicle 1 is switched from the turning state to the straight running state. Next, the value of the target front-to-rear tilt angle of a steering axis as calculated in Step S35 of the above subroutine is input (Step S74). Then, the value of the vehicle requirement torque as calculated in Step S15 of the above subroutine is input (Step S75). After that, based on the straight running or turning state of the vehicle 1 as determined in Step S73 and the value of the vehicle requirement torque as input in Step S75, a table, like the map selection table of the previous Embodiment in Table 2, is used to select a map. The selected map is used to calculate (Step S76) the difference between the torque (drive torque or brake torque) that should be given to each front wheel 3 and the torque (drive torque or brake torque) that should be given to each rear wheel 9.

Subsequently, the front wheel requirement torque and the rear wheel requirement torque are determined (Step S77) on the basis of the difference between the front wheel requirement torque and the rear wheel requirement torque as calculated in Step S76 and the value of the vehicle requirement torque as input in Step S75. The details of these Steps S76 and S77 are substantially the same as the content described in Steps S76 and S77 of the previous Embodiment in FIG. 23(7). Thus, the detailed explanation is omitted.

Next, the value of the target turning radius as calculated in Step S24 of the above subroutine is input (Step S78). Then, the rotation speed of each of the front wheels 3 and the rear wheels 9 is detected by each rotation speed sensor 109, and the value is input (Step S79). Each input rotation speed is averaged and the running speed of the vehicle 1 is determined on the basis of this average value (Step S80). After that, the value of the target vehicle widthwise tilt angle of a steering axis as calculated in Step S44 of the above subroutine and the value of the target rear wheel movement angle as calculated in Step S45 of the above subroutine are input (Steps S81 and S82).

Finally, the value of each requirement torque that should be given to each front wheel 3 is calculated (Step S83) on the basis of each of the values of the front wheel requirement torque as calculated in Step S77, the target turning radius as input in Step 78, the running speed of the vehicle 1 as calculated in Step S80, and the target vehicle widthwise tilt angle of a steering axis as input in Step S81. At the same time, the value of each requirement torque that should be given to each rear wheel 9 is calculated (Step S83) on the basis of each of the values of the rear wheel requirement torque as calculated in Step S77, the target turning radius, the running speed of the vehicle 1, and the target rear wheel movement angle as input in Step S82. The value of each requirement torque that should be given to each front wheel 3 can be determined using, for example, a relational expression while a relationship among the front wheel requirement torque, the target turning radius, the running speed of the vehicle 1, the target vehicle widthwise tilt angle of a steering axis, and each given requirement torque is determined beforehand by experiments and is pre-stored in the memory section of the control unit 103 as the relational expression.

Likewise, the value of each requirement torque that should be given to each rear wheel 9 can be determined using, for example, a relational expression while a relationship among the rear wheel requirement torque, the target turning radius, the running speed of the vehicle 1, the target rear wheel movement angle, and each given requirement torque is determined beforehand by experiments and is pre-stored in the memory section of the control unit 103 as the relational expression. Note that this relational expression includes the target turning radius and the running speed of the vehicle 1. This is because the centrifugal force imposed, depending on these values, on the vehicle 1 causes the vertical loads of each front wheel 3 and each rear wheel 9 to differ from one another. This is taken into consideration to determine the appropriate value of each requirement torque that should be given to each of the front wheels 3 and the rear wheels 9.

Figure 30:
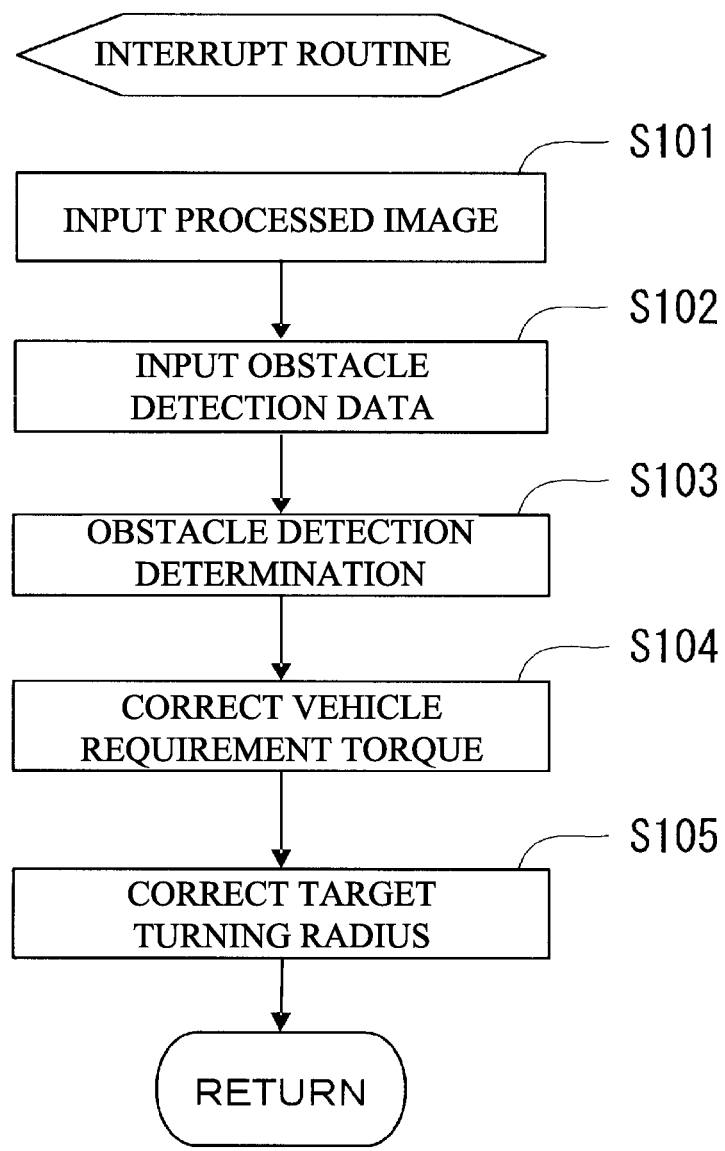
FIG. 30 is part of flow charts illustrating the specifics of the control executed by the control unit of the vehicle according to the first Modification Embodiment.

By the way, while the vehicle 1 is traveling, an interrupt routine as shown in FIG. 30 is continuously executed. When the imaging unit 131 detects an obstacle in the traveling direction of the vehicle 1, the target path is corrected by executing this routine. In this routine, the image captured by the imaging unit 131 is processed, and the resulting image data is input (Step S101). Next, detection data detected by the obstacle detection unit 143 is input (Step S102). Then, these image data and detection data are used to determine whether or not there is an obstacle in the traveling direction of the vehicle 1 (Step S103). For instance, if it is determined that another vehicle is present in the traveling direction of vehicle 1, the vehicle requirement torque is corrected such that the speed of the vehicle 1 is reduced (Step S104). In addition, if it is determined that there is an obstacle, the target turning radius is corrected such that the vehicle 1 can travel and avoid the obstacle (Step S105).

Second Modification Embodiment

The previous Embodiment and the first Modification Embodiment illustrate an example configuration in which the pair of left and right wheel holding members (65 and 65) are interlocked to one another and moved vertically in opposite directions while the intermediate bevel gear 87 is engaged with the pair of main bevel gears (83 and 83). However, in the second Modification Embodiment shown in FIG. 31, it is possible that the pair of left and right wheel holding members (65 and 65) are interlocked to one another and moved vertically in opposite directions by means of a link mechanism.

In this Modification Embodiment, one end portion of a link member 119 is pivotally connected using a first universal joint 117 to a longitudinal intermediate portion of the wheel holding member 65. The other end portion of the link member 119 is pivotally connected via a second universal joint 121 to an end portion of a V-shaped rocking arm 123. A center portion of the V-shaped rocking arm 123 is fixed to one end portion of a pivot shaft 125 that is pivotally supported about the front-to-rear axis of a first center support member 567 (corresponding to the first center support member 67 according to the previous Embodiment). A disk-like rotating plate 589 is fixed to the other end of the pivot shaft 125. A movement-restricting device 591 for stopping the rotation of the pivot shaft 125 by sandwiching the rotating plate 589 between pads (not shown) and for re-initiating the rotation is fixed to the first center support member 567. Each first universal joint 117, each link member 119, each second universal joint 121, the rocking arm 123, and the pivot shaft 125 correspond to a "linkage mechanism" according to the present invention. The first center support member 567 corresponds to a "base member", "linkage mechanism", and "wheel support means" according to the present invention. Note that although not depicted in FIG. 31, a pair of left and right swivel shafts (85 and 85) are pivotally supported by the first center support member 567.

Accordingly, when the movement-restricting device 591 is disengaged, any one of the pair of left and right wheel holding members (65 and 65) may rotate about the axis of the swivel shaft 85. In this case, the rotation causes one link member 119 to move, which results in the rotation of the rocking arm 123 about the axis of the pivot shaft 125. The rotation of this rocking arm 123 causes the other link member 119 to move, which results in the rotation of the other wheel holding member 65 connected to the link member 119 about the axis of the swivel shaft 85. Consequently, the pair of wheel holding members (65 and 65) are moved in opposite directions and the state of the vehicle body frame 7 and each rear wheel 9 is changed from a non-tilted state as shown in FIG. 31(1) to a state in which they are tilted toward the right side as shown in FIG. 31(2).

According to this Modification Embodiment, the rear wheels 9 are mechanically interlocked to one another by means of the link member, and are displaced relatively to one another vertically in opposite directions with respect to the vehicle body frame 7. Thus, both the rear wheels 9 can be reliably displaced vertically in opposite directions. Also, the linkage mechanism therefor can be constructed using a simple mechanism.

Third Modification Embodiment

The previous Embodiment and the first Modification Embodiment illustrate an example configuration in which by changing the length of the electric actuator 57, the front-to-rear tilt angle of the virtual straight line Lf along the axis of the steering shaft member 51 is altered. In the third Modification Embodiment shown in FIG. 32, the vehicle height on the front wheel 3 side of the vehicle 1 may be shifted during acceleration and deceleration, the shift depending on whether the vehicle 1 is under a running state or a stopped state. This may be used to alter the front-to-rear tilt angle of the virtual straight line Lf.

In this Modification Embodiment, a front end portion of a long arm part 631b is attached to a longitudinal intermediate and rear portion of the first center support member main body 631a, which corresponds to the first center support member main body 31a according to the previous Embodiment. The first center support member main body 631a and the arm part 631b constitute a first center support member 631.

Figure 32:
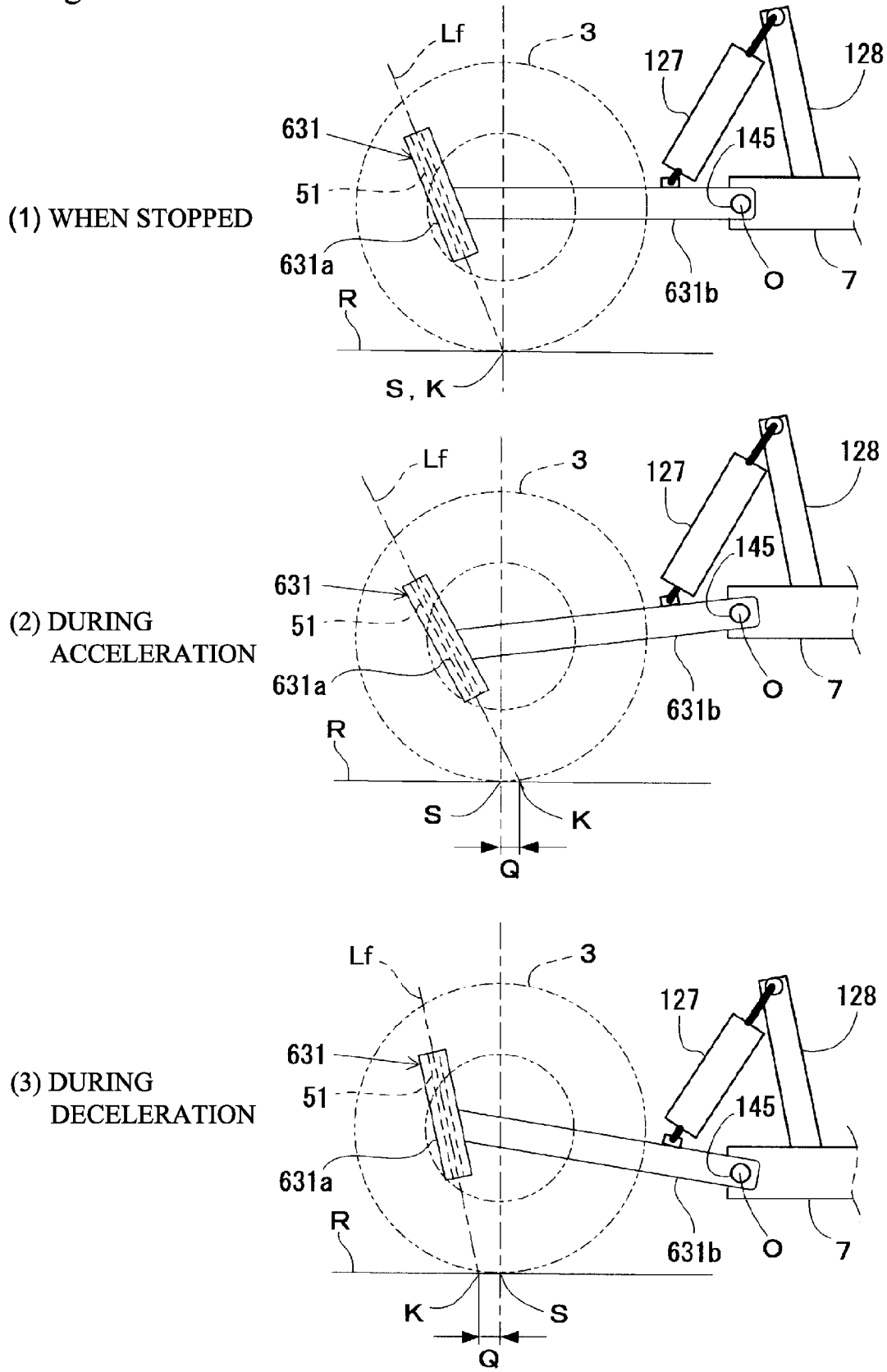
FIG. 32 is schematic diagrams illustrating the front-wheel-side of a vehicle according to the third Modification Embodiment of the present invention.

Regarding the first center support member 631, a rear end portion of the arm part 631b is pivotally suspended using a pivot shaft 145 to a front end portion of the vehicle body frame 7 about the axis O that extends in the vehicle widthwise direction. A shock absorber 127 is used to connect a longitudinal intermediate portion of the arm part 631b and an upper end portion of a bracket 128 attached to the front end portion of the vehicle body frame 7. The shock absorber 127 and the pivot shaft 145 correspond to "caster angle adjusting means" according to the present invention. The first center support member 631 corresponds to each of a "base member", "linkage mechanism", and "caster angle adjusting means" according to the present invention. In this Modification Embodiment, when the vehicle 1 is stopped, the vehicle 1 is subject to neither acceleration nor deceleration. Accordingly, the distance between both ends of the shock absorber 127 is an intermediate distance between the distances during the acceleration and the deceleration of the vehicle 1. As shown in FIG. 32(1), the intersection point K where the virtual straight line Lf along the axis of the steering shaft member 51 intersects the traveling road surface R is positioned on a virtual straight line (including ground contact points S) drawn between the ground contact points S of the front wheels 3 on the traveling road surface R. In order to achieve this configuration, the tilt angle of the virtual straight line Lf and the spring property of the shock absorber 127, etc., are so set.

As a result, when the vehicle 1 accelerates, the vehicle 1 acceleration affects and causes a load to decrease on the front wheel 3 side. This enlarges the distance between both the ends of the shock absorber 127. As shown in FIG. 32(2), the intersection point K where the virtual straight line Lf along the axis of the steering shaft member 51 intersects the traveling road surface R is positioned rearwardly of the virtual straight line (including ground contact points S) drawn between the ground contact points S of the front wheels 3 on the traveling road surface R. Thus, the caster offset Q is a negative value. Because of this, the vehicle 1 can have improved straight-traveling stability during acceleration.

Meanwhile, when the vehicle 1 decelerates, the vehicle 1 deceleration affects and causes a load to increase on the front wheel 3 side. This compresses the shock absorber 127, thereby shortening the distance between both the ends thereof. As shown in FIG. 32(3), the intersection point K where the virtual straight line Lf along the axis of the steering shaft member 51 intersects the traveling road surface R is positioned forwardly of the virtual straight line (including ground contact points S) drawn between the ground contact points S of the front wheels 3 on the traveling road surface R. Thus, the caster offset Q is a positive value. Because of this, when the vehicle 1 decelerates, force that redirects the front wheels 3 in the straight running direction is applied to the front wheels 3. Accordingly, the vehicle 1 can decelerate while keeping the running stability.

In addition, according to this Modification Embodiment, the acceleration or deceleration shifts the height of the vehicle 1 on the front wheel 3 side. This is used to alter the front-to-rear tilt angle of the virtual straight line Lf along the axis of the steering shaft member 51. By doing so, use of the electric actuator 57 according to the previous Embodiment and the first Modification Embodiment can be avoided. This makes the structure simple and inexpensive.

Fourth Modification Embodiment

Figure 33:
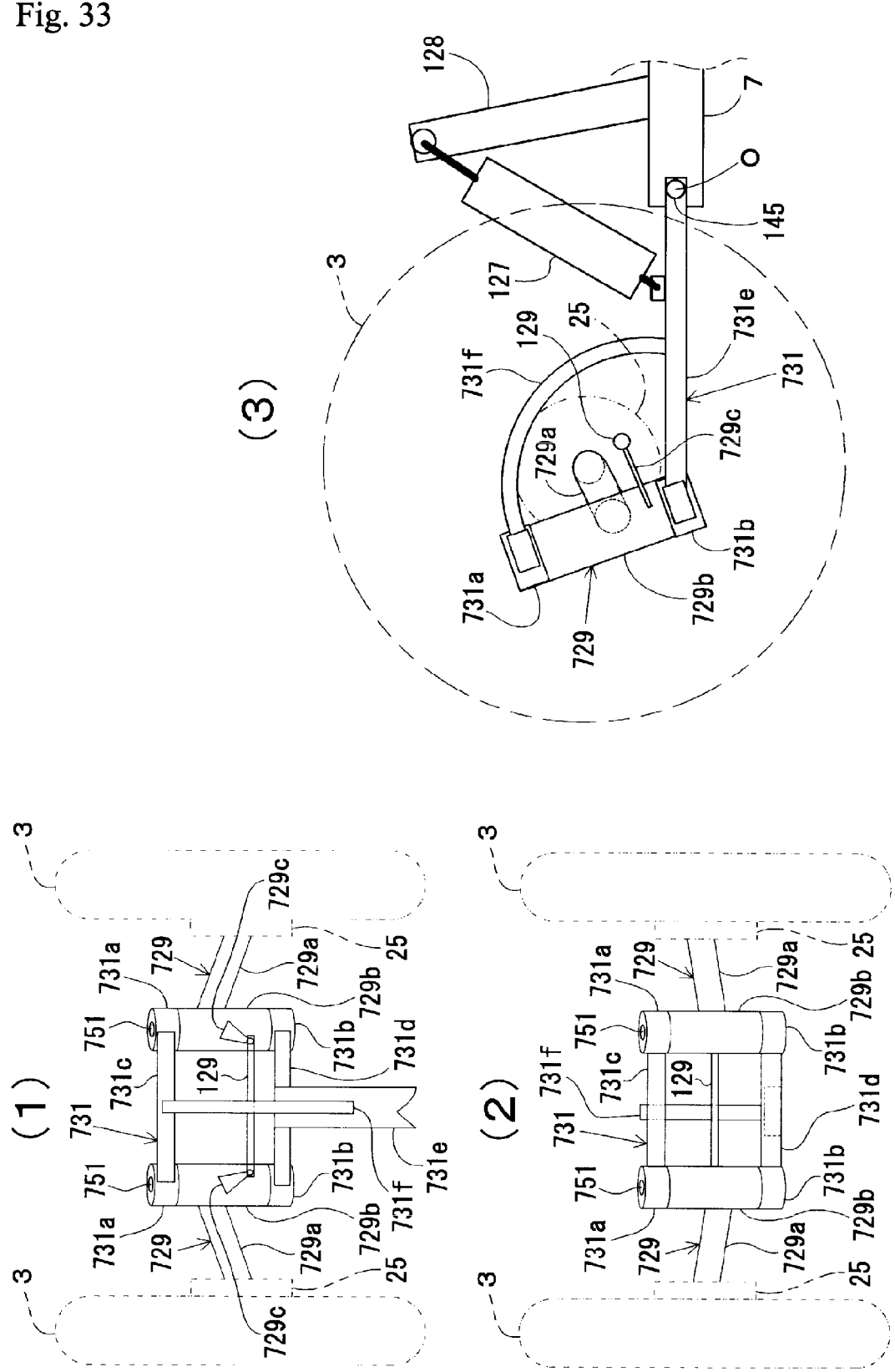
FIG. 33 is schematic diagrams illustrating the front-wheel-side of a vehicle according to the fourth Modification Embodiment of the present invention.
Figure 34:
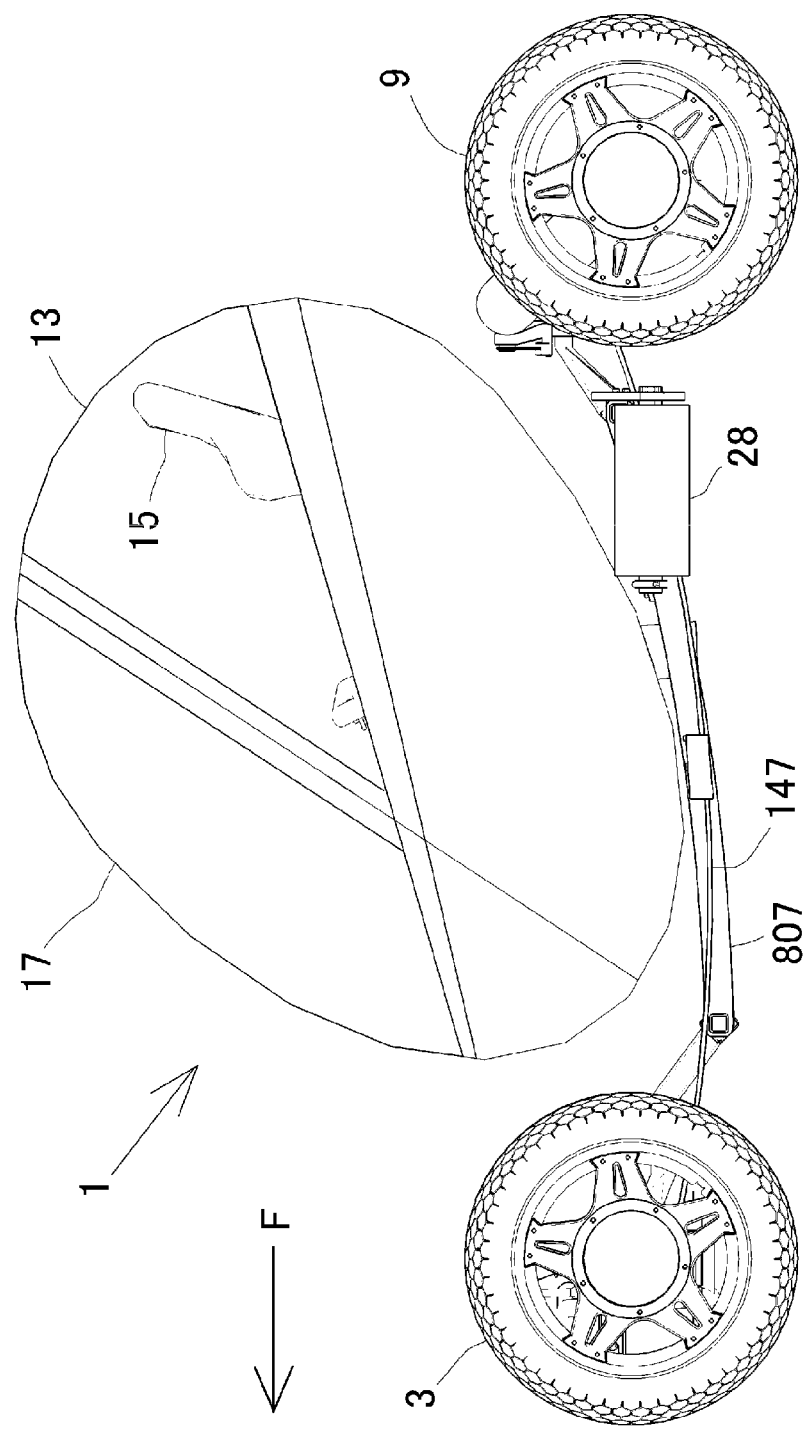
FIG. 34 is an outline view illustrating a vehicle according to the fifth Modification Embodiment of the present invention. This outline view is seen from a left side.
Figure 35:
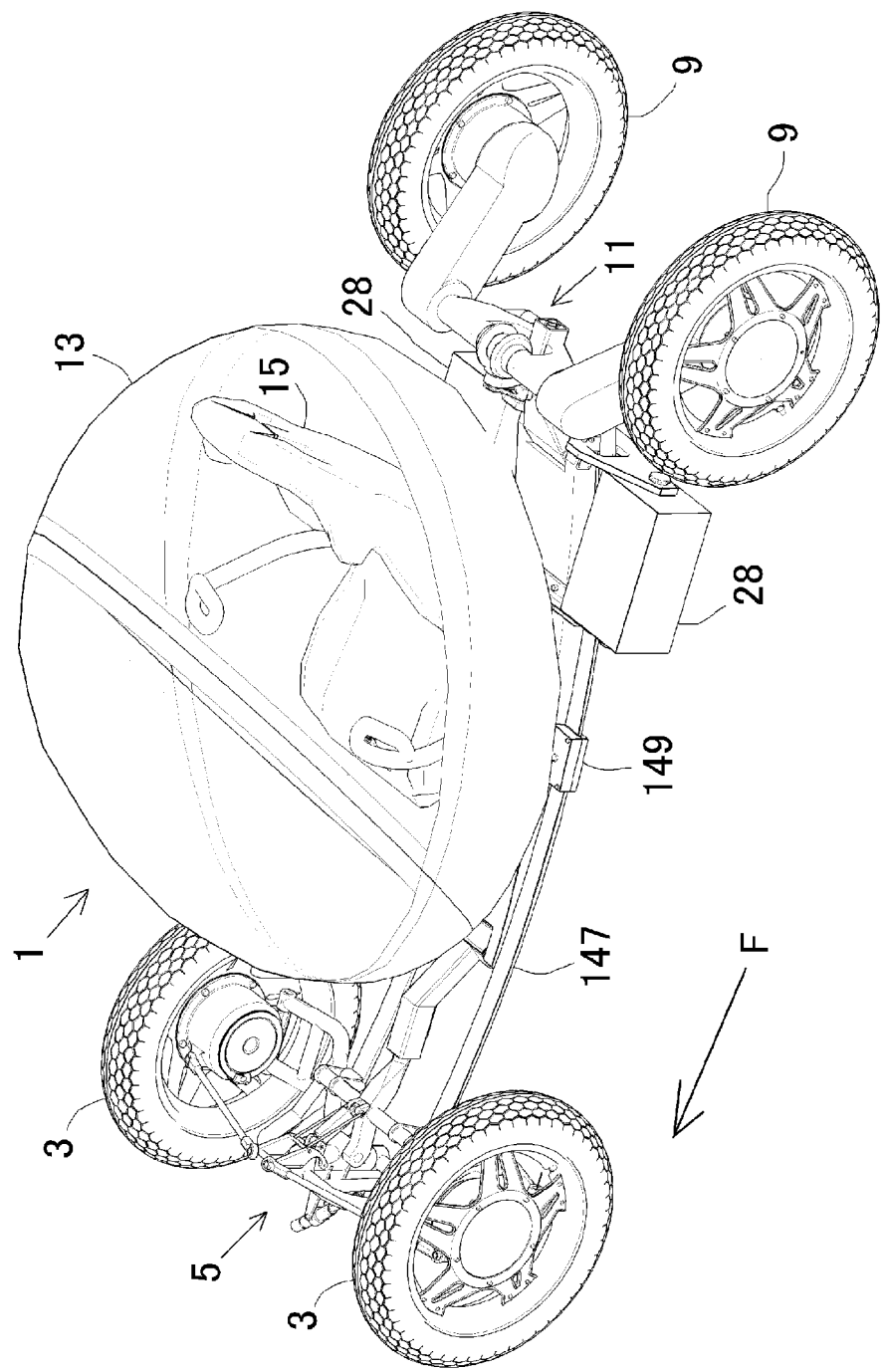
FIG. 35 is a general view of the vehicle when seen from the upper rear.
Figure 36:
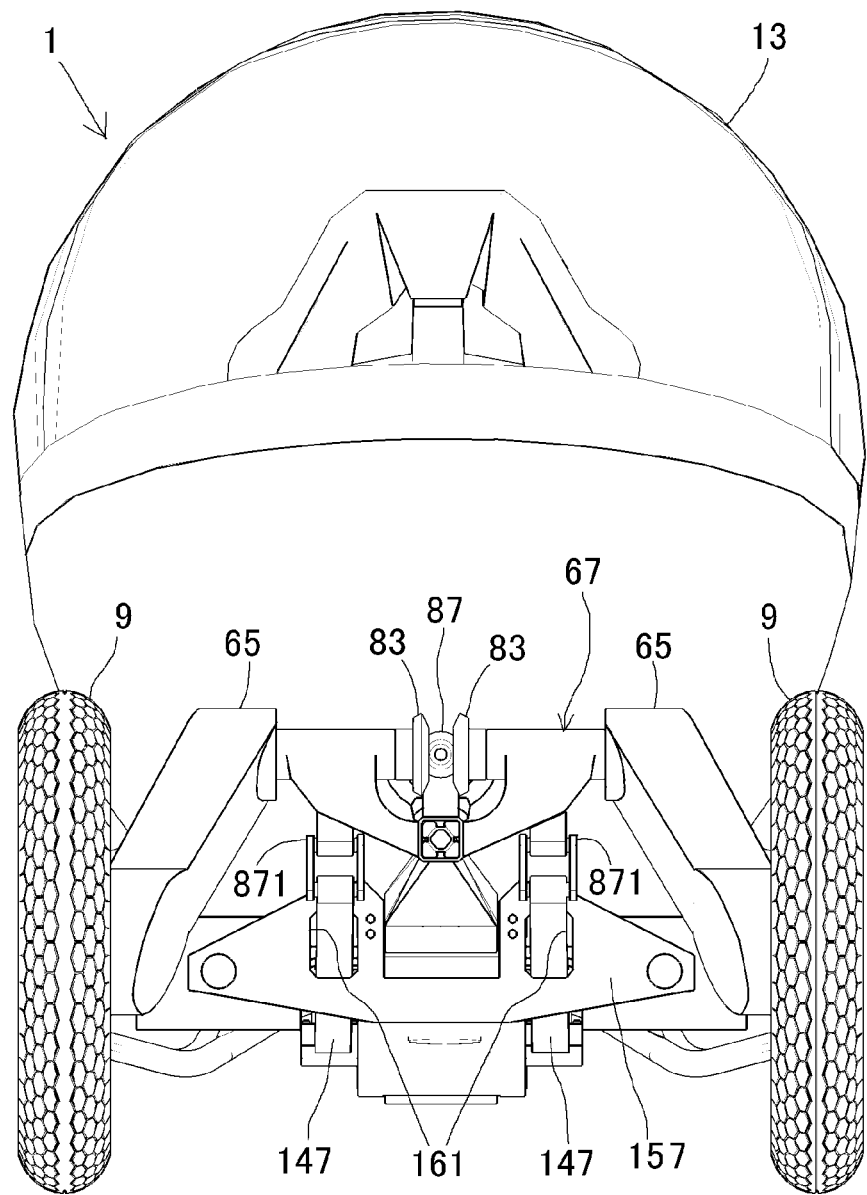
FIG. 36 is an outline view of the vehicle when viewed from a rear side.
Figure 37:
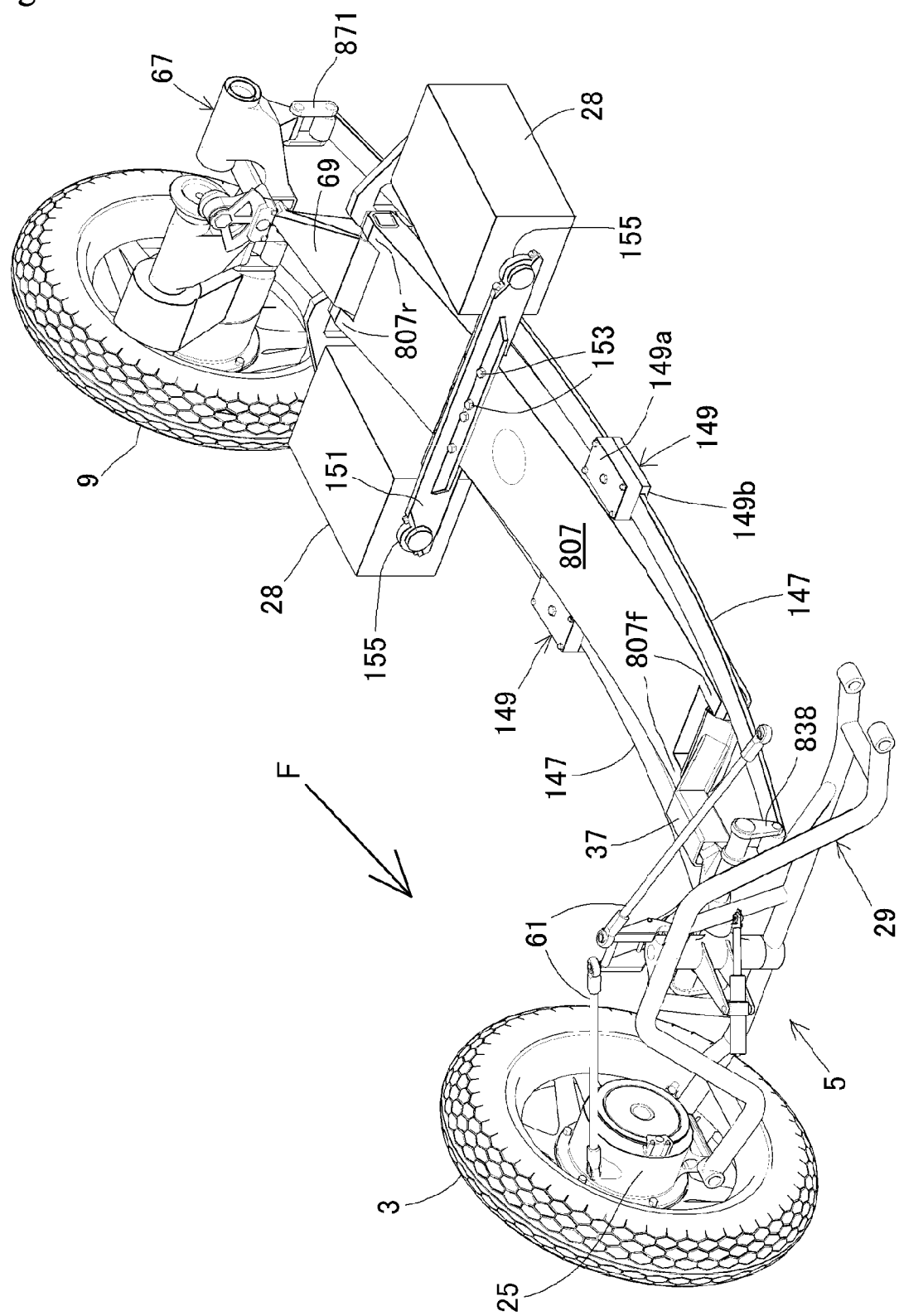
FIG. 37 is an outline view of the vehicle without the cabin, the left-side front and rear wheels, etc., when seen from the upper front.
Figure 38:
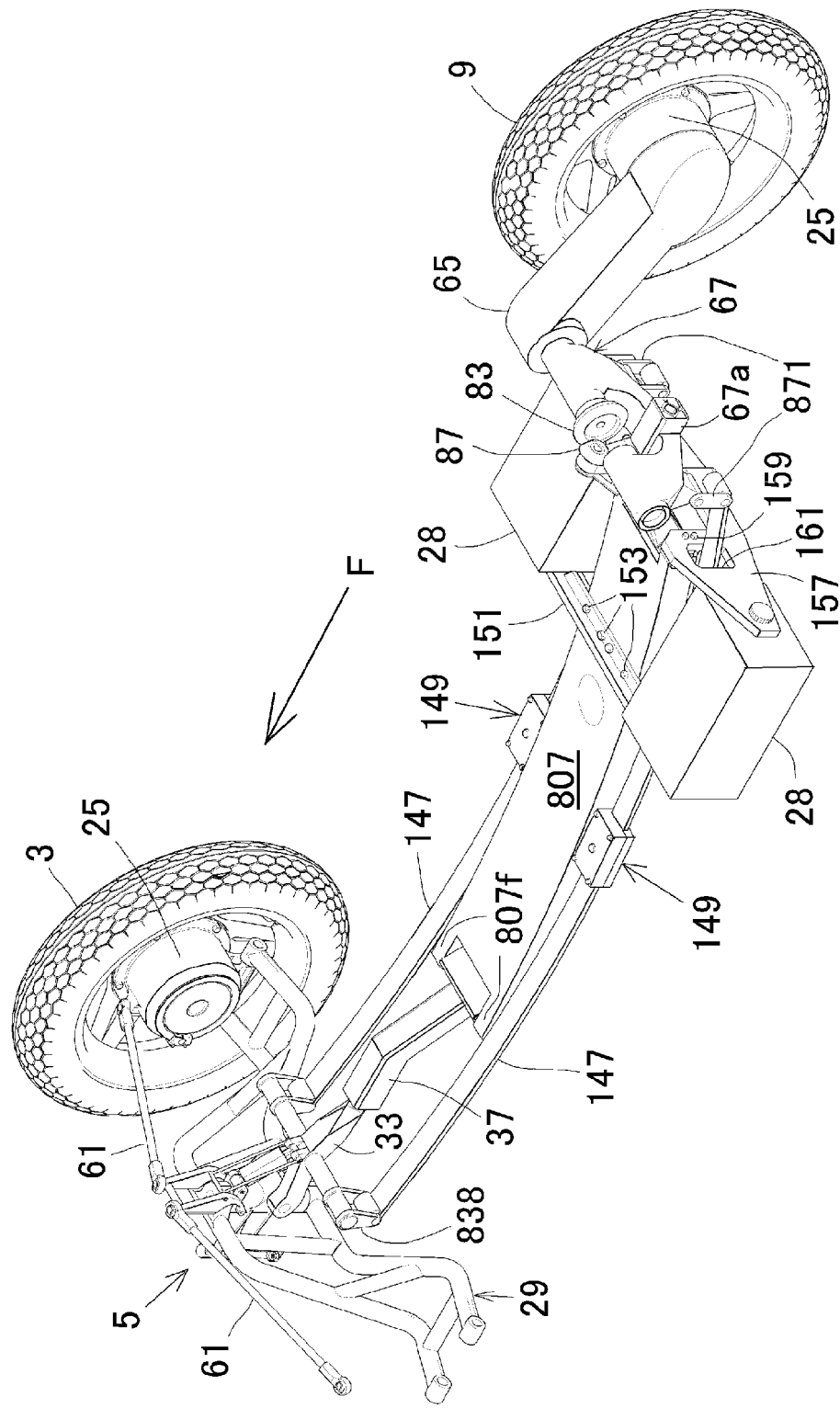
FIG. 38 is an outline view of the vehicle without the cabin, the left-side front and rear wheels, etc., when seen from the upper rear.
Figure 39:
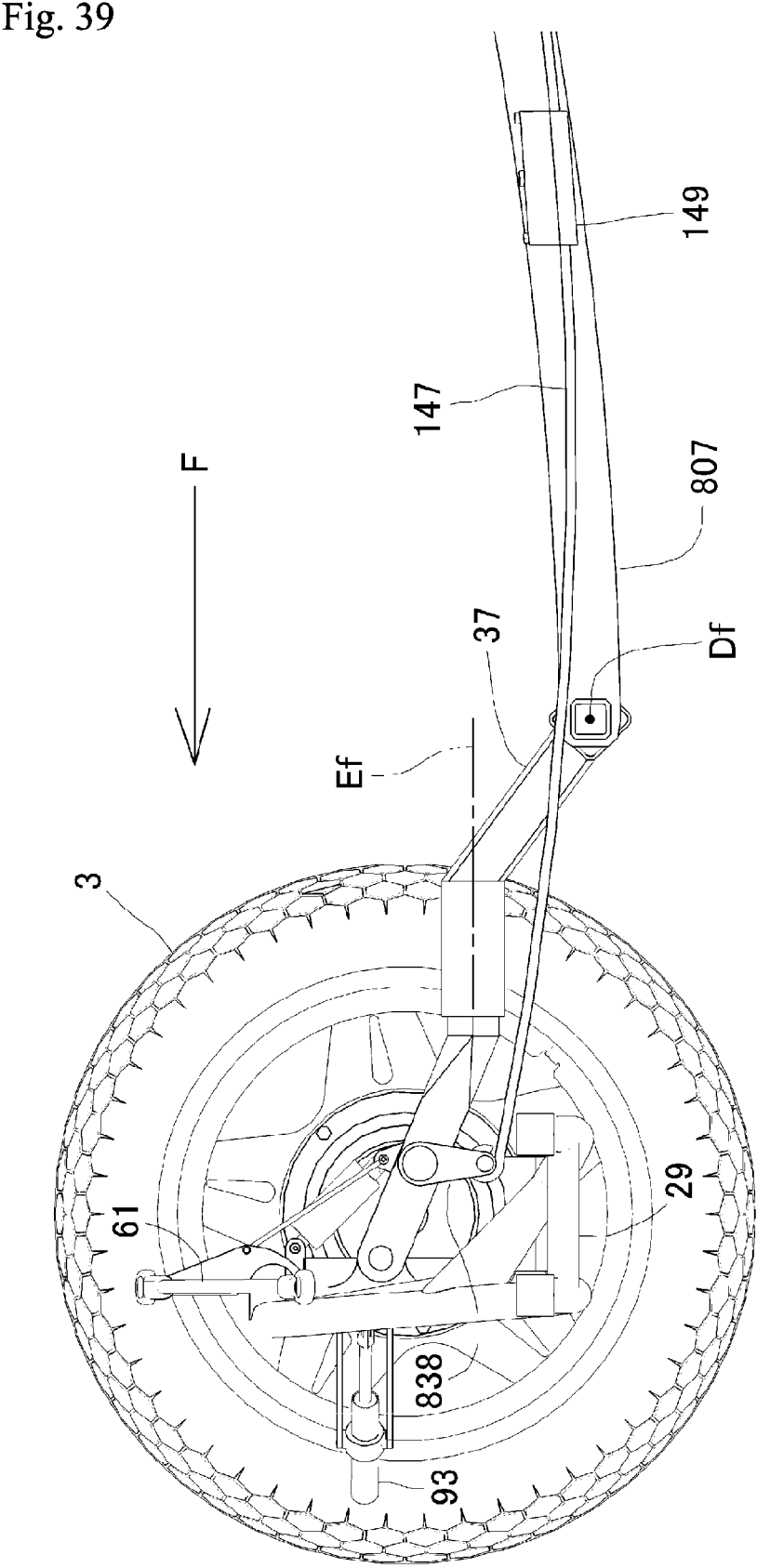
FIG. 39 is an enlarged outline view illustrating a state in which the left-side front wheel has been removed from the front-side portion of the vehicle. This enlarged outline view is seen from a left side.
Figure 40:
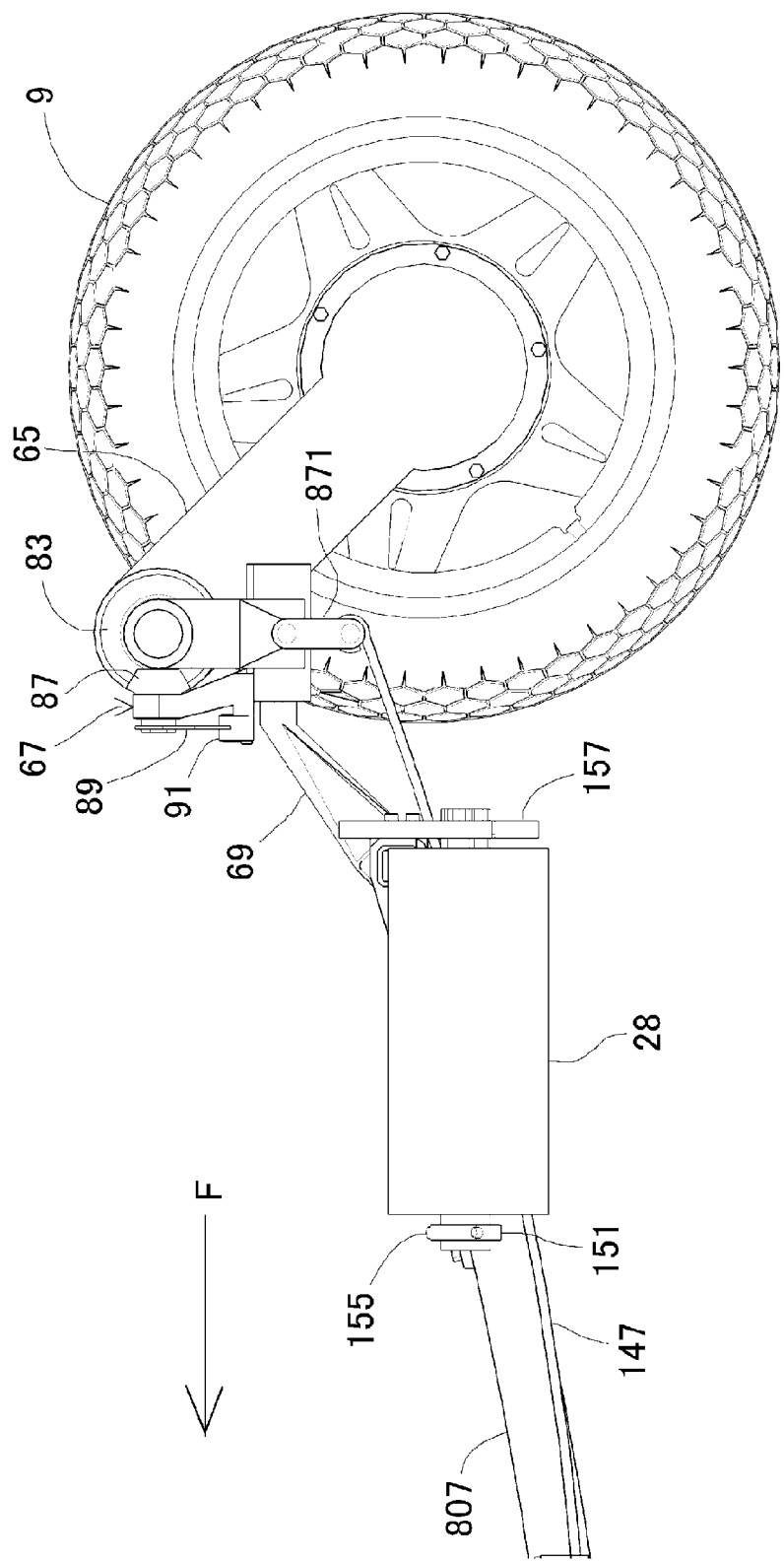
FIG. 40 is an enlarged outline view illustrating a state in which the left-side rear wheel and the left-side rear wheel support member have been removed from the rear-side portion of the vehicle. This enlarged outline view is seen from a left side.
Figure 41:
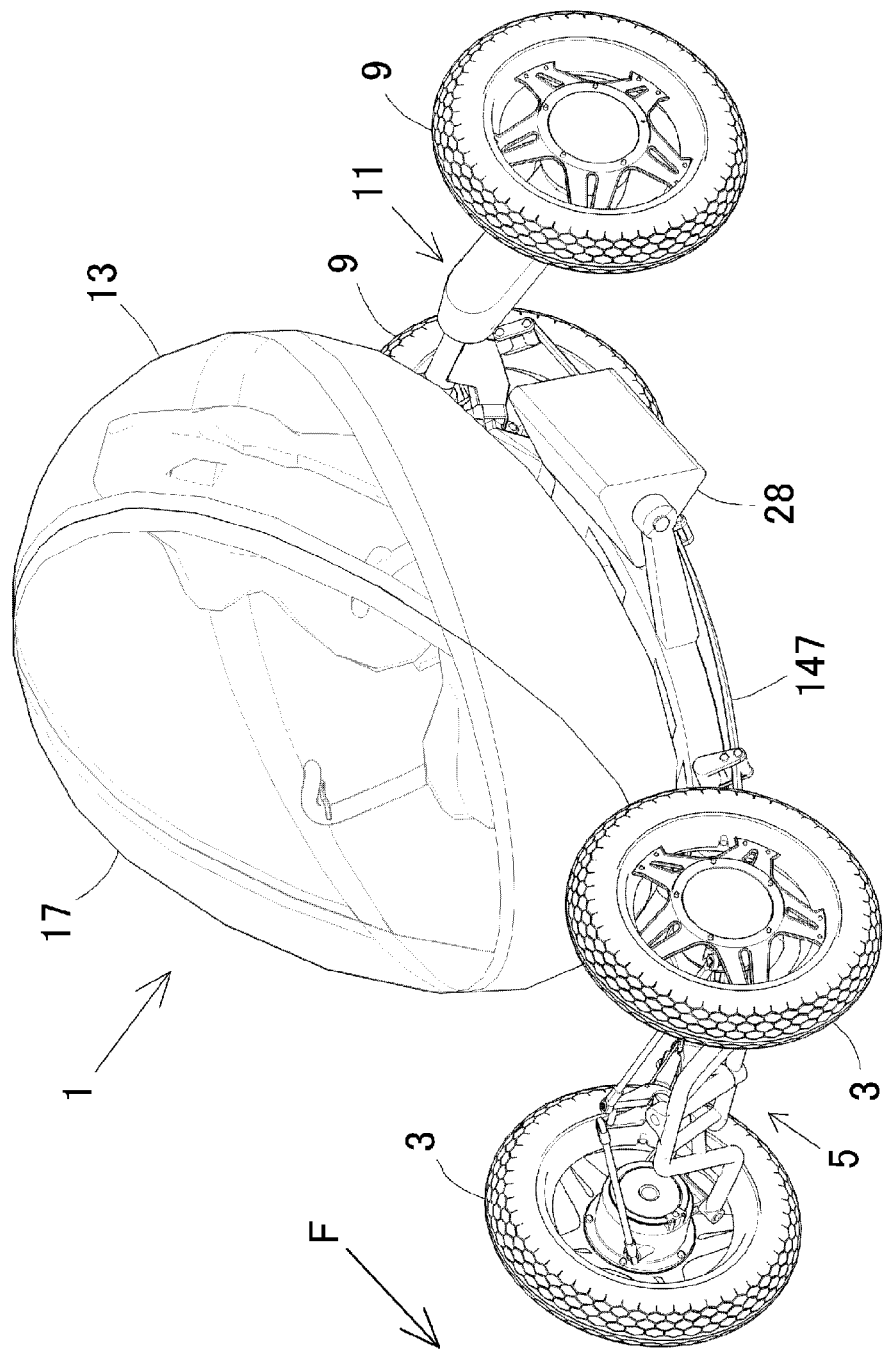
FIG. 41 is a general view illustrating a vehicle according to the sixth Modification Embodiment of the present invention. This general view is seen from the upper front.
Figure 42:
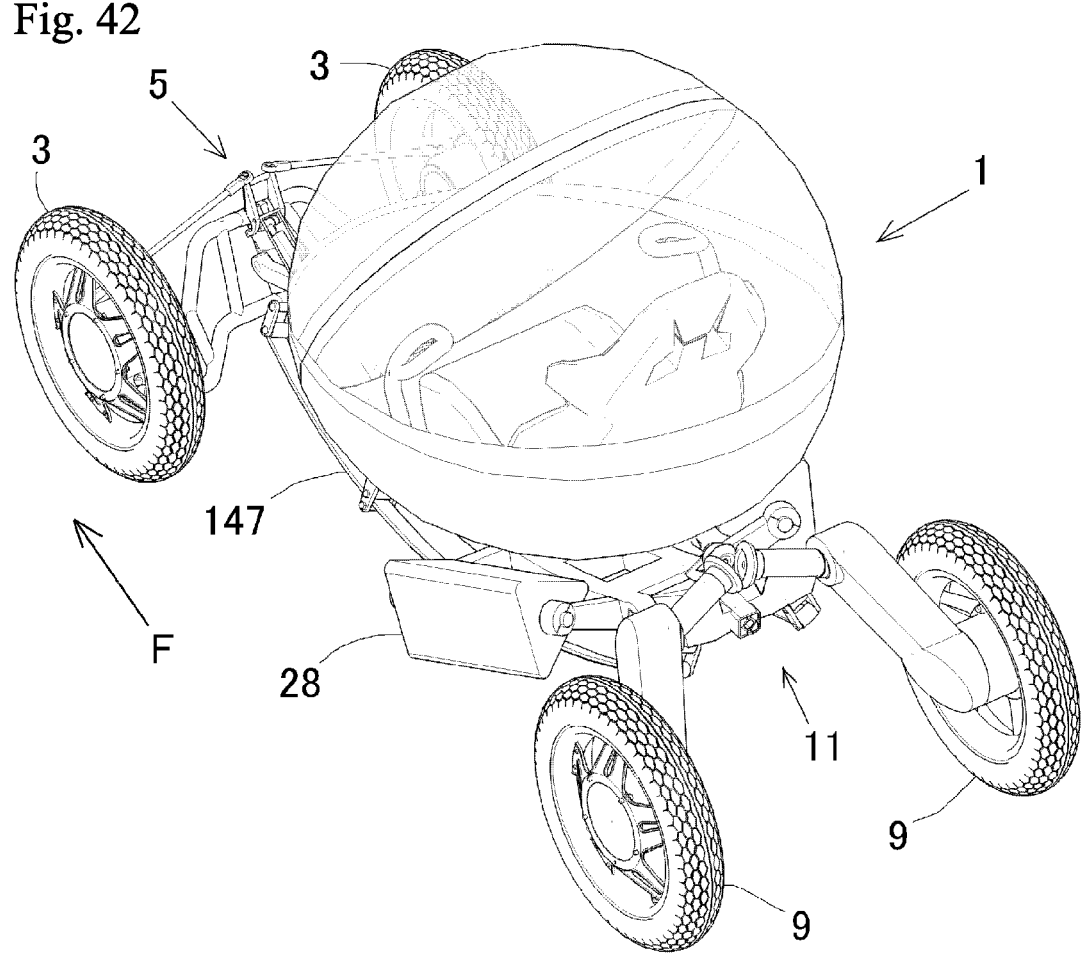
FIG. 42 is a general view of the vehicle when seen from the upper rear.
Figure 43:
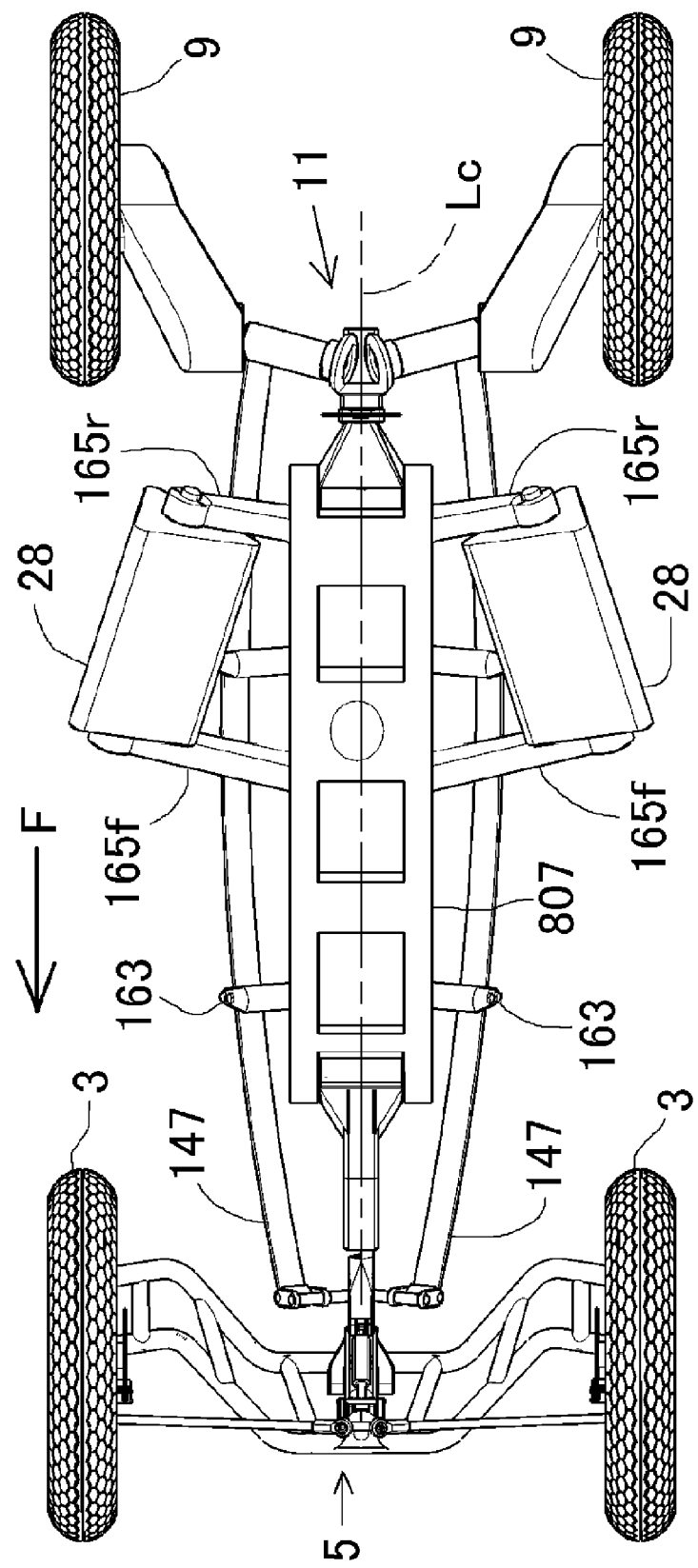
FIG. 43 is a general view of the vehicle without the cabin when viewed from the above.

In the previous Embodiment and each of the first to third Modification Embodiments, the pair of left and right front wheels (3 and 3) are coupled to both end portions of one front wheel support member 29. As an example, a longitudinal center portion of the front wheel support member 29 is pivotally supported by the first center support member 631. The suspension structure of each front wheel 3 may be modified like that of the fourth Modification Embodiment shown in FIG. 33. FIG. 33(1) schematically shows a state of the front wheels 3, etc., when viewed from the above. FIG. 33(2) schematically shows a state of the front wheels 3, etc., when viewed from the front. FIG. 33(3) schematically shows a state of the front wheels 3, etc., when viewed from a left side.

In this Modification Embodiment, one end portion of each left or right front wheel support member 729 is coupled to each electric motor 25 for each front wheel 3. The other end portion of each front wheel support member 729 is pivotally supported by the first center support member 731 while the other end portions are apart from each other with a distance in the vehicle widthwise direction. Each front wheel support member 729 corresponds to each of a "wheel support member", "linkage mechanism", and "camber angle adjusting means" according to the present invention. The first center support member 731 corresponds to each of a "base member", "linkage mechanism", "caster angle adjusting means", "camber angle adjusting means" according to the present invention. Each front wheel support member 729 includes: an arm part 729a, one end portion of which is pivotally coupled via a camber shaft (like the camber shaft 49 according to the previous Embodiment) to a lower portion of the electric motor 25 for each front wheel 3; a cylindrical part 729b, a longitudinal intermediate portion of which is attached to the other end portion of the arm part 729a; and the below-described bracket 729c. Each front wheel support member 729 is pivotally supported by the first center support member 731 about the axis of a steering shaft member 751 by means of the steering shaft members 751 each inserted into the inside of each cylindrical part 729b. At the same time, rear end portions of the brackets 729c each attached to a lower portion on the rear lateral side of each cylindrical part 729b are pivotally coupled using a tie member 129. The tie member 129 corresponds to a "linkage mechanism" according to the present invention. The steering shaft members 751 are arranged in parallel and apart from each other with a distance in the vehicle widthwise direction. Each steering shaft member 751 is tilted such that an upper portion thereof is positioned forwardly of a lower portion thereof. Each steering shaft member 751 corresponds to each of a "linkage mechanism" and "camber angle adjusting means" according to the present invention.

The first center support member 731 includes: a pair of left and right annular upper-side cylinder parts (731a and 731a); a pair of left and right annular lower-side cylinder parts (731b and 731b) that are disposed below each upper-side cylinder part 731a; an upper-side connecting part 731c that connects the upper-side cylinder parts 731a as one structure; a lower-side connecting part 731d that connects the lower-side cylinder parts 731b as one structure; an arm part 731e that is long in the vehicle longitudinal direction, a front end portion of the arm part being attached to a vehicle widthwise center portion of the lower-side connecting part 731d; and a connecting part 731f, a front end portion of the connecting part 731f being attached to a vehicle widthwise center portion of the upper-side connecting part 731c, a lower end portion of the connecting part 731f being attached to a vehicle longitudinal center portion of the arm part 731e. The connecting part 731f is formed like an arc when viewed from the side. Regarding the first center support member 731, a rear end portion of the arm part 731e is pivotally suspended to a front end portion of the vehicle body frame 7 about the axis O that extends in the vehicle widthwise direction. The shock absorber 127 is used to connect a longitudinal intermediate portion of the arm part 731e of the first center support member 731 and an upper end portion of the bracket 128 attached to the front end portion of the vehicle body frame 7. Although not depicted in FIG. 33, the same first link member 59 as in the previous Embodiment is mounted on each upper-side cylinder part 731a. First and second ends of each rodlike camber link member 61 are pivotally coupled to each connecting part 59a disposed on an upper end portion of each first link member 59 and an upper front portion of the electric motor 25 for each front wheel 3, respectively.

Accordingly, any one of the pair of left and right front wheel support members (729 and 729) may rotate about the axis of the steering shaft member 751. This rotation causes one cylindrical part 729b and the bracket 729c attached thereto to rotate about the axis of the steering shaft member 751. The resulting rotation causes the tie member 129 to be displaced in the vehicle widthwise direction. Then, the bracket 729c and the cylindrical part 729b of the other front wheel support member 729 rotate about the axis of the other steering shaft member 751. Accordingly, the other front wheel support member 729 rotates about the axis. This causes the pair of front wheel support members 729 to move in the same direction.

According to this Modification Embodiment, the pair of left and right front wheel support members (729 and 729) are rotated about the axes of the pair of left and right steering shaft members (751 and 751), respectively, that are arranged in parallel and are apart from each other with a distance in the vehicle widthwise direction. In this configuration, the axis of each steering shaft member 751, which axis is a rotation pivot of each front wheel support member 729, is deviated to the front wheel side 3 with respect to the vehicle widthwise center of the vehicle 1. Like the previous Embodiment, the axis of the steering shaft member 51, which axis is a rotation pivot of the front wheel support member 29, is positioned at the vehicle widthwise center of the vehicle 1. Because of this, when each front wheel support member (29 or 529) rotates about the axis of each steering shaft member (51 or 751) by the same angle, the front wheel 3 supported by the front wheel support member 29 according to the previous Embodiment is displaced by a less amount in the vehicle longitudinal direction than the front wheel 3 supported by the front wheel support member 729 according to this Modification Embodiment. This results in a smaller space between the front wheels 3 and the other component members of the vehicle 1 than that of the previous Embodiment.

Fifth Modification Embodiment

The previous Embodiment shows an example configuration in which the second center support member 33 of the front-side suspension apparatus 5 is supported by the front-side torsion spring member 41; and the first center support member 67 of the rear-side suspension apparatus 11 is supported by the rear-side torsion spring member 73. Like the fifth Modification Embodiment shown in FIGS. 34 to 40, a pair of left and right plate spring members (147 and 147) may be used as alternatives for those torsion spring members.

In this Modification Embodiment, front and rear end portions of each single plate spring member 147 that continuously extends in the vehicle longitudinal direction are bent and rounded. Holes for pin (not shown) insertion are created and directed toward the left and right sides of the vehicle body frame 807. The front end portion of each plate spring member 147 is pivotally coupled, via a pin inserted into each hole, to a lower end portion of each shackle 838. Also, the rear end portion of each plate spring member 147 is pivotally coupled to a lower end portion of each shackle 871. The plate spring member 147 corresponds to "elastic means" according to the present invention. The vehicle body frame 807 corresponds to a "vehicle body" according to the present invention.

Each plate spring member 147 is arranged in parallel when viewed from the above. The widthwise plate surface of each plate spring member 147 is arranged in parallel to a straight line along the vehicle body frame 807 on the left and right sides. A longitudinal intermediate portion (center portion) of each plate spring member 147 is supported via a support tool 149 at a vehicle longitudinal center portion of the vehicle body frame 807. As described above, the longitudinal intermediate portion of the single plate spring member 147 that continuously extends in the vehicle longitudinal direction is supported by the vehicle body frame 807. The second center support member 33 is elastically supported at the front end portion of the plate spring member 147. The first center support member 67 is elastically supported at the rear end portion of the plate spring member 147. Consequently, the structure in which the second center support member 33 and the first center support member 67 are elastically supported by the vehicle body frame 807 can be constructed using a small number of components and thus simplified.

In addition, each plate spring member 147 is formed slightly convex toward the bottom direction. The vehicle body frame 807 is made of a long, flat, rectangular parallelepiped member that extends in the vehicle longitudinal direction. In addition, the vehicle body frame 807 is formed slightly convex toward the bottom direction. A front-side bracket 151 that supports front end portions of the pair of left and right batteries (28 and 28) are secured using a plurality of screw members 153 onto the upper rear surface of the vehicle body frame 807. The front-side bracket 151 crosses over the upper surface of the vehicle body frame 807 and extends outwardly in the left and right directions with respect to the left and right edges of the vehicle body frame 807. The front end portion of each battery 28 is supported via an elastic member (not shown) at the extended end portion. Specifically, a bolt (not shown) that is fixed and protruded forwardly relative to the center of the front end surface of each battery 28 is fit for and supported, via an elastic member, by a dent, which is formed as a recessed portion at both end portions of the front-side bracket 151. A a-shaped metal fixture 155 (see FIGS. 37 and 40) is placed under pressure from the upper side. While this state is kept, both end portions of the metal fixture 155 are secured using screw members to both the end portions of the front-side bracket 151. This makes it possible for the front end portion of each battery 28 to be supported via an elastic member at each of both the end portions of the front-side bracket 151.

A rear-side bracket 157 that supports rear end portions of the pair of left and right batteries (28 and 28) are secured using a plurality of screw members 159 onto the rear end surface of the vehicle body frame 807. The rear-side bracket 157 extends outwardly in the left and right directions with respect to the left and right edges of the vehicle body frame 807. The rear end portion of each battery 28 is supported via an elastic member (not shown) at the extended end portion. Specifically, a bolt (not shown) that is fixed and protruded toward the rear direction relative to the center of the rear end surface of each battery 28 is fit for and supported, via an elastic member, by a bolt hole, which is created at both end portions of the rear-side bracket 157. A female threaded member is screwed into a male threaded portion of a bolt that protrudes through the bolt hole. This makes it possible for the rear end portion of each battery 28 to be supported via an elastic member at each of both the end portions of the rear-side bracket 157. The procedure for attaching each battery 28 to the front-side bracket 151 and the rear-side bracket 157 includes the steps of: inserting a bolt on the rear end-side of each battery 28 into the blot hole of the rear-side bracket 157; and then fitting, via an elastic member, a bolt on the front end side of each battery 28 into the recessed dent of the front-side bracket 151.

In addition, a bottom center portion of each battery 28 is supported via an elastic member by a support member (not shown), one end portion of which is fixed to the vehicle body frame 807 and the other end portion of which is used for the support. Each elastic member that supports the above battery 28 is made of rubber or another resin material.

Both the left and right end portions of the rear-side bracket 157 are tapered off as they extend outwardly in the left and right directions. A center portion of the rear-side bracket 157 has a recessed slit so as not to interfere with the second center support member 69 of the rear-side suspension apparatus 11. Between the center portion of the rear-side bracket 157 and each of both the left and right end portions is formed a substantially rectangular opening 161 (see FIGS. 36 and 38) into which the rear end portion of each plate spring member 147 is inserted. Between each plate spring member 147 and the edge of the opening 161 is placed an enough space not to interfere with the opening 161 when each plate spring member 147 is subject to elastic deformation.

A rear end portion of the third center support member 37 of the front-side suspension apparatus 5 is supported using the elastic member 39 according to the previous Embodiment and an equivalent member such as the support shaft 55 by a pair of left and right front-side support parts (807*f* and 807*f*) that are attached to a front end portion of the vehicle body frame 807 and protrude forwardly. A front end portion of the second center support member 69 of the rear-side suspension apparatus 11 is supported using the elastic member 75 according to the previous Embodiment and an equivalent member such as the support shaft 79 by a pair of left and right rear-side support parts (807*r* and 807*r*) that are attached to a rear end portion of the vehicle body frame 807 and protrude rearwardly. The elastic members and the plate spring member 147 correspond to "elastic means" according to the present invention.

The support tool 149 is provided with: an upper-side support tool 149*a* that is fixed to the vehicle body frame 807 by welding; and a lower-side support tool 149*b* having a recessed portion. While the plate spring member 147 is fit into the recessed portion, the lower-side support tool 149*b* are securely mounted using five screw members onto the upper-side support tool 149*a*. Of the five screw members, the screw member that is positioned at the center of the support tool 149 penetrates through the upper-side support tool 149*a*, the lower-side support tool 149*b*, and the plate spring member 147 for the purpose of the fastening. According to this configuration, the plate spring member 147 is sandwiched between the upper-side support tool 149*a* and the lower-side support tool 149*b* and is firmly supported by the vehicle body frame 807 by means of the support tool 149. In addition, the screw member that is disposed at the center and penetrates through the plate spring member 147, etc., not only restricts the vehicle widthwise movement, but also the vehicle longitudinal movement of the plate spring member 147.

Note that in this Modification Embodiment, there are provided the pair of left and right support tools 149. Instead, the pair of left and right upper-side support tools (149*a* and 149*a*) are connected across the vehicle body frame 807 and the pair of left and right lower-side support tools (149*a* and 149*a*) are also connected across the vehicle body frame 807. Then, while the vehicle body frame 807 is vertically sandwiched between the upper-side support tools and the lower-side support tools, screw members may be used for fixing the support tool 149 to the vehicle body frame 807.

Upper end portions of the shackles 838 are pivotally coupled to the pair of left and right pins (42 and 42) (see FIG. 8) that are vehicle widthwise projections disposed at a longitudinal center portion of the second center support member 33. Meanwhile, upper end portions of the shackles 871 are pivotally coupled, via pins disposed in the vehicle widthwise direction, to the pair of left and boss portions that protrude and are disposed at the lower portion of the first center support member 67.

This applies an initial load onto the front-side suspension apparatus 5. At the same time, the front wheels 3 are displaced to one another vertically in the same direction or opposite directions with respect to the vehicle body frame 807. Accordingly, the second center support member 33 may be moved vertically or be rotated about the virtual straight line Ef by means of the front wheel support member 29 and the first center support member 31. In this case, each plate spring member 147 exerts spring force due to bending and/or torsion thereof so as to resist the above motions. Likewise, the initial load may be applied to the rear-side suspension apparatus 11. At the same time, the rear wheels 9 may be displaced to one another vertically in the same direction or opposite directions with respect to the vehicle body frame 807. Accordingly, the first center support member 67 may be displaced vertically or be rotated about the virtual straight line Ef in the vehicle longitudinal direction by means of each wheel holding member 65. In this case, each plate spring member 147 exerts spring force due to bending and/or torsion thereof so as to resist the above motions. The cross-sectional shape of the plate spring member 147 may be changed to appropriately modify the second moment of area and the modulus of section. Accordingly, desired bending strength and/or torsional strength can be selected.

Note that each plate spring member 147 according to this Modification Embodiment is made of a single plate-like member. Instead, two or more plate-like members may be stacked and bonded to form a stacked body.

In addition, each plate spring member 147 according to this Modification Embodiment is supported by the vehicle body frame 807 using the support tool 149 at one site at a longitudinal center portion thereof. Instead, each plate spring member 147 may be supported by the vehicle body frame 807 using the support tools 149 at multiple sites at longitudinal intermediate portions thereof. In this case, the support tools 149 are apart from one another with a certain distance in the longitudinal direction of each plate spring member 147 and support the longitudinal intermediate portions of each plate spring member 147.

Further, with regard to each plate spring member 147 according to this Modification Embodiment, the front end portion and the rear end portion of the single plate spring member 147 are supported by the second center support member 33 of the front-side suspension apparatus 5 and the first center support member 67 of the rear-side suspension apparatus 11, respectively. Instead, each plate spring member may be divided into a front-side plate spring member and a rear-side plate spring member. In this case, a rear portion of the front-side plate spring member and a front portion of the rear-side plate spring member are each supported by the vehicle body frame 807. Next, the second center support member 33 of the front-side suspension apparatus 5 is supported by a front end portion of the front-side plate spring member. Then, the first center support member 67 of the rear-side suspension apparatus 11 is supported by a rear end portion of the rear-side plate spring member.

Sixth Modification Embodiment

Figure 49:
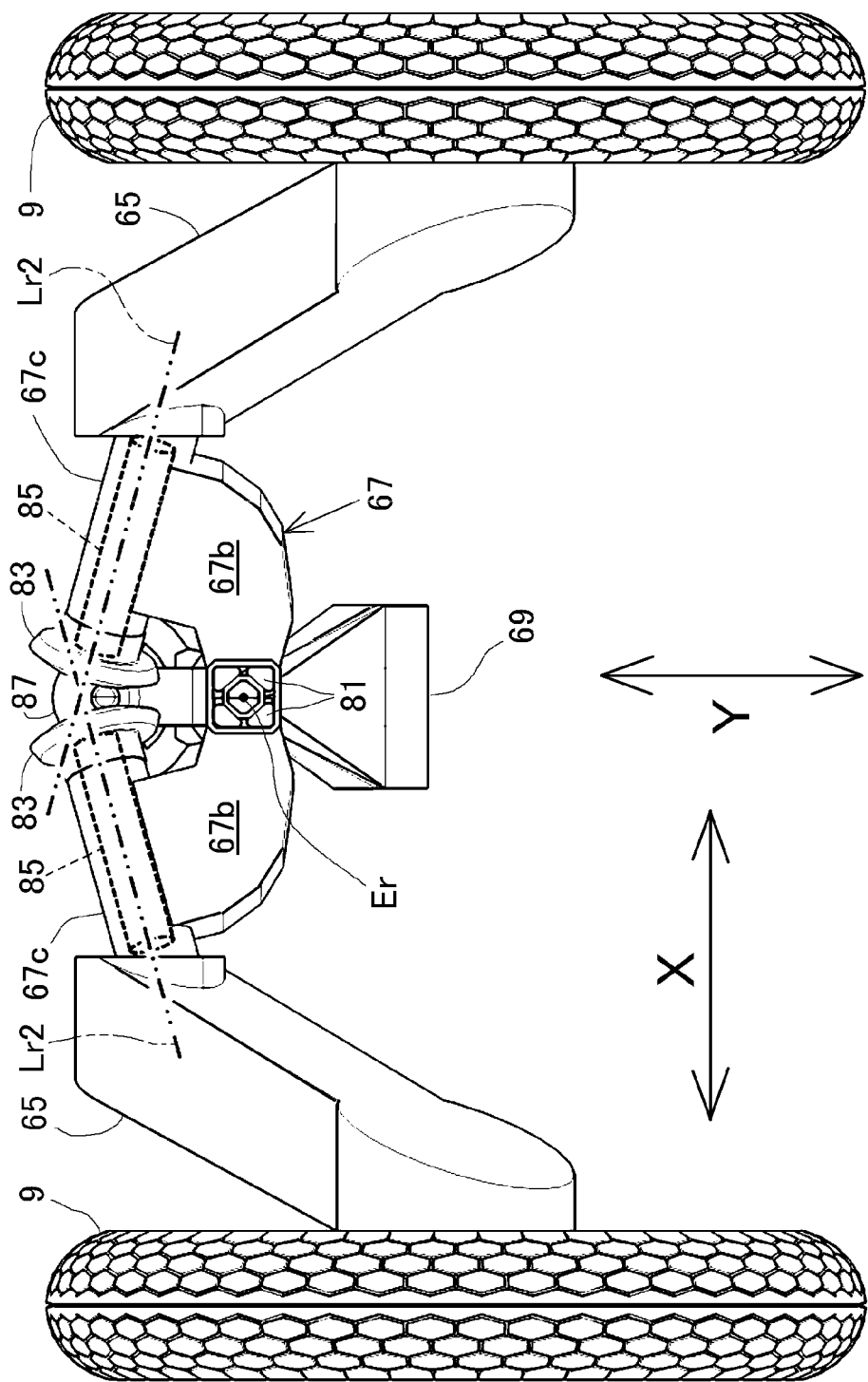
FIG. 49 is an enlarged outline view illustrating a state in which the batteries, etc., have been removed from the rear-side portion of the vehicle and some parts are made transparent. This enlarged outline view is seen from a rear side.
Figure 50:
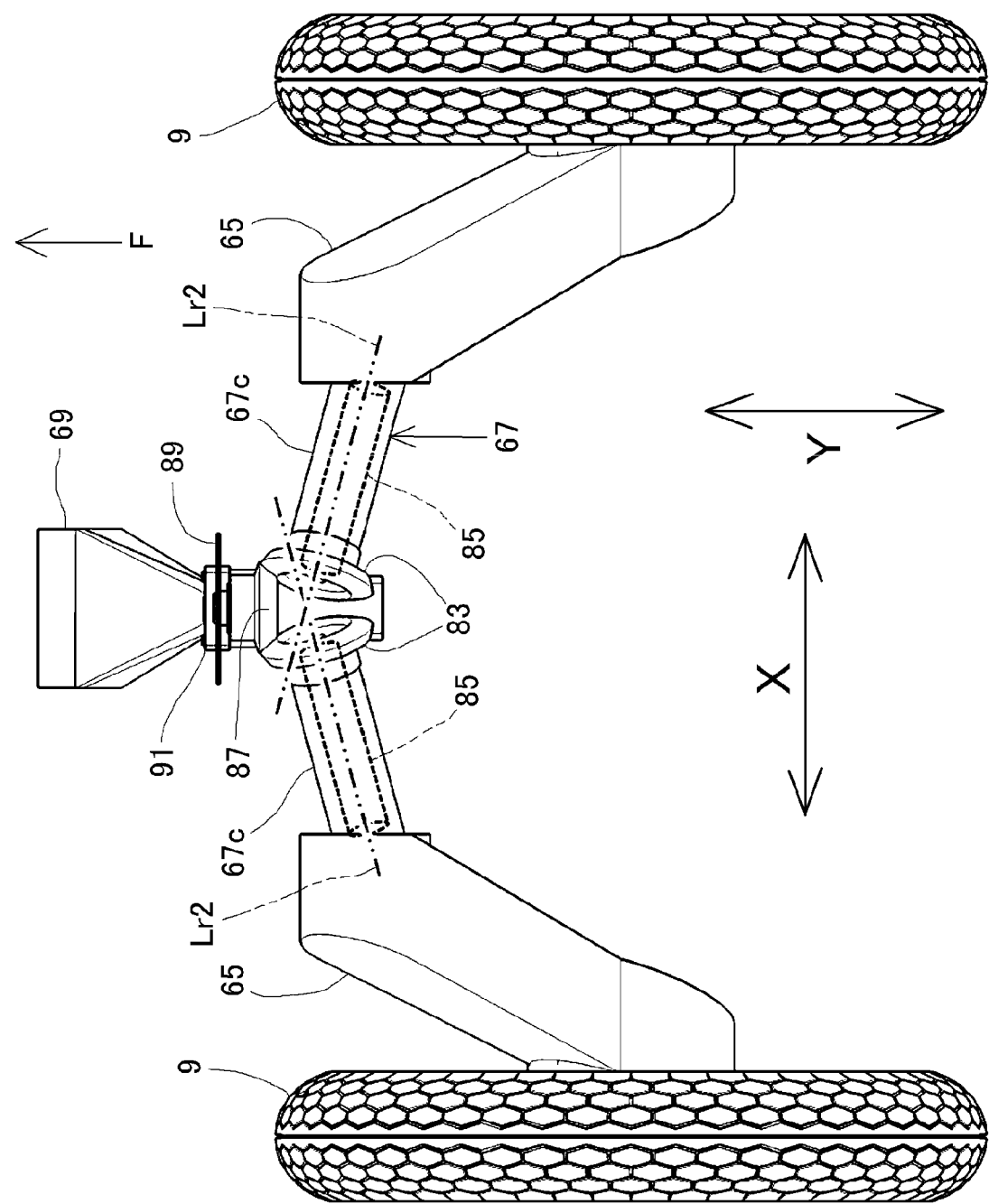
FIG. 50 is an enlarged outline view illustrating a state in which the batteries, etc., have been removed from the rear-side portion of the vehicle and some parts are made transparent. This enlarged outline view is seen from the above.
Figure 51:
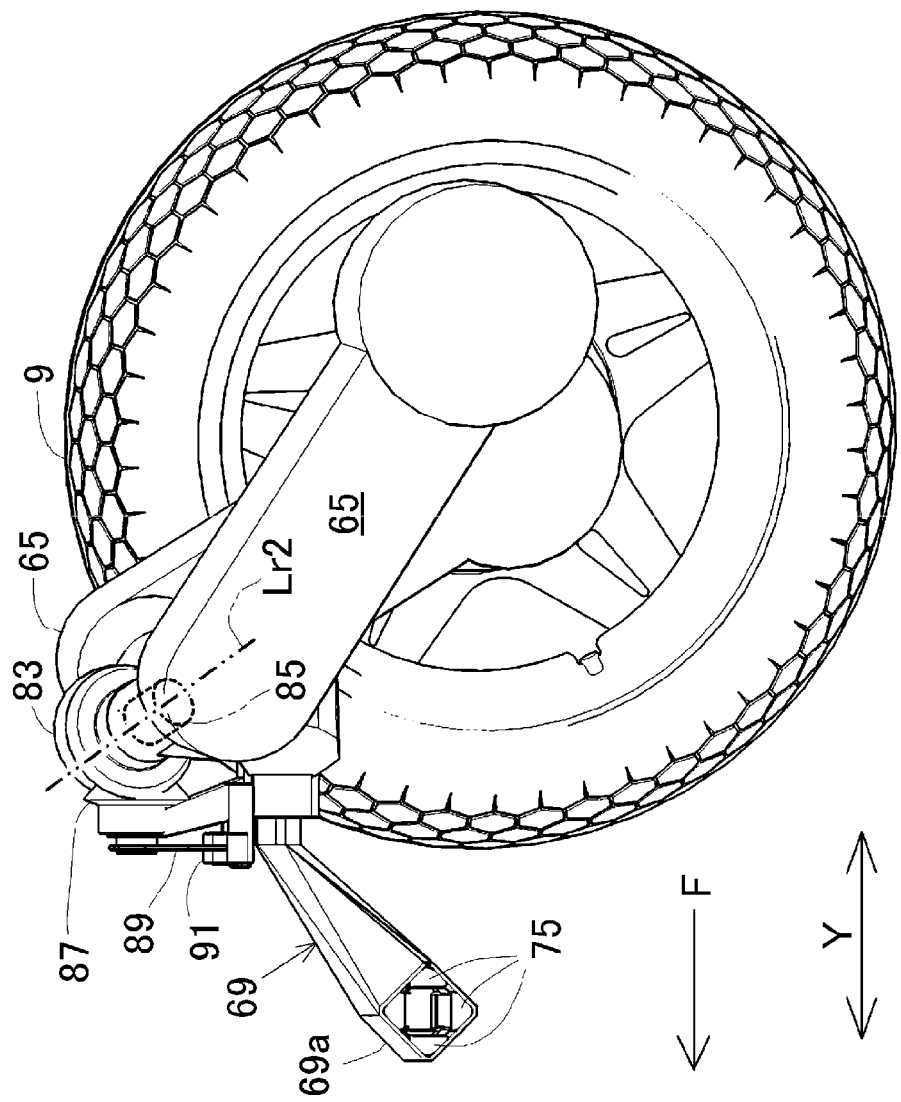
FIG. 51 is an enlarged outline view illustrating a state in which the left and right rear wheel support members are rotated vertically in opposite directions; the left-side rear wheel has been removed from the rear-side portion of the vehicle; and some parts are made transparent. This enlarged outline view is seen from a left side.
Figure 52:
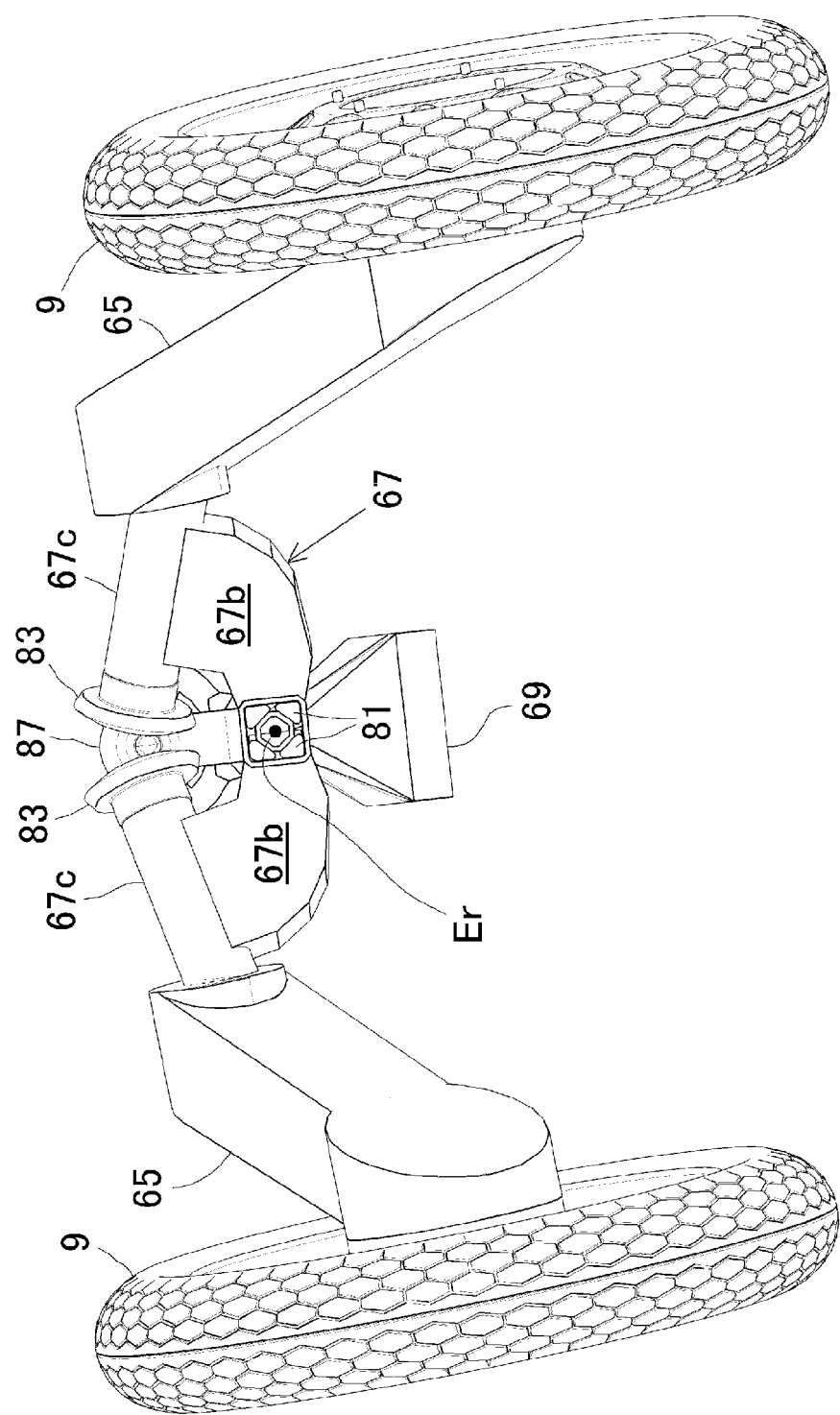
FIG. 52 is an enlarged outline view illustrating a state in which regarding the rear-side portion of the vehicle, the left and right rear wheel support members are rotated vertically in opposite directions. This enlarged outline view is seen from a rear side.
Figure 53:
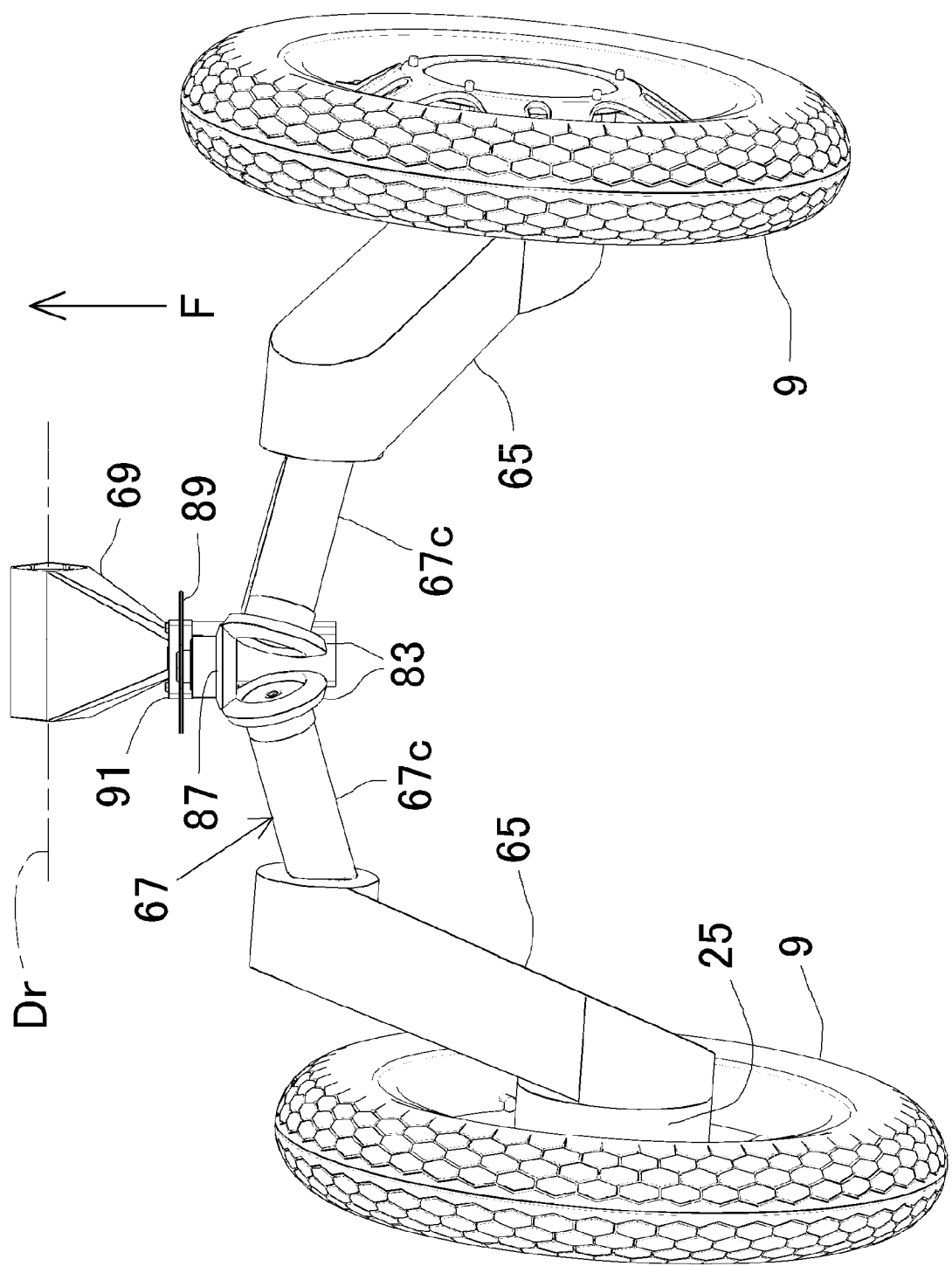
FIG. 53 is an enlarged outline view illustrating a state in which regarding the rear-side portion of the vehicle, the left and right rear wheel support members are rotated vertically in opposite directions. This enlarged outline view is seen from the above.

The previous Embodiment shows an example configuration in which each wheel holding member 65 is pivotally supported by the first center support member 67 about the swivel shaft 85 in the rear-side suspension apparatus 11; and the axis of the swivel shaft 85 extends horizontally in the vehicle widthwise direction. Instead, the axis of the swivel shaft 85 may be inclined like the sixth Modification Embodiment shown in FIGS. 41 to 54. Specifically, as shown in FIGS. 49 to 51, the vehicle widthwise direction of the vehicle body frame 7 is defined as an X direction; and the vehicle longitudinal direction of the vehicle body frame 7 is defined as a Y direction. Each swivel shaft 85 is arranged such that virtual straight lines Lr2 along the axis of each swivel shaft 85 are symmetrical to each other with respect to a plane that is parallel to the Y direction, perpendicular to the X direction, and intersects the vehicle widthwise center of the vehicle body frame 7. Each virtual straight line Lr2 corresponds to a "steering axis" according to the present invention. Each virtual straight line Lr2 is positioned such that the virtual straight lines Lr2 are inclined with respect to a plane including the X and Y directions and intersect the Y axis when viewed from the above of the vehicle body frame 7. Further, each virtual straight line Lr2 is positioned such that each virtual straight line Lr2 is positioned more forwardly as the distance from the line to the vehicle widthwise center of the vehicle body frame 7 decreases. In addition, each virtual straight line Lr2 is tilted such that an upper portion thereof is positioned forwardly of a lower portion thereof.

Figure 54:
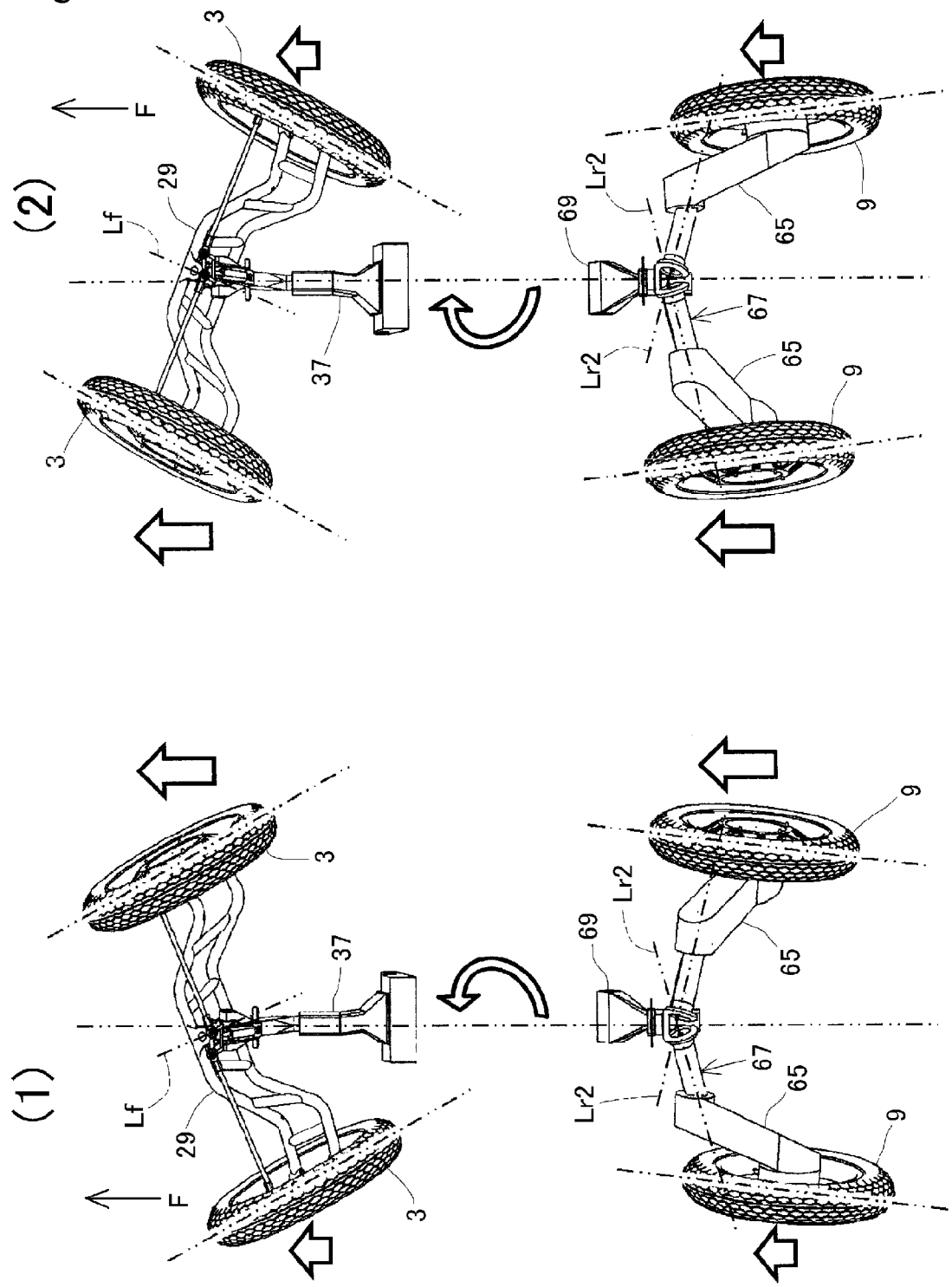
FIG. 54 is outline views illustrating a state of the vehicle when the front and rear wheels are steered and turned in a vehicle widthwise direction. The front side portion and the rear side portion are seen from the above.

When the vehicle 1 turns, the above configuration causes the wheel holding member 65 disposed on the inner side in the turning direction to move upward about the swivel shaft 85. By contrast, the wheel holding member 65 disposed on the outer side in the turning direction is moved downward about the swivel shaft 85. Accordingly, both the turning directions of the rear wheels 9 supported by the wheel holding members 65 are opposite to the turning direction (the steering direction of each front wheel 3). This steering is referred to as opposite-direction steering. Thus, the vehicle 1 can have improved turning performance. In addition, both the rear wheels 9 are under the opposite-direction steering and are inclined inwardly toward the turning direction. That is, the rear wheel 9 disposed on the inner side in the turning direction is in a positive camber state, and the rear wheel 9 disposed on the outer side in the turning direction is in a negative camber state. This results in improved grip force of each rear wheel 9 on the traveling road surface R during the turning. FIG. 54 illustrates the opposite-direction steering, the positive camber state, and the negative camber state. FIG. 54(1) shows a state where the vehicle 1 is turning to the left. FIG. 54(2) shows a state where the vehicle 1 is turning to the right. In these figures, the two-dot chain lines drawn on each front wheel 3 and each rear wheel 9 denote the direction of the turning of each wheel. The two-dot chain lines passing through the midpoints between the front wheels 3 and between the rear wheels 9 denote the widthwise center of the vehicle 1. In addition, the white arrows near each of the front wheels 3 and the rear wheels 9 denote the direction of the drive torque given to each of the front wheels 3 and the rear wheels 9 by each electric motor 25. The longer the length of the white arrow, the larger the amount of the drive torque.

Note that the virtual straight line Lr2 along the axis of each swivel shaft 85 is positioned such that the virtual straight line Lr2 is positioned more forwardly as the distance from the line to the widthwise center of the vehicle body frame 7 decreases. At the same time, each swivel shaft 85 may be arranged and tilted such that an upper portion thereof is positioned forwardly of a lower portion thereof. In this case, both the turning directions of the rear wheels 9 supported by the wheel holding members 65 are the same as the turning direction (the steering direction of each front wheel 3). This steering is referred to as the same-direction steering. In this case, both the rear wheels 9 are under the same-direction steering and are inclined inwardly toward the turning direction. That is, the rear wheel 9 disposed on the inner side in the turning direction is in a positive camber state, and the rear wheel 9 disposed on the outer side in the turning direction is in a negative camber state.

In addition, the virtual straight line Lr2 along the axis of each swivel shaft 85 may be positioned such that the virtual straight line Lr2 is positioned more rearwardly as the distance from the line to the widthwise center of the vehicle body frame 7 decreases. At the same time, each swivel shaft 85 may be arranged and tilted such that a lower portion thereof is positioned forwardly of an upper portion thereof. Accordingly, both the turning directions of the rear wheels 9 supported by the wheel holding members 65 are opposite to the turning direction (the steering direction of each front wheel 3). This steering is referred to as opposite-direction steering. In this case, both the rear wheels 9 are under the opposite-direction steering and are inclined outwardly toward the turning direction. That is, the rear wheel 9 disposed on the inner side in the turning direction is in a negative camber state, and the rear wheel 9 disposed on the outer side in the turning direction is in a positive camber state.

Further, the virtual straight line Lr2 along the axis of each swivel shaft 85 may be positioned such that the virtual straight line Lr2 is positioned more rearwardly as the distance from the line to the widthwise center of the vehicle body frame 7 decreases. At the same time, each swivel shaft 85 may be arranged and tilted such that an upper portion thereof is positioned forwardly of a lower portion thereof. In this case, both the turning directions of the rear wheels 9 supported by the wheel holding members 65 are the same as the turning direction (the steering direction of each front wheel 3). This steering is referred to as the same-direction steering. In this case, both the rear wheels 9 are under the same-direction steering and are inclined outwardly toward the turning direction. That is, the rear wheel 9 disposed on the inner side in the turning direction is in a negative camber state, and the rear wheel 9 disposed on the outer side in the turning direction is in a positive camber state.

In addition, the axis of the swivel shaft of the intermediate bevel gear 87 intersects the intersection point where the virtual straight lines Lr2 along the axis of each swivel shaft 85 intersect, and is directed in the vehicle longitudinal direction. Accordingly, while the intermediate bevel gear 87 is simultaneously engaged with each main bevel gear 83 attached to each swivel shaft 85, these three gears are interlocked and rotated. In addition, this Modification Embodiment is practiced in a manner similar to the previous Embodiment in the following points. The pair of left and right wheel holding members (65 and 65) can each rotate about the virtual straight line Lr2 by degrees within substantially the same vertical angle (e.g., about 45 degrees) relative to a neutral position defined as a state of being inclined by about 45 degrees with respect to the traveling road surface R while the wheel holding members 65 are positioned lower as the members each extend in a longitudinal direction far from the virtual straight line Lr2 along the axis of the swivel shaft 85. The neutral position is referred to as the angle position of the wheel holding member 65 when the vehicle 1 is stopped on a leveled flat road surface while an occupant is being seated. Thus, in order to absorb traveling road surface R roughness-derived vibrations that spread from each rear wheel 9 to the wheel holding members 65, the movement range of each wheel support member 65 can be set to a preferable range.

Further, with regard to this Modification Embodiment, like the above fifth Modification Embodiment, the front end portion and the rear end portion of each left or right plate spring member 147 are supported by the second center support member 33 of the front-side suspension apparatus 5 and the first center support member 67 of the rear-side suspension apparatus 11, respectively.

Figure 44:
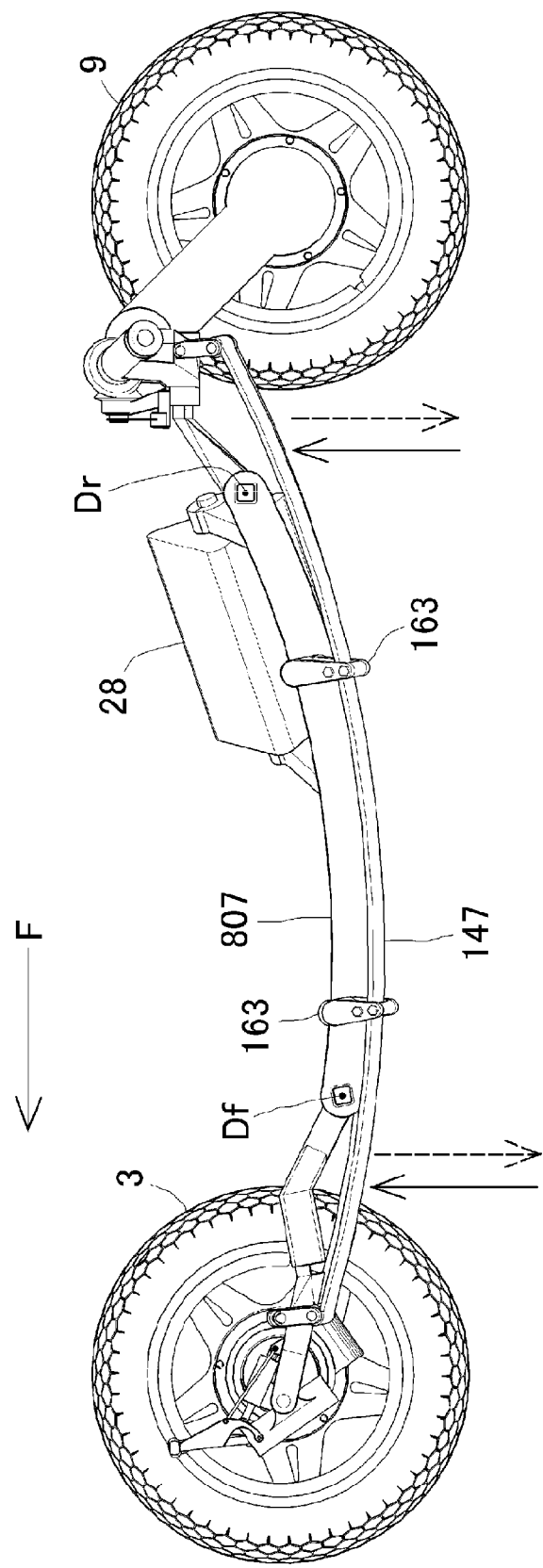
FIG. 44 is an outline view of the vehicle without the cabin, the left-side front and rear wheels, the batteries, etc., when viewed from a left side.
Figure 45:
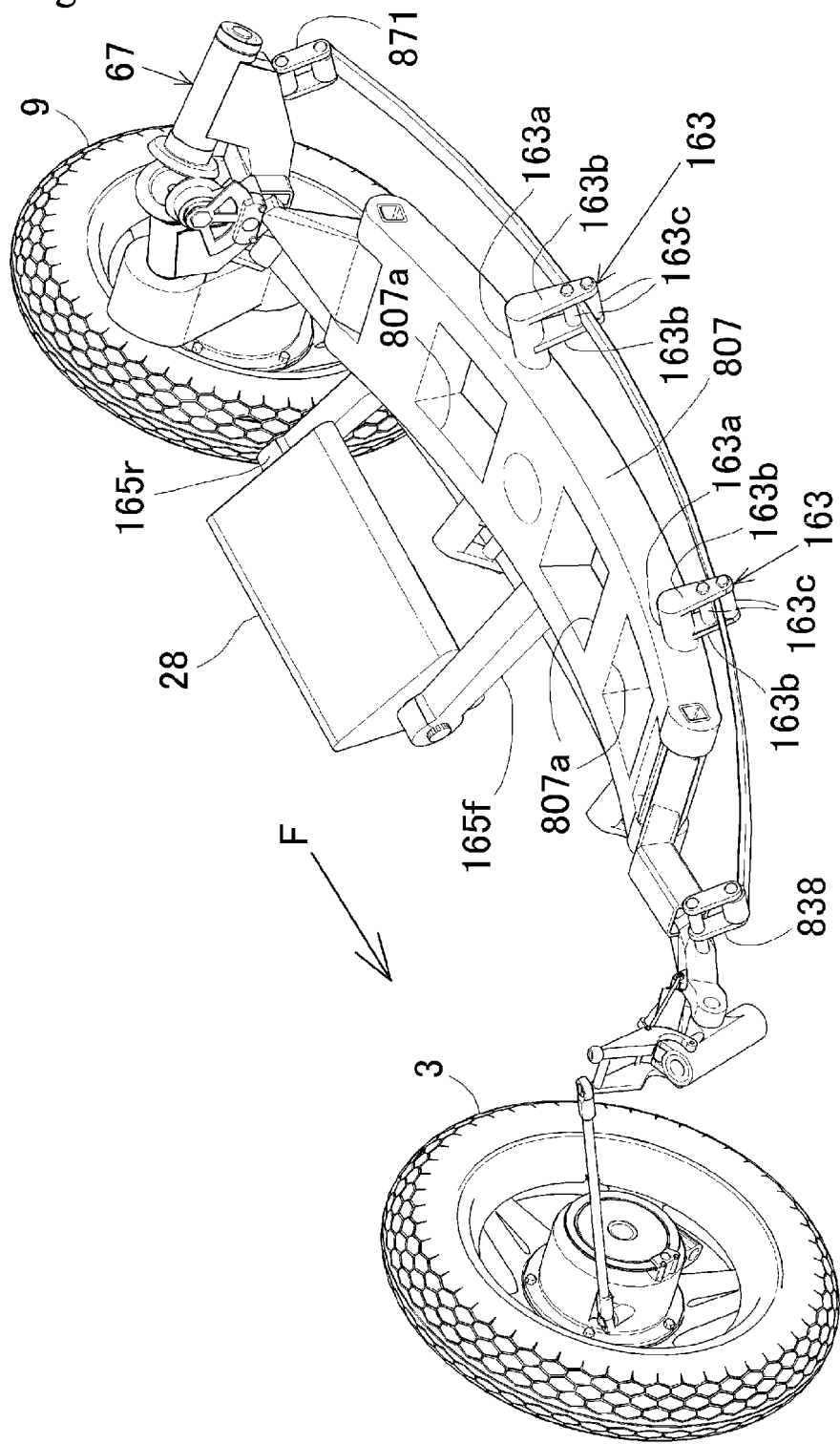
FIG. 45 is an outline view of the vehicle without the cabin, the left-side front and rear wheels, the batteries, etc., when seen from the upper front.
Figure 46:
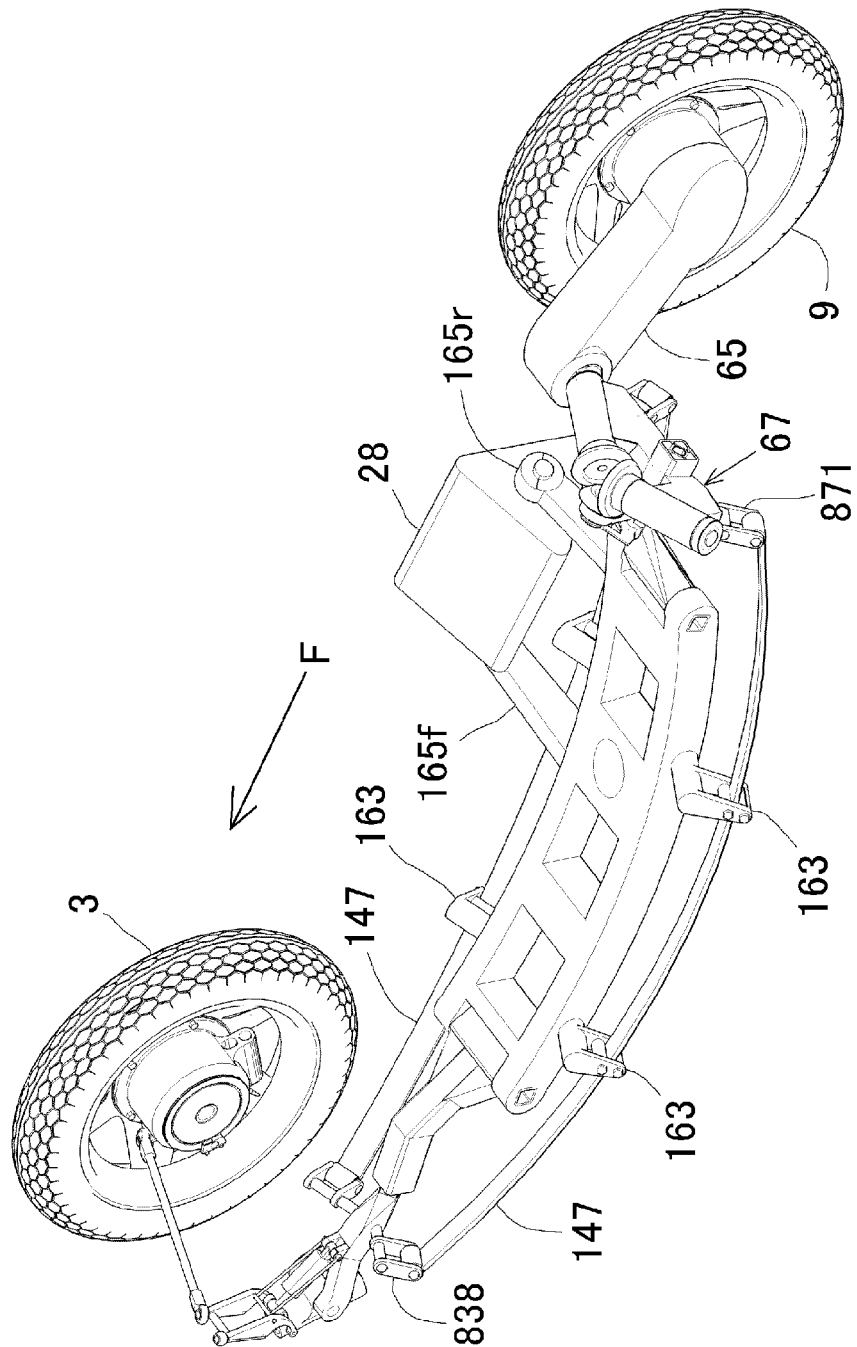
FIG. 46 is an outline view of the vehicle without the cabin, the left-side front and rear wheels, the batteries, etc., when seen from the upper rear.
Figure 47:
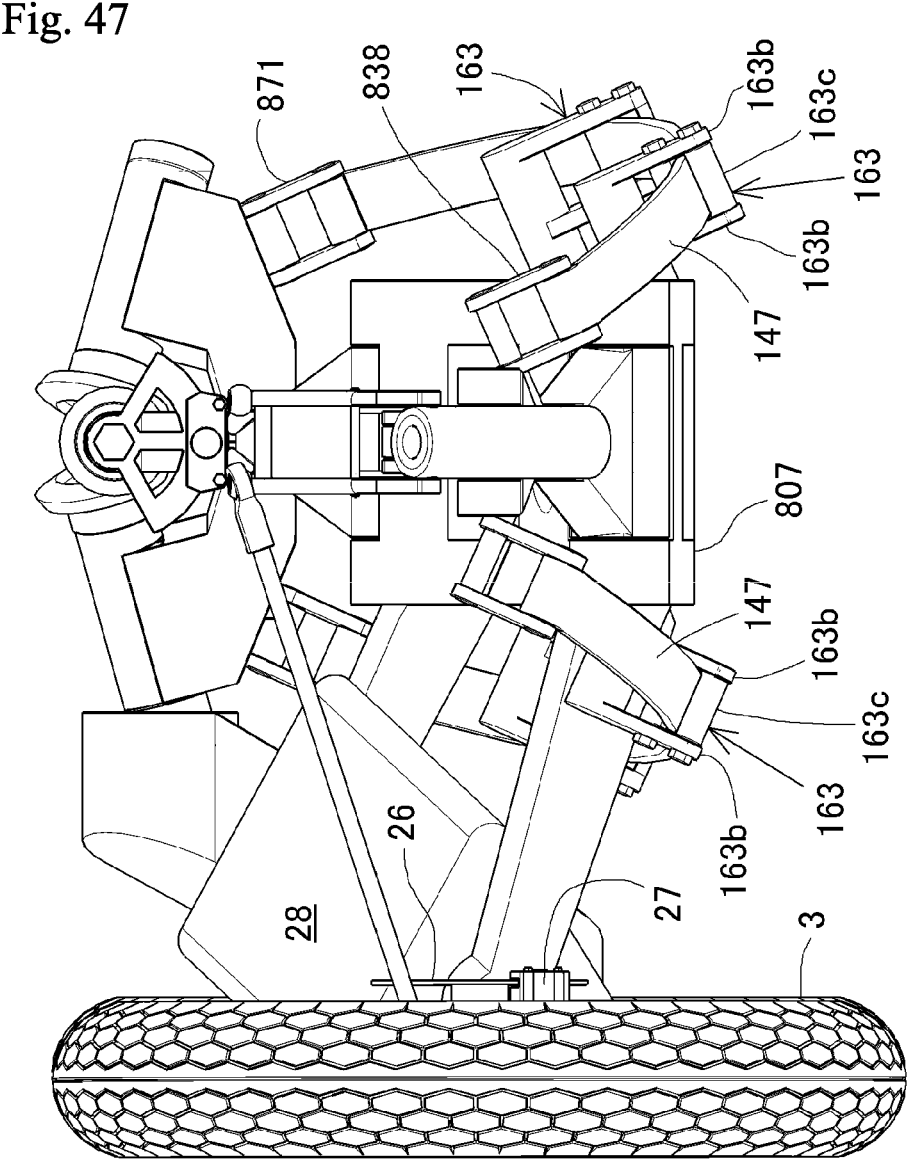
FIG. 47 is an enlarged outline view illustrating a state in which the front wheel support member and the left-side front wheel have been removed from the front-side portion of the vehicle. This enlarged outline view is seen from the front.
Figure 48:
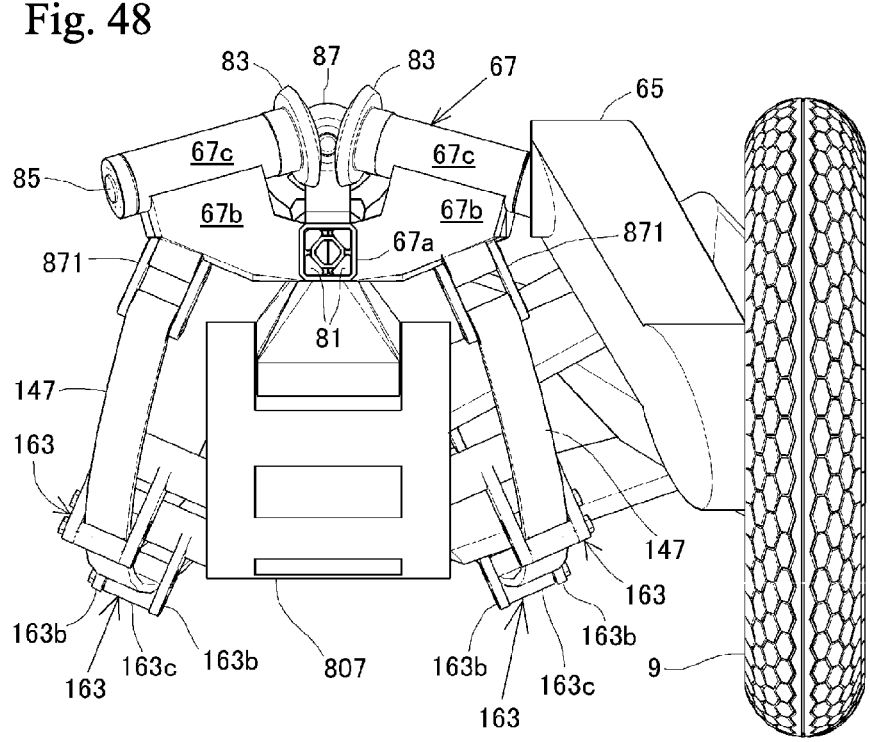
FIG. 48 is an enlarged outline view illustrating a state in which the left-side rear wheel and the left-side rear wheel support member have been removed from the rear-side portion of the vehicle. This enlarged outline view is seen from a rear side.

Note that one site at the longitudinal center portion of each plate spring member 147 according to the fifth Modification Embodiment is supported using the support tool 149 by the vehicle body frame 807. In this Modification Embodiment, a plurality of sites (i.e., two sites which are apart from each other, with a distance, in the longitudinal direction of each plate spring member 147) in a longitudinal intermediate portion of each plate spring member 147 are supported by the vehicle body frame 807 while the support tool 163, which is a pair of roller members (163c and 163c), is used. Because of this configuration, the solid line arrows of FIG. 44 illustrate that when the front end portion side of the plate spring member 147 is displaced upwardly, the rear end portion side thereof is also displaced upwardly in response to the former displacement. Meanwhile, the dashed line arrows of FIG. 44 illustrate that when the front end portion side of the plate spring member 147 is displaced downwardly, the rear end portion side thereof is also displaced downwardly in response to the former displacement. Consequently, for example, the traveling road surface R roughness-derived vibrations spread from the front wheel 3 via the front wheel support member 29, etc., to the second center support member 33. Then, the second center support member 33 may be displaced relatively and vertically in either of the upward and downward directions with respect to the vehicle body frame 807. In this case, both the front and rear end portion sides of the plate spring member 147 are bent toward the same direction. Hence, the vehicle body frame 807 does not rocks in the vehicle longitudinal direction, but does shift in parallel toward this direction. This makes it possible to avoid a loss of ride comfort.

In addition, in a vehicle widthwise intermediate portion of the vehicle body frame 807, there are a plurality of rectangular through-opening portions 807a (see FIG. 45) formed in the vehicle longitudinal direction so as to make the vehicle body frame 807 lightweight. Each support tool 163 includes: a cylindrical boss part 163a that is disposed on the left or right side of the vehicle body frame 807 and protrudes obliquely upward in the vehicle widthwise direction relative to the side surface; a pair of stay parts (163b and 163b) that protrude obliquely downward relative to a lower surface portion of the boss part 163a and are arranged in parallel with a certain distance in the vehicle widthwise direction; and a pair of cylindrical roller members (163c and 163c) that are laid between the pair of stay parts (163b and 163b).

The pair of roller members (163c and 163c) are pivotally supported by the pair of stay parts (163b and 163b). The boss part 163a is attached by welding to the left or right side surface of the vehicle body frame 807. The pair of roller members (163c and 163c) are inclined like each plate spring member 147. Also, the pair of roller members (163c and 163c) are fixed, with a certain distance (the same size as that of the thickness of each plate spring member 147), in parallel to the pair of stay parts (163b and 163b). Each plate spring member 147 is sandwiched between the pair of roller members (163c and 163c). According to this configuration, with regard to the plate spring member 147, the vertical displacement of the portion sandwiched between the pair of roller members (163c and 163c) is restricted, but the movement in the vehicle longitudinal direction is permitted. Except for the portion sandwiched between the pair of roller members (163c and 163c), the vertical displacement and the longitudinal movement of an intermediate portion between front and rear ends of the plate spring member 147 coupled to the shackles (838 and 871) are permitted. Both end portions of each roller member 163c may be fixed using a screw member and directly supported by each stay part 163b. However, each end portion may be supported via an elastic member by each stay part 163b. In addition, any one of the pair of upper and lower roller members (163c and 163c) are replaced by an elastic member or both the roller members may be replaced by elastic members.

In this way, each plate spring member 147 is assembled in the vehicle 1. In this state, the entire lengthwise plate surface of each plate spring member 147 is inclined downward toward the vehicle widthwise center of the vehicle body frame 807. In addition, each plate spring member 147 is bent such that the lengthwise center portion thereof protrudes outwardly in the vehicle widthwise direction when viewed from the above. Meanwhile, the second center support member 33 of the front-side suspension apparatus 5 and the first center support member 67 of the rear-side suspension apparatus 11 may be relatively rocked with respect to the vehicle body frame 807. In this case, the above configuration allows each plate spring member 147 to be flexible and bent. This can suitably suppress the movement of the second center support member 33 and the first center support member 67.

In addition, each plate spring member 147 is bent such that the lengthwise center portion protrudes outwardly in the vehicle widthwise direction when viewed from the above. Consequently, the vehicle widthwise distance between the front end portions of the plate spring members 147 and the vehicle widthwise distance between the rear end portions of the plate spring members 147 are narrower than the other portions. Because of this, other components disposed at or near the front and rear end portions of each plate spring member 147 can be arranged in close to the vehicle widthwise center. This can ensure a sufficient range of the angle of rotation of the front wheel support member 29 of the front-side suspension apparatus 5 about the axis of the steering shaft member 51.

This bent shape of each plate spring member 147 may be processed before each plate spring member 147 is assembled in the vehicle 1. Also, the spring member 147 that is straight and flat before the assembly may be first attached to the vehicle 1 and then may be made to be bent. Because the plate spring member 147 is subject to deformation while being attached to the vehicle 1, each plate spring member 147 is given an initial load while being attached. Accordingly, some large spring force can be applied even at the time of the initial bending of each plate spring member 147. Meanwhile, the traveling road surface R roughness-derived vibrations may spread from each front wheel 3 (each rear wheel 9) via the front wheel support member 29 (the wheel holding member 65), etc., to the second center support member 33 (the first center support member 67). These support members (33 and 67) may be relatively largely displaced with respect to the vehicle body frame 807. Even in this case, the relative displacement can be effectively reduced.

Each battery 28 has a substantially triangular cylinder shape. Like the fifth Modification Embodiment, the front end portion, rear end portion, and bottom surface portion of each battery 28 are supported via elastic members (not shown). One end portion of each of a front-side battery support member 165f and a rear-side battery support member 165r is fixed by welding to the left or right side surface of the vehicle body frame 807. The other end portion of each of the front-side battery support member 165f and the rear-side battery support member 165r supports a front end portion and a rear end portion, respectively, of each battery 28. The rear-side battery support member 165r is disposed on the left or right side of the rear end portion of the vehicle body frame 807 and protrudes upwardly in the vehicle widthwise direction relative to the side surface. The front-side battery support member 165f is arranged, with a distance, forwardly of the rear-side battery support member 165r. The front-side battery support member 165f is disposed on the left or right side of the vehicle body frame 807 and protrudes obliquely upward in the vehicle widthwise direction relative to the side surface. The front-side battery support member 165f is longer than the rear-side battery support member 165r. Accordingly, the front portion of each battery 28 is positioned more outwardly than the rear portion thereof.

Note that this Modification Embodiment illustrates an example configuration in which the pair of left and right plate spring members (147 and 147) are used. Like the previous Embodiment, the second center support member 33 of the front-side suspension apparatus 5 may be supported by the front-side torsion spring member 41; and the first center support member 67 of the rear-side suspension apparatus 11 may be supported by the rear-side torsion spring member 73.

Seventh Modification Embodiment

Figure 55:
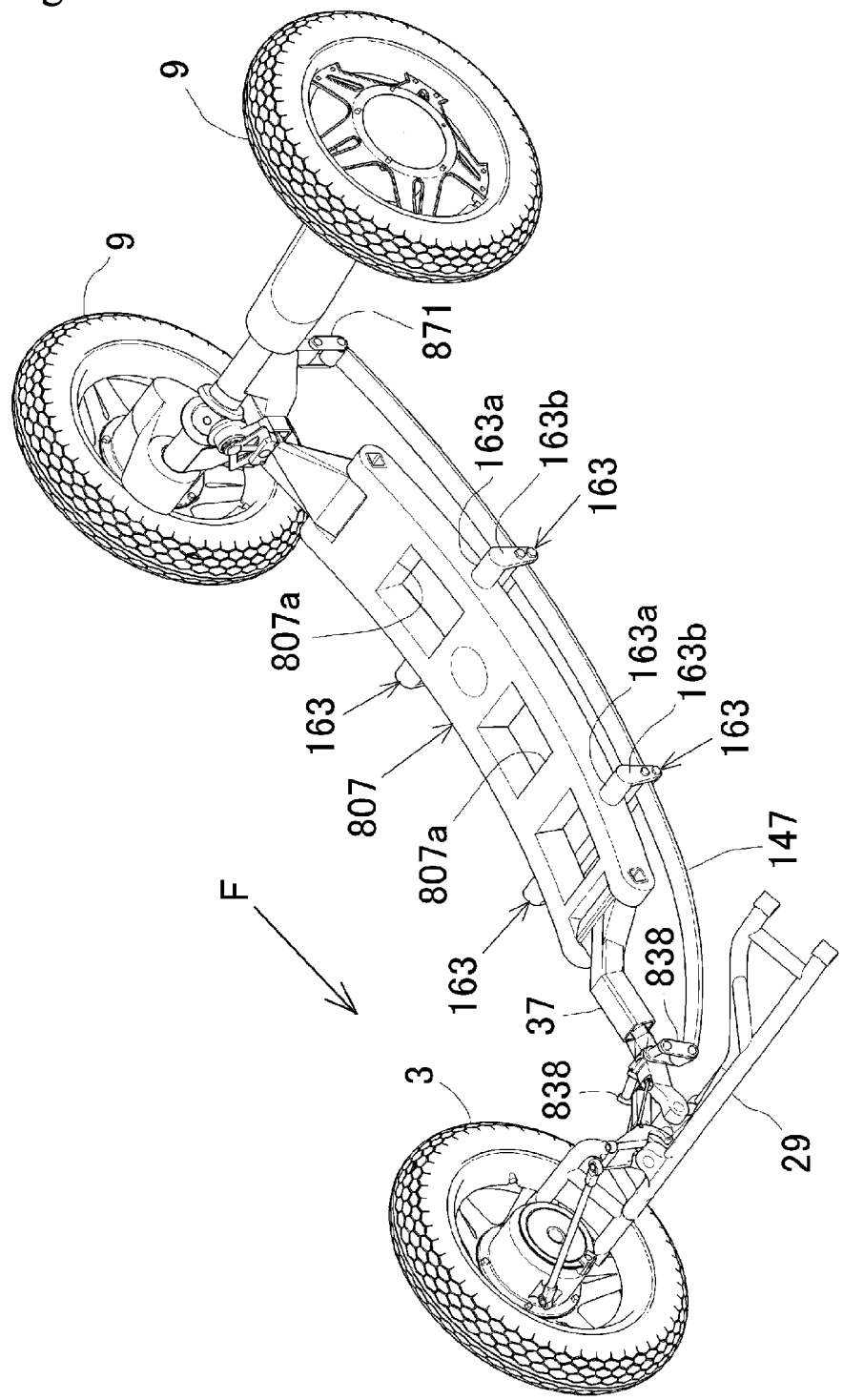
FIG. 55 is an outline view of a vehicle according to the seventh Modification Embodiment of the present invention. In the vehicle, the cabin, the left-side front wheel, the batteries, etc., have been removed. This outline view is seen from the upper front.
Figure 56:
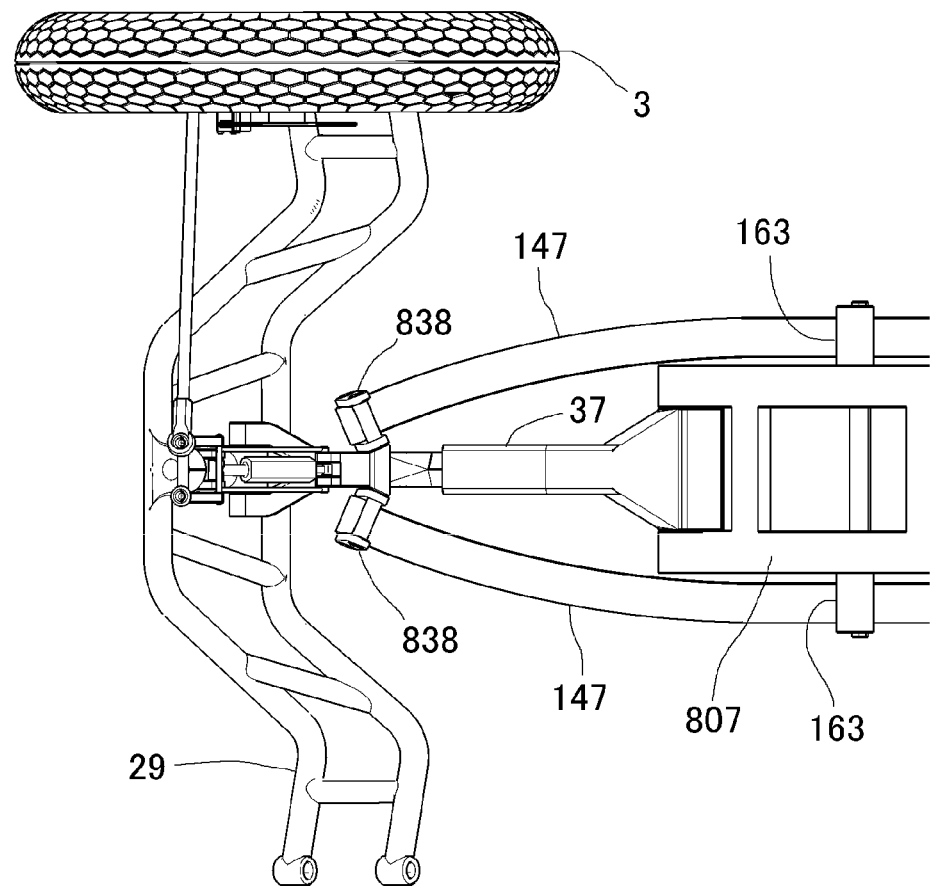
FIG. 56 is an enlarged outline view illustrating a state in which the left-side front wheel has been removed from the front-side portion of the vehicle. This enlarged outline view is seen from the above.
Figure 57:
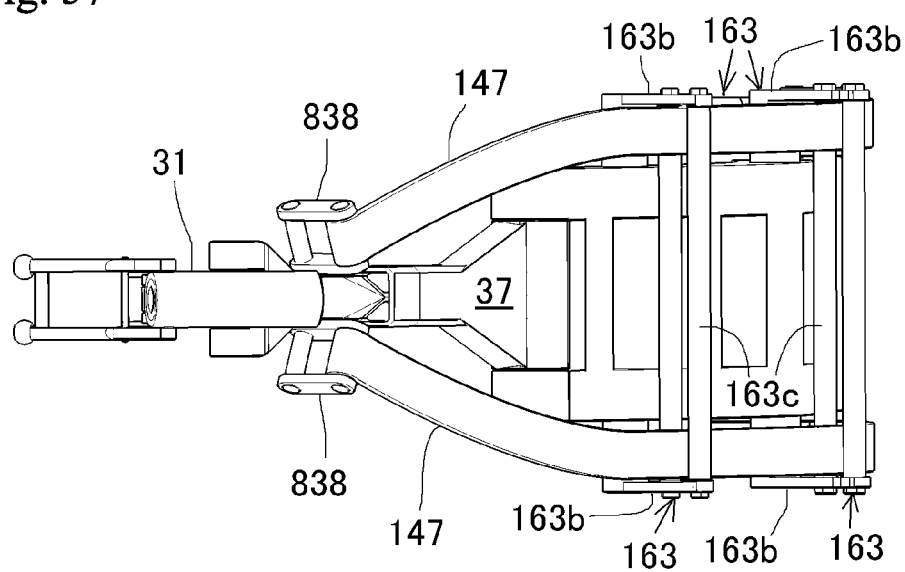
FIG. 57 is an enlarged outline view illustrating a state in which both the front wheels have been removed from the front-side portion of the vehicle. This enlarged outline view is seen from the bottom.
Figure 58:
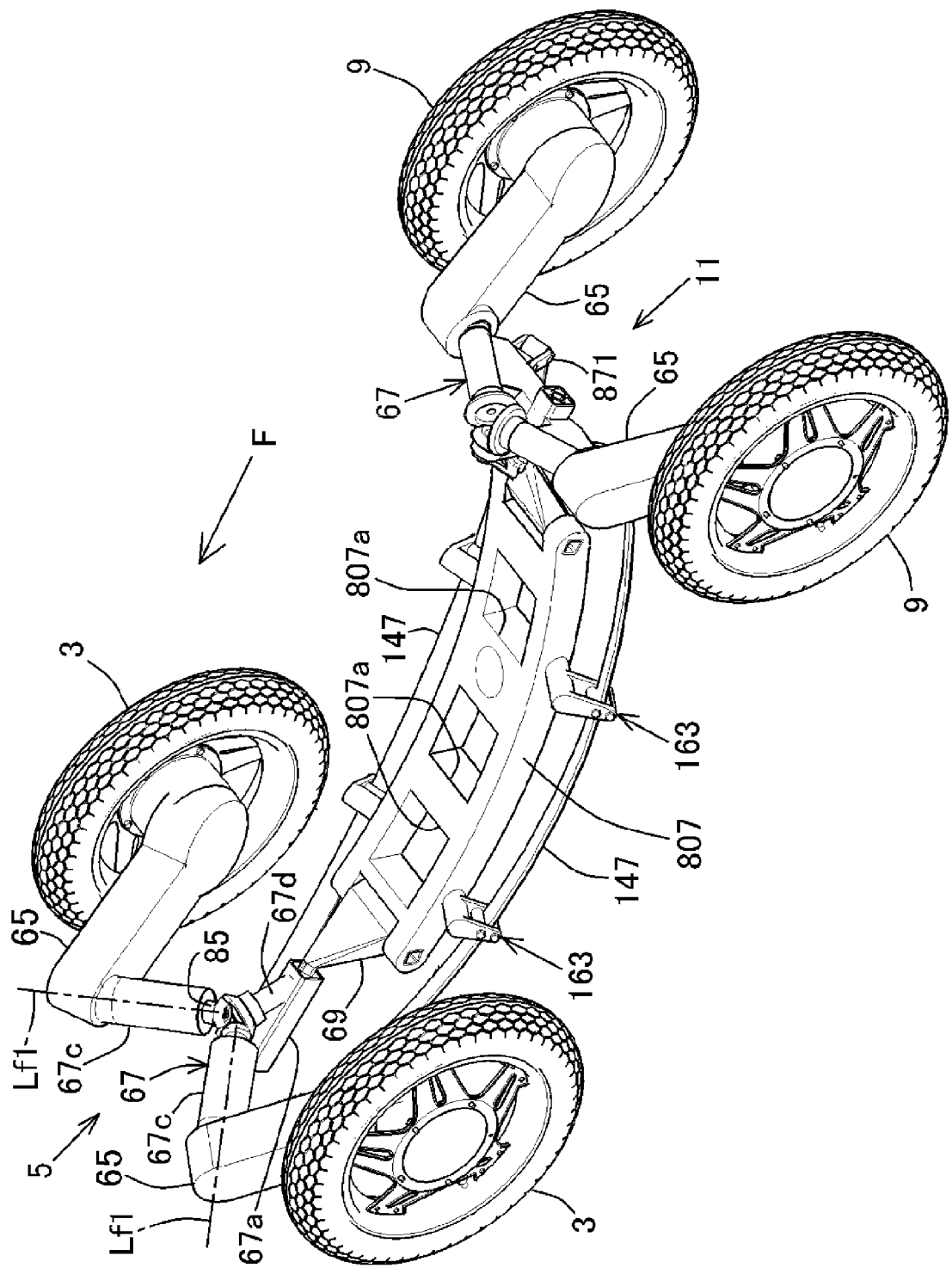
FIG. 58 is an outline view of a vehicle according to the eighth Modification Embodiment of the present invention. In the vehicle, the cabin, the batteries, etc., have been removed. This outline view is seen from the upper rear.
Figure 59:
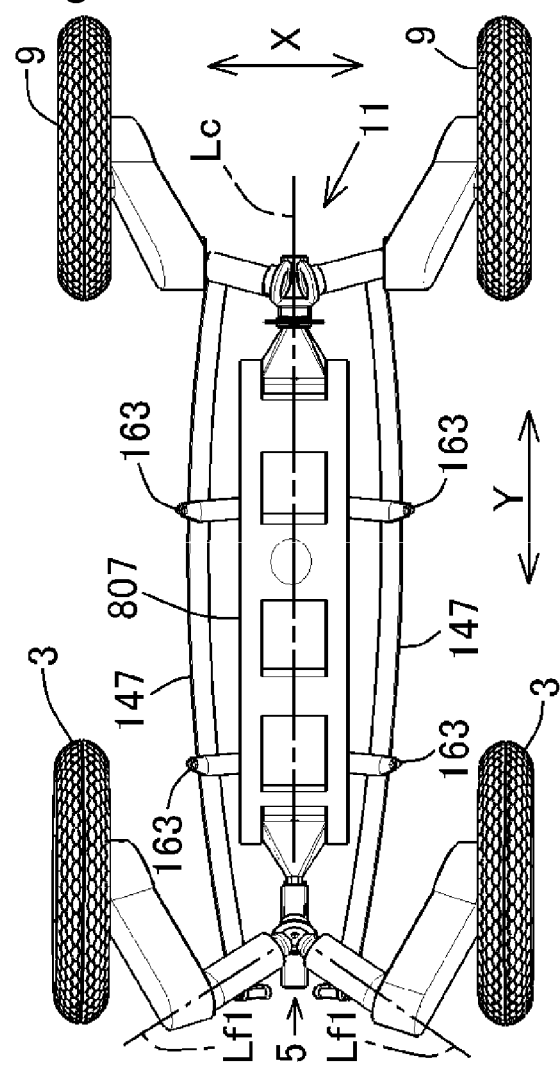
FIG. 59 is a general view of the vehicle without the cabin, the batteries, etc., when viewed from the above.
Figure 60:
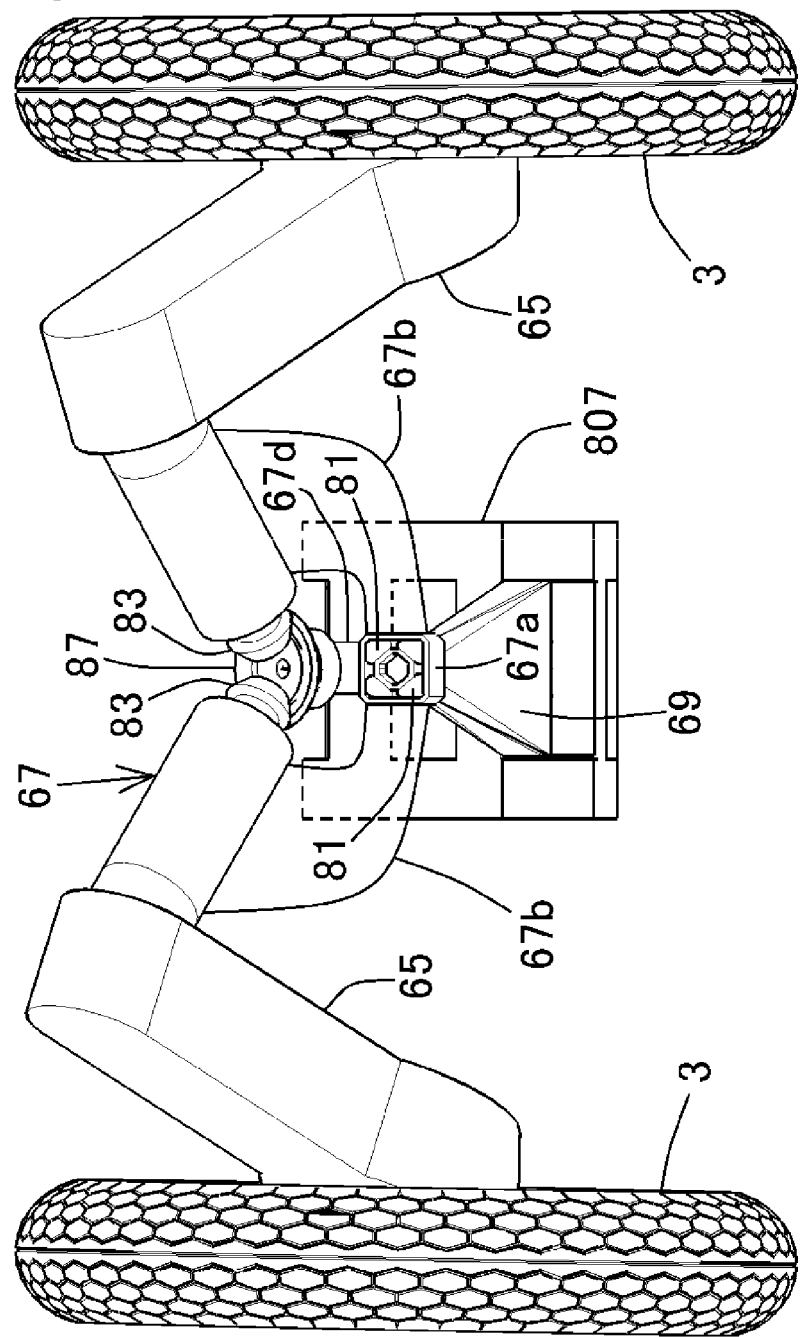
FIG. 60 is an enlarged outline view illustrating a state of the front-side portion of the vehicle when seen from the front.
Figure 61:
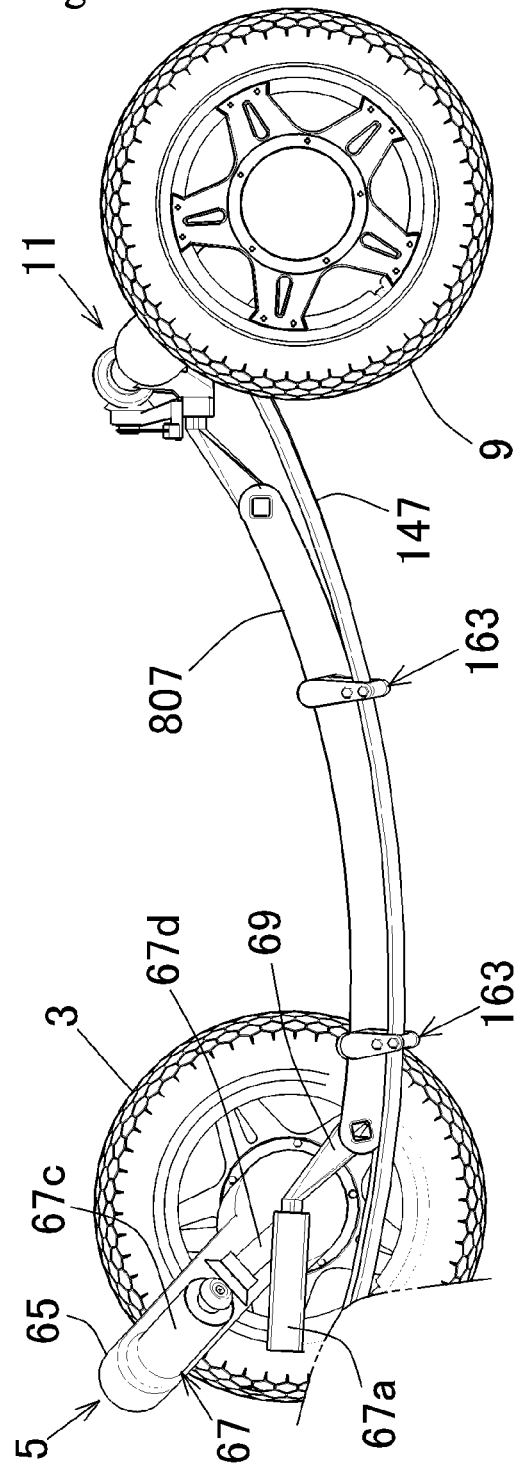
FIG. 61 is an outline view of the vehicle without the cabin, the left-side front wheel, the right-side rear wheel, the batteries, etc., when viewed from a left side.

The sixth Modification Embodiment shows an example configuration in which the plate spring member 147 is sandwiched between the pair of roller members (163c and 163c), the both ends of which are fixed to the pair of stay parts (163b and 163b) of the support tool 163. Instead, like the seventh Modification Embodiment shown in FIGS. 55 to 57, the plate spring member 147 may be sandwiched between a pair of upper and lower long roller members (163c and 163c) that are laid between the stay part 163b of the left support tool 163 and the stay part 163b of the right support tool 163. According to this configuration, the long roller members (163c and 163c) protect the vehicle body frame 807 from colliding with an obstacle on a road surface. Each support tool 163 includes: a cylindrical boss part 163a that is disposed on the left or right side of the vehicle body frame 807 and protrudes outwardly in the vehicle widthwise direction relative to the side surface; a plate-like stay part 163b that protrudes downwardly relative to a lower surface portion of each boss part 163a; and a pair of cylindrical roller members (163c and 163c), both end portions of which are fixed on the stay parts (163b and 163b) of the pair of support tools 163 fixed at corresponding positions in the vehicle widthwise direction.

The pair of roller members (163c and 163c) are arranged below the vehicle body frame 807. Also, both the end portions of the roller member are secured using screw members to both the stay parts 163b while the roller member is laid between the stay parts 163b. Of the pair of roller members (163c and 163c), the upper roller member 163c is in contact with the lower surface of the vehicle body frame 807 or is disposed, with a small gap, near the lower surface. The boss part 163a is attached by welding to the left or right side surface of the vehicle body frame 807. The pair of roller members (163c and 163c) are attached, in parallel to each other with a certain vertical distance (the same size as the thickness of each plate spring member 147), to the pair of stay parts (163b and 163b). Each plate spring member 147 is sandwiched between the pair of roller members (163c and 163c). According to this configuration, the vertical displacement of the portion sandwiched between the pair of roller members (163c and 163c) is restricted, but the movement in the vehicle longitudinal direction is permitted. Except for the portion sandwiched between the pair of roller members (163c and 163c), the vertical displacement and the longitudinal movement of an intermediate portion between front and rear ends of the plate spring member 147 coupled to the shackles (838 and 871) are permitted.

Eighth Modification Embodiment

The previous Embodiment and each Modification Embodiment illustrate, as an example, the front-side suspension apparatus 5 in which the front wheel support member 29 is pivotally supported about the axis of the steering shaft member 51 and the pair of the front wheel support members (729 and 729) are pivotally supported about the axes of the pair of left and right steering shaft members (751 and 751). Instead, like the eighth Modification Embodiment shown in FIGS. 58 to 61, the front-side suspension apparatus 5 may have substantially the same structure as that of the rear-side suspension apparatus 11 according to the sixth Modification Embodiment. Specifically, the front-side suspension apparatus 5 according to this eighth Modification Embodiment includes: a pair of left and right wheel holding members (65 and 65), one end of which is fixed to the electric motor 25 for each front wheel 3; a first center support member 67 that pivotally supports each wheel holding member 65 about the axis of each swivel shaft 85 while the other ends of the wheel holding members 65 face each other with a distance; and a second center support member 69, a front end portion of which supports a rear end portion of the first center support member 67. The virtual straight line Lf1 along the axis of each swivel shaft 85 corresponds to a "steering axis" according to the present invention. The first center support member 67 is supported using a pair of shackles (838 and 838) by the pair of plate spring members (147 and 147). Upper end portions of the pair of shackles (838 and 838) are pivotally coupled via pins to the pair of left and boss portions that protrude and are disposed at a lower portion of the first center support member 67. This applies an initial load onto the front-side suspension apparatus 5. At the same time, the front wheels 3 are displaced to one another vertically in the same direction or opposite directions with respect to the vehicle body frame 7. Accordingly, the first center support member 67 may be displaced vertically or be rotated about the vehicle longitudinal axis by means of each wheel holding member 65. In this case, each plate spring member 147 exerts spring force due to bending and/or torsion thereof so as to resist the above motions.

Each wheel holding member 65 of the front-side suspension apparatus 5 corresponds to a "wheel support member", "linkage mechanism", and "wheel support means" according to the present invention. The first center support member 67 corresponds to a "base member", "linkage mechanism", and "wheel support means" according to the present invention. The second center support member 69 corresponds to a "base member" and "coupling means" according to the present invention. In addition, it is needless to say that components other than the ones above, in particular the ones having the same structures as those of the rear-side suspension apparatus 11 according to the sixth Modification Embodiment, also constitute elements of the present invention in a manner similar to the matters mentioned in the description of the sixth Modification Embodiment.

The pair of left and right wheel holding members (65 and 65) can rotate about the virtual straight line Lr1 by degrees within substantially the same vertical angle (e.g., about 45 degrees) relative to a neutral position defined as a state of being inclined by about 45 degrees while the wheel holding members 65 are positioned lower as the members each extend in a longitudinal direction far from the virtual straight line Lr1 along the swivel shaft 85. The neutral position is referred to as the angle position of the wheel holding member 65 when the vehicle 1 is stopped on a leveled flat road surface while an occupant is being seated. Thus, in order to absorb traveling road surface R roughness-derived vibrations that spread form each front wheel 3 to the wheel holding members 65, the movement range of each wheel holding member 65 can be set to a preferable range.

The vehicle widthwise direction of the vehicle body frame 7 is defined as an X direction; and the vehicle longitudinal direction of the vehicle body frame 7 is defined as a Y direction. Each swivel shaft 85 is arranged such that the virtual straight lines Lf1 are symmetrical to each other with respect to a plane that is parallel to the Y direction, perpendicular to the X direction, and intersects the vehicle widthwise center of the vehicle body frame 7. Each virtual straight line Lf1 is positioned such that the virtual straight lines Lr1 are inclined with respect to a plane including the X and Y directions and intersect the Y axis when viewed from the above of the vehicle body frame 7. Further, each virtual straight line Lf1 is positioned such that each virtual straight line Lf1 is positioned more rearwardly as the distance from the line to the vehicle widthwise center of the vehicle body frame 7 decreases. In addition, each virtual straight line Lf1 is tilted such that an upper portion thereof is positioned forwardly of a lower portion thereof.

When the vehicle 1 turns, the above configuration causes the wheel holding member 65 disposed on the inner side in the turning direction to move upward about the swivel shaft 85. By contrast, the wheel holding member 65 disposed on the outer side in the turning direction is moved downward about the swivel shaft 85. In this case, both the turning directions of the front wheels 3 supported by the wheel holding members 65 are directed toward the turning direction of the vehicle. As described above, the front-side suspension apparatus 5 according to this eighth Modification Embodiment has substantially the same configuration as of the rear-side suspension apparatus 11 according to the sixth Modification Embodiment. Thus, it is needless to say that the front-side suspension apparatus 5 according to this eighth Modification Embodiment exerts the same effects as of the rear-side suspension apparatus 11 according to the sixth Modification Embodiment. Consequently, any one of the difference in torque applied between the front wheels 3 and the difference in vertical load between the front wheels 3 causes any one of the wheel holding members 65 of the front-side suspension apparatus 5 to rotate about the axis of the swivel shaft 85. Accordingly, the wheel holding members 65 of the front-side suspension apparatus 5 are moved in opposite directions.

Note that in FIGS. 58 to 61, there are no pictures regarding the rotating plate 89, the movement-restricting device 91, and the angle sensor 92 as described in the previous Embodiment. Like the previous Embodiment, these components may be added to the front-side suspension apparatus 5 according to this eighth Modification Embodiment. In this case, the movement-restricting device 91 corresponds to "resistance means" according to the present invention.

The above-described Embodiment and first to eighth Modification Embodiments according to the present invention are just examples so as to illustrate the present invention. The present invention is not limited to the Embodiment and each Modification Embodiment. The present invention can be appropriately modified within the extent not departing from the intent and idea of the invention that can be understood from the attached Claims and the entire specification. The vehicle as so modified is included in the technical scope of the present invention.

For instance, the above Embodiment and each Modification Embodiment show an example configuration in which a driving motor is used for the electric motor 25. Instead, an electric motor including what is called a motor generator may be used. Accordingly, when electric energy is given, it works as a motor. Also, when rotation energy is given, it works as an electric generator to output alternating current. This alternating current may be converted to direct current by an electric power converter 30. Then, the battery 28 may be charged using this current. This enables regenerative braking.

This instance focuses on any one of the front wheels 3 and the rear wheels 9. The target torque regarding the wheel of interest may be brake torque and the amount of the brake torque may be less than or equal to the maximum brake torque that is obtained during the regenerative braking. In this case, the electric brake motor 27 is not actuated, and only the brake torque from the regenerative braking by the electric motor 25 is applied to the wheel by the control unit 103. By contrast, the amount of the target torque (brake torque) regarding the wheel of interest may be larger than the maximum brake torque that is obtained during the regenerative braking. In this case, in addition to the regenerative braking by the electric motor 25, the brake torque from the electric brake motor 27 is used to fulfill the brake torque. Then, the resulting brake torque is applied to the wheel by the control unit 103.

Note that such braking control may not be used. Instead, the brake torque from both the regenerative braking by the electric motor 25 and the braking actuated by the electric brake motor 27 may be constantly given to the wheel at a brake torque ratio set appropriately. Further, the above Embodiment and each Modification Embodiment show examples of a four-wheel vehicle. If applicable, the present invention may not be limited to the four-wheel vehicle, but may relate to a two-front-wheel and one-rear-wheel vehicle or a one-front-wheel and two-rear-wheel vehicle.

REFERENCE SIGNS LIST

1 Vehicle
3 Front wheel (Wheel)
7 Vehicle body frame (Vehicle body)
7a Bottom plate (Vehicle body)
9 Rear wheel (Wheel)
13 Cabin
19 Support shaft
20 Steering yoke
25 Electric motor (Torque-applying means)
27 Electric brake motor (Torque-applying means)
28 Battery
29 Front wheel support member (Wheel support member, Linkage mechanism, Camber angle adjusting means, and Wheel support means)

31 First center support member (Base member, Linkage mechanism, Caster angle adjusting means, Camber angle adjusting means, and Wheel support means)
33 Second center support member (Base member, Caster angle adjusting means, and Wheel support means)
35 Elastic member
37 Third center support member (Base member, Coupling means)
37b Bent portion
39 Elastic member (Elastic means)
41 Front-side torsion spring member (Elastic means)
49 Camber shaft (Wheel support member, Linkage mechanism, Camber angle adjusting means, and Wheel support means)
51 Steering shaft member (Linkage mechanism and Camber angle adjusting means)
53 Pivot shaft (Caster angle adjusting means)
59 First link member (Camber angle adjusting means)
57 Electric actuator (Caster angle adjusting means)
61 Camber link member (Camber angle adjusting means)
65 Wheel holding member (Wheel support member, Linkage mechanism, and Wheel support means)
67 First center support member (Base member, Linkage mechanism, and Wheel support means)
69 Second center support member (Base member and Coupling means)
69b Bent portion
73 Rear-side torsion spring member (Elastic means)
75 Elastic member (Elastic means)
81 Elastic member
83 Main bevel gear (Linkage mechanism)
85 Swivel shaft (Linkage mechanism)
87 Intermediate bevel gear (Linkage mechanism)
91 Movement-restricting device (Resistance means)
93 Master-side hydraulic cylinder (Motive actuating-force transmission means)
97 Slave-side hydraulic cylinder (Motive actuating-force transmission means)
99 Hydraulic pipe (Motive actuating-force transmission means)
101 Flow resistance-adjusting device (Resistance means)
117 First universal joint (Linkage mechanism)
119 Link member (Linkage mechanism)
121 Second universal joint (Linkage mechanism)
123 Rocking arm (Linkage mechanism)
125 Pivot shaft (Linkage mechanism)
127 Shock absorber (Caster angle adjusting means)
129 Tie member (Linkage mechanism)
145 Pivot shaft (Caster angle adjusting means)
147 Plate spring member (Elastic means)
567 First center support member (Base member, Linkage mechanism, and Wheel support means)
631 First center support member (Base member, Linkage mechanism, and Caster angle adjusting means)
729 Front wheel support member (Wheel support member, Linkage mechanism, and Camber angle adjusting means)
731 First center support member (Base member, Linkage mechanism, Caster angle adjusting means, and Camber angle adjusting means)
751 Steering shaft member (Linkage mechanism and Camber angle adjusting means)
807 Vehicle body frame (Vehicle body)
Df Virtual straight line (First axis and Pitch axis)
Dr Virtual straight line (Third axis and Pitch axis)
Ef Virtual straight line (Second axis and Roll axis)
Er Virtual straight line (Fourth axis and Roll axis)
K Intersection point
Lc Virtual straight line (Vehicle body center line)
Lf Virtual straight line (Steering axis)
Lf1 Virtual straight line (Steering axis)
Lr2 Virtual straight line (steering axis)
P Tilting center
S Ground contact point
R Traveling road surface

The invention claimed is:

1. A vehicle comprising:
a pair of left and right wheels;
torque-applying mechanism for individually applying torque to each of the pair of left and right wheels;
a wheel support member that rotatably supports each wheel;
a base member that rotatably supports the wheel support member;
a vehicle body that supports the base member; and
a linkage mechanism that mechanically interlocks the wheels by the wheel support member, so that the wheels can be displaced relatively to one another vertically in opposite directions with respect to the vehicle body,
wherein the wheel support member is rotatably supported by the base member about a steering axis that is inclined such that an upper portion thereof is positioned forwardly of a lower portion thereof;
the wheel support member is mechanically interlocked with the base member and is rotated about the steering axis by using a difference in torque between the wheels, the difference being caused when each wheel is given torque individually by the applying torque-during turning of the vehicle;
by allowing the wheel support member to rotate about the steering axis, each wheel is steered, and, at the same time, the wheels are interlocked and displaced relatively to one another vertically in opposite directions with respect to the vehicle body, so that the vehicle body is made to be tilted inwardly in a turning direction.

2. The vehicle according to claim 1, wherein the base member is supported via elastic means by the vehicle body.

3. The vehicle according to claim 1, further comprising resistance mechanism for giving rotation resistance when the wheel support member rotates.

4. The vehicle according to claim 1, further comprising:
an electric motor for applying torque to each of the pair of left and right wheels; and
a battery for supplying electricity to the electric motor,
wherein the battery is supported by the vehicle body such that the gravity center of the battery is positioned lower than a tilting center when the vehicle body is tilted in a vehicle widthwise direction by allowing rotation of the wheel support member with respect to the base member and by relatively displacing the wheels vertically in opposite directions with respected to the vehicle body.

5. The vehicle according to claim 1, further comprising:
an operable steering yoke, wherein the steering yoke and the wheel support member are interlocked and coupled by motive actuating-force transmission means.

6. The vehicle according to claim 1, wherein the pair of left and right wheels are a pair of left and right front wheels.

7. The vehicle according to claim 6, wherein the pair of left and right front wheels are rotatably supported by a pair of left and right front-wheel-side wheel support members; and the pair of left and right front-wheel-side wheel support members are each rotatably supported by a front-wheel-side base member about each of a pair of left and right front-wheel-side steering axes.

8. The vehicle according to claim 7, wherein when a vehicle widthwise direction of the vehicle body is defined as an X direction and a vehicle longitudinal direction of the vehicle body is defined as a Y direction, the pair of left and right front-wheel-side steering axes are arranged to be symmetrical to each other with respect to a plane that is parallel to the Y direction and vertical to the X direction and intersects a vehicle widthwise center of the vehicle body; and the pair of left and right front-wheel-side steering axes are arranged such that the pair of left and right front-wheel-side steering axes are each inclined with respect to a plain that is parallel to the X direction and the Y direction and each intersect a Y axis when viewed from the above of the vehicle body.

9. The vehicle according to claim 6, further comprising: camber angle adjusting means for allowing the pair of left and right front wheels to be tilted, depending on an amount of rotation of the wheel support member about the steering axis, inwardly in the turning direction.

10. The vehicle according to claim 6, wherein the steering axis is tilted such that when the vehicle accelerates in a traveling direction, an intersection point between a traveling road surface and the steering axis is positioned in the vehicle traveling direction rearwardly of a virtual straight line connecting ground contact points of the wheels.

11. The vehicle according to claim 6, further comprising: caster angle adjusting means for changing, depending on a vehicle running speed, an angle of inclination of the steering axis.

12. The vehicle according to claim 1, wherein the pair of left and right wheels are a pair of left and right rear wheels; the pair of left and right rear wheels are rotatably supported by a pair of left and right rear-wheel-side wheel support members; and
the pair of left and right rear-wheel-side wheel support members are each rotatably supported by a rear-wheel-side base member about each of a pair of left and right rear-wheel-side steering axes.

13. The vehicle according to claim 12, wherein when a vehicle widthwise direction of the vehicle body is defined as an X direction and a vehicle longitudinal direction of the vehicle body is defined as a Y direction, the pair of left and right rear-wheel-side steering axes are arranged to be symmetrical to each other with respect to a plane that is parallel to the Y direction and vertical to the X direction and intersects a vehicle widthwise center of the vehicle body; and the pair of left and right rear-wheel-side steering axes are arranged such that the pair of left and right rear-wheel-side steering axes are each inclined with respect to a plain that is parallel to the X direction and the Y direction and each intersect a Y axis when viewed from the above of the vehicle body.

14. The vehicle according to claim 12, wherein the rear-wheel-side wheel support members can rotate about the rear-wheel-side steering axes by degrees within substantially the same vertical angle relative to a neutral position defined as a state of being inclined by about 45 degrees with respect to a traveling road surface while the rear-wheel-side wheel support members are positioned lower as the members each extend in a longitudinal direction far from the rear-wheel-side steering axis.

15. The vehicle according to claim 1, wherein the pair of left and right wheels are a pair of left and right front wheels, the vehicle further comprising:

a pair of left and right rear wheels that are disposed rearwardly of the pair of left and right front wheels;
a rear-wheel-side wheel support member that rotatably supports each of the pair of left and right rear wheels;
a rear-wheel-side base member that rotatably supports the rear-wheel-side wheel support member and is supported by the vehicle body; and
a rear-wheel-side linkage mechanism that can mechanically interlock the pair of left and right rear wheels by the rear-wheel-side wheel support member and can relatively displace the pair of left and right rear wheels vertically in opposite directions with respect to the vehicle body,
wherein by allowing rotation of the rear-wheel-side wheel support member with respect to the rear-wheel-side base member, the rear wheels are displaced relatively to one another vertically in opposite directions with respect to the vehicle body; and
a difference in torque between the front wheels, the torque being individually given to the pair of left and right front wheels by the applying torque, causes the vehicle body to be tilted inwardly in the turning direction and generates a difference in vertical load between the pair of left and right rear wheels, so that the difference in vertical load causes the rear-wheel-side wheel support member to rotate with respect to the rear-wheel-side base member.

16. The vehicle according to claim 15, wherein the pair of left and right rear wheels are rotatably supported by a pair of left and right rear-wheel-side wheel support members; the pair of left and right rear-wheel-side wheel support members are each rotatably supported by a rear-wheel-side base member about each of a pair of left and right front-wheel-side steering axes; when a vehicle widthwise direction of the vehicle body is defined as an X direction and a vehicle longitudinal direction of the vehicle body is defined as a Y direction, the pair of left and right rear-wheel-side steering axes are arranged to be symmetrical to each other with respect to a plane that is parallel to the Y direction and vertical to the X direction and intersects a vehicle widthwise center of the vehicle body; and the pair of left and right rear-wheel-side steering axes are arranged such that the pair of left and right rear-wheel-side steering axes are each inclined with respect to a plain that is parallel to the X direction and the Y direction and each intersect a Y axis when viewed from the above of the vehicle body.

17. The vehicle according to claim 15, wherein the rear-wheel-side wheel support members can rotate about the rear-wheel-side steering axes by degrees within substantially the same vertical angle relative to a neutral position defined as a state of being inclined by about 45 degrees with respect to a traveling road surface while the rear-wheel-side wheel support members are positioned lower as the members each extend in a longitudinal direction far from the rear-wheel-side steering axis.

18. The vehicle according to claim 1, wherein the pair of left and right wheels are a pair of left and right rear wheels, the vehicle further comprising:
a pair of left and right front wheels that are disposed forwardly of the pair of left and right rear wheels;
a front-wheel-side wheel support member that rotatably supports each of the pair of left and right front wheels;
a front-wheel-side base member that rotatably supports the front-wheel-side wheel support member and is supported by the vehicle body; and
a front-wheel-side linkage mechanism that can mechanically interlock the pair of left and right front wheels by the front-wheel-side wheel support member and can relatively displace the pair of left and right front wheels vertically in opposite directions with respect to the vehicle body, wherein by allowing rotation of the front-wheel-side wheel support member with respect to the front-wheel-side base member, the front wheels are displaced relatively to one another vertically in opposite directions with respect to the vehicle body; and a difference in torque between the rear wheels, the torque being individually given to the pair of left and right rear wheels by the applying torque, causes the vehicle body to be tilted inwardly in the turning direction and generates a difference in vertical load between the pair of left and right front wheels, so that the difference in vertical load causes the front-wheel-side wheel support member to rotate with respect to the front-wheel-side base member.

19. The vehicle according to claim 1, further comprising a cabin that is rotatably supported by the vehicle body about a support shaft extending in substantially a vertical direction.

\* \* \* \* \*